US012537345B2

(12) United States Patent
(10) Patent No.: US 12,537,345 B2
(45) Date of Patent: Jan. 27, 2026

Noguchi et al.

(54) TERMINAL UNIT, AND CONNECTOR INCLUDING THE SAME

(71) Applicant: IRISO ELECTRONICS CO., LTD., Yokohama (JP)

(72) Inventors: Daisuke Noguchi, Yokohama (JP); Takayuki Arai, Yokohama (JP); Hiroaki Yukutake, Yokohama (JP); Kazuya Riku, Yokohama (JP); Koichi Kiryu, Nagano (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 313 days.

(21) Appl. No.: 18/338,457

(22) Filed: Jun. 21, 2023

(65) Prior Publication Data

US 2023/0420890 A1 Dec. 28, 2023

(30) Foreign Application Priority Data

Jun. 24, 2022 (JP) ................................ 2022-102109
Oct. 14, 2022 (JP) ................................ 2022-165818

(51) Int. Cl.

| | |
|---|---|
| ***H01R 13/6593*** | (2011.01) |
| ***H01R 4/18*** | (2006.01) |
| ***H01R 13/6474*** | (2011.01) |
| ***H01R 13/6582*** | (2011.01) |

(52) U.S. Cl.

CPC ......... *H01R 13/6593* (2013.01); *H01R 4/184* (2013.01); *H01R 13/6582* (2013.01); *H01R 13/6474* (2013.01)

(58) Field of Classification Search

CPC ............ H01R 13/6593; H01R 13/6582; H01R 13/659; H01R 13/6592; H01R 13/6474

USPC ..................................................... 439/607.41

See application file for complete search history.

(56) References Cited

U.S. PATENT DOCUMENTS

| | | | | |
|---|---|---|---|---|
| 10,033,140 | B2 * | 7/2018 | Kanda | H01R 4/184 |
| 11,245,229 | B2 * | 2/2022 | Ellison | H01R 9/2483 |
| 2011/0294349 | A1 * | 12/2011 | Kawakami | H01R 13/6593 439/607.55 |

(Continued)

FOREIGN PATENT DOCUMENTS

| | | | | |
|---|---|---|---|---|
| CN | 113196583 A * | 7/2021 | | H01R 13/6592 |
| JP | 2008-181810 A | 8/2008 | | |

(Continued)

OTHER PUBLICATIONS

Extended European Search Report, for European Patent Application No. 23180988.0, dated Nov. 27, 2023, 8 pages.

*Primary Examiner* — Gary F Paumen

(74) *Attorney, Agent, or Firm* — Westman, Champlin & Koehler, P.A.

(57) ABSTRACT

A terminal unit includes an internal terminal for connecting to an inner conductor of a shield cable, a dielectric member for retaining the internal terminal, and an external terminal for connecting to an external conductor. The terminal unit further includes a conductive impedance adjustment member formed as a separate body from the internal terminal and the external terminal. The impedance adjustment member includes an adjustment section that is disposed at a position that is between the external terminal and the internal terminal and that is a position able to adjust an impedance of a press-fit portion.

24 Claims, 37 Drawing Sheets

(56) References Cited

U.S. PATENT DOCUMENTS

| | | | | |
|---|---|---|---|---|
| 2018/0026401 A1* | 1/2018 | Kanda | ................ | H01R 13/6473<br>439/607.5 |
| 2018/0076579 A1* | 3/2018 | Tokita | ................ | H01R 13/5808 |

FOREIGN PATENT DOCUMENTS

| | | | | | |
|---|---|---|---|---|---|
| JP | 2020107567 A | * | 7/2020 | ......... | H01R 13/6592 |
| JP | 2021106168 A | * | 7/2021 | ......... | H01R 13/6592 |
| WO | WO-2020137963 A1 | * | 7/2020 | ......... | H01R 13/6592 |

* cited by examiner

TERMINAL UNIT, AND CONNECTOR INCLUDING THE SAME

CROSS-REFERENCE TO RELATED APPLICATION

This application claims priority under 35 USC 119 from Japanese Patent application No. 2022-102109 filed on Jun. 24, 2022 and Japanese Patent application No. 2022-165818 filed on Oct. 14, 2022, the disclosures of which are incorporated by reference herein in its entirety.

TECHNICAL FIELD

The present disclosure relates to a terminal unit, and a connector including the same.

BACKGROUND ART

Patent Document 1 discloses a terminal unit for mounting to a shield cable. This terminal unit includes an internal terminal for connecting to an inner conductor of the shield cable, a dielectric member that retains the internal terminal, and an outer terminal for connecting to an external conductor of the shield cable and that houses the internal terminal and the dielectric member. The internal terminal includes a press-fit portion that press-fits to the inner conductor.

RELATED LITERATURE

Patent Literature

Patent Document 1: Japanese Patent Application Laid-Open (JP-A) No. 2008-181810

SUMMARY OF INVENTION

Technical Problem

An impedance at the press-fit portion sometimes rises excessively in a terminal unit such as described above.

A first object of the present disclosure is to provide a terminal unit that suppresses impedance from rising excessively at the press-fit portion and that has enhanced impedance matching, and to provide a connector of the same.

Solution to Problem

A terminal unit according to a first aspect is a terminal unit for mounting to a shield cable including at least one inner conductor, and an external conductor that shields the at least one inner conductor. The terminal unit includes at least one internal terminal for connecting to the at least one inner conductor, a dielectric member that retains the internal terminal, an external terminal for connecting to the external conductor and that houses the internal terminal, and a conductive impedance adjustment member formed as a separate body from the internal terminal and the external terminal. The internal terminal includes a press-fit portion for press-fitting onto the inner conductor, and the impedance adjustment member includes an adjustment section disposed at a position that is between the external terminal and the internal terminal that is a position able to adjust impedance of the press-fit portion.

In the present aspect, the terminal unit is for mounting to a shield cable. The shield cable includes the at least one inner conductor and the external conductor that shields the at least one inner conductor.

The terminal unit includes the at least one internal terminal for connecting to the at least one inner conductor, the dielectric member that retains the internal terminal, and the external terminal for connecting to the external conductor. The external terminal houses the internal terminal. The internal terminal includes the press-fit portion for press-fitting onto the inner conductor.

The terminal unit further includes the conductive impedance adjustment member formed as a separate body from the internal terminal and the external terminal. The impedance adjustment member includes the adjustment section disposed at the position that is between the external terminal and the internal terminal that is a position able to adjust the impedance of the press-fit portion.

An excessive rise in the impedance at the press-fit portion is accordingly suppressed, enabling the terminal unit to be configured with enhanced impedance matching.

Note that the later described exemplary embodiment describes an example in which the adjustment section is disposed at a position overlapping with the press-fit portion in the front-rear direction. However, the adjustment section of the present aspect is not limited thereto, and may be disposed close enough to the press-fit portion to be able to adjust the impedance of the press-fit portion. Namely, reference above to a "position able to adjust impedance of the press-fit portion" is not a condition that needs to be interpreted strictly. Note that reference to the front-rear direction (axial direction) in the present disclosure means a direction parallel to a portion of the inner conductor that the press-fit portion press-fits onto.

Moreover, the later described exemplary embodiment describes an example in which the entire impedance adjustment member is positioned between the external terminal and the internal terminal. However, the impedance adjustment member of the present aspect is not limited thereto, and it is sufficient for the adjustment section to be positioned between the external terminal and the internal terminal.

Moreover, the later described exemplary embodiment describes an example in which the impedance adjustment member is electrically connected to the external terminal and the external conductor. However, the impedance adjustment member of the present aspect is not limited thereto and is not necessarily electrically connected to the external terminal and the external conductor.

Moreover, the later described exemplary embodiment describes an example in which the impedance adjustment member is disposed at an outer face of the dielectric member. However, the impedance adjustment member of the present aspect is not limited thereto, and may be disposed at an inner face of the dielectric member, or may be inserted or embedded inside a wall of the dielectric member, or the like.

Moreover, the later described exemplary embodiment describes an example in which the dielectric member includes an indentation for placement of the impedance adjustment member. However, the dielectric member of the present aspect is not limited thereto, and may be configured without such an indentation.

Moreover, the later described exemplary embodiment describes an example in which the impedance adjustment member is fixed with respect to the dielectric member and the external terminal. However, the impedance adjustment member of the present aspect is not limited thereto, and may be configured so as to be able to move slightly with respect to the dielectric member and the external terminal.

Moreover, the later described exemplary embodiment describes an example in which the terminal unit is for mounting to a shield cable including one inner conductor.

However, the terminal unit of the present aspect is not limited thereto, and may be configured for mounting to a shield cable including two or more inner conductors. In such cases the terminal unit includes two or more internal terminals.

Moreover, although the later described exemplary embodiment (except for Modified Example 3) describes an example in which the external terminal includes a first press-fit portion, and an external terminal and the external conductor are connected together (electrically) at the first press-fit portion, the external terminal of the present aspect is not limited thereto. The external terminal of the present aspect may be configured without the first press-fit portion, and so as to be connected (electrically) to the external conductor through another member (see Modified Example 3).

A terminal unit according to a second aspect is the first aspect, wherein the external terminal includes a main body that houses the internal terminal, an opening is formed in the main body such that an internal space of the main body is open toward the rear side, and the adjustment section includes a lid portion having a plate thickness direction facing in a direction intersecting with a plane perpendicular to a front-rear direction, with the lid portion being disposed so as to narrow the opening.

In the present aspect, the external terminal includes the main body that houses the internal terminal. The opening is formed in the main body such that the internal space of the main body is open toward the rear side. This facilitates manufacture of the external terminal including the main body compared to embodiments not formed with such an opening in the main body.

The adjustment section also includes the lid portion. The lid portion is a portion having a plate thickness direction facing in the direction intersecting with the plane perpendicular to the front-rear direction and is disposed so as to narrow the opening. The opening of the main body is accordingly narrowed, enabling crosstalk between the internal terminal and other electrical components to be prevented.

Note that the later described exemplary embodiment describes an example in which the lid portion includes a portion (flat plate portion 83) having a plate thickness direction facing in a direction perpendicular to a plane perpendicular to the front-rear direction (i.e. facing in the front-rear direction). However, the lid portion of the present aspect is not limited thereto, and may be configured without a portion having a plate thickness direction facing in the front-rear direction. For example, a planar portion provided to the lid portion may have a plate thickness direction facing in a direction angled with respect to the front-rear direction. Moreover the lid portion may be configured without a planar portion.

A terminal unit according to a third aspect is the second aspect, wherein the lid portion includes a pair of side plate portions disposed so as to sandwich the inner conductor, and an upper plate portion coupling the pair of side plate portions together, and wherein a pass through portion is formed between the pair of side plate portions to allow the inner conductor to pass through in the front-rear direction, with the pass through portion open in one direction perpendicular to the front-rear direction.

In the present aspect the lid portion includes the pair of side plate portions disposed so as to sandwich the inner conductor, and the upper plate portion coupling the pair of side plate portions together. The pass through portion is also formed between the pair of side plate portions to allow the inner conductor to pass through in the front-rear direction, with the pass through portion open in the one-direction perpendicular to the front-rear direction.

This accordingly enables the impedance adjustment member to be placed from the one-direction perpendicular to the front-rear direction with respect to the inner conductor when assembling the terminal unit. Assembly of the terminal unit is facilitated thereby.

A terminal unit according to a fourth aspect is any one of the first aspect to the third aspect, wherein the adjustment section includes a front-rear direction extension portion having a plate thickness direction facing in a direction along a plane perpendicular to a front-rear direction and extending in the front-rear direction.

In the present aspect the adjustment section includes the front-rear direction extension portion. The front-rear direction extension portion has a plate thickness direction facing in the direction along a plane perpendicular to the front-rear direction and extends in the front-rear direction.

This enables enhanced impedance matching to be achieved compared to an embodiment in which the adjustment section does not include the front-rear direction extension portion.

Note that the later described exemplary embodiment describes an example in which the front-rear direction extension portion has a plate thickness direction facing in a direction parallel to a plane perpendicular to the front-rear direction. However, the front-rear direction extension portion of the present aspect is not limited thereto, and may have a plate thickness direction facing in a direction slightly inclined with respect to a plane perpendicular to the front-rear direction. Namely, reference here to a “direction along a plane” includes a direction slightly inclined with respect to a plane as well as a direction parallel to a plane.

A terminal unit according to a fifth aspect is the fourth aspect, wherein the front-rear direction extension portion includes a pair of opposing plate portions opposing each other so as to sandwich the internal terminal, and a coupling plate portion that couples the pair of opposing plate portions together.

In the present aspect the front-rear direction extension portion includes the pair of opposing plate portions opposing each other so as to sandwich the internal terminal, and includes the coupling plate portion that couples the pair of opposing plate portions together.

This enables enhanced impedance matching to be achieved compared, for example, to an embodiment in which the front-rear direction extension portion is not formed so as to sandwich the internal terminal.

The terminal unit according to the sixth aspect is the fifth aspect, wherein the three plate portions of the pair of opposing plate portions and the coupling plate portion each contact the external terminal.

In the present aspect the three plate portions of the pair of the opposing plate portions and the coupling plate portion each contact the external terminal. This enables vibration noise from these plate portions and the external terminal to be suppressed from being generated.

A terminal unit according to a seventh aspect is the sixth aspect wherein contact between each of the three plate portions and the external terminal is realized through projection portions formed at at least one of the front-rear direction extension portion or the external terminal.

In the present aspect the contact between each of the three plate portions (the pair of opposing plate portions and the coupling plate portion) and the external terminal is realized through projection portions formed at at least one of the front-rear direction extension portion or the external terminal. Note that reference here to a projection portion means a portion formed so as to project with respect to an adjoining portion thereto, and is a portion in which an apex thereof and adjoining portions thereto are connected by paths in two directions or more. Thus a cantilevered spring such as a spring tab or the like does not correspond to a projection portion, but a spring supported at both sides (i.e. having an apex and an adjoining portion thereto connected by a path in two directions) does correspond to a projection portion.

This enables a stable contact state to be maintained better than in an embodiment in which planar portions are contacted together. Moreover, parasitic inductance in the impedance adjustment member or the external terminal can be reduced in comparison to an embodiment in which contact is made through a cantilever spring, such as a spring tab.

A terminal unit according to an eighth aspect is the sixth aspect, wherein contact between each of the three plate portions and the external terminal is realized through projection portions formed at the external terminal.

In the present aspect, contact between each of the three plate portions and the external terminal is realized through projection portions formed at the external terminal.

This makes it easier to form a large projection portion compared to an embodiment in which the projection portions are formed to the front-rear direction extension portion of the impedance adjustment member. This is because the external terminal is easier to form large than the front-rear direction extension portion. Contact between the external terminal and the impedance adjustment member can be stabilized as a result.

A terminal unit according to a ninth aspect is any one of the first to fifth aspects, wherein the impedance adjustment member and the external terminal make contact with each other and are electrically connected together.

In the present aspect the impedance adjustment member and the external terminal make contact with each other and are electrically connected together. The electrical potential of the impedance adjustment member is accordingly stabilized.

A terminal unit according to the tenth aspect is the ninth aspect, wherein contact between the impedance adjustment member and the external terminal is realized through projection portions formed at at least one of the impedance adjustment member or the external terminal.

In the present aspect, the contact between the impedance adjustment member and the external terminal is realized through projection portions formed at at least one of the impedance adjustment member or the external terminal.

This enables a stable contact state to be maintained better than in an embodiment in which planar portions are contacted together. Moreover, parasitic inductance in the impedance adjustment member or the external terminal can be reduced in comparison to an embodiment in which contact is made through a cantilever spring, such as a spring tab.

A terminal unit according to an eleventh aspect is any one of the first aspect to the tenth aspect, wherein the impedance adjustment member is disposed at an outer face of the dielectric member, and a placement indentation for placement of the impedance adjustment member is formed to the outer face of the dielectric member.

In the present aspect, the impedance adjustment member is disposed at the outer face of the dielectric member. The placement indentation for placement of the impedance adjustment member is formed to the outer face of the dielectric member.

This enables the dielectric member and the impedance adjustment member to be efficiently housed in the external terminal.

A connector according to the twelfth aspect is any one of the first to the eleventh aspects, wherein the terminal unit further includes a conductive sleeve disposed at an outer side of an insulating cover that covers the inner conductor, and the sleeve and the impedance adjustment member make contact with each other.

In the present aspect, the terminal unit includes a conductive sleeve disposed at the outer side of the insulating cover that covers the inner conductor. Changes in the cross-section profile of the insulating cover covering the inner conductor are suppressed, and the impedance is maintained constant as a result.

The sleeve and the impedance adjustment member make contact with each other. This means that vibration that is a cause of noise is suppressed.

Note that in each of the later described exemplary embodiment description is of an example in which the sleeve contacts the lid portion of the impedance adjustment member. However, the present aspect is not limited thereto. The sleeve of the present aspect may be configured so as to contact another portion (for example an opposing plate portion) of the impedance adjustment member.

Moreover, in each of the later described exemplary embodiment description is of an example in which the contact between the sleeve and the impedance adjustment member is press contact. However, the present aspect is not limited thereto.

The sleeve and the impedance adjustment member may be bonded or welded together.

A connector according to a thirteenth aspect is the twelfth aspect, wherein the sleeve is formed by a machined component, a die-cast component, or an injection molded body.

In the present aspect, the sleeve is formed by a machined component, a die-cast component, or an injection molded body. This accordingly enables the dimensional accuracy of the sleeve to be raised compared to an embodiment in which the sleeve is formed by pressing sheet metal, enabling more certain contact to be achieved between the sleeve and the impedance adjustment member as a result.

Moreover, the degrees of freedom in the shape of the sleeve are high in the present aspect, and so the present aspect is applicable to combining with an embodiment in which the impedance adjustment member includes a first press-fit portion. Namely, in an embodiment in which the impedance adjustment member includes a first press-fit portion, there are few degrees of freedom in design for the impedance adjustment member in related to structure to make contact with the sleeve because of the need to form the first press-fit portion. In order to compensate for this, the sleeve is preferably formed from a machined component, a die-cast component, or an injection molded body.

A connector according to a fourteenth aspect is the twelfth or the thirteenth aspect, wherein contact between the sleeve and the impedance adjustment member is press contact.

In the present aspect the contact between the sleeve and the impedance adjustment member is press contact. This accordingly enables the sleeve and the impedance adjustment member to be prevented from ceasing to make contact due to manufacturing tolerance of the sleeve, vibration during use, or the like.

Note that in the later described exemplary embodiment description is of an example in which a direction of press contact between the sleeve and the impedance adjustment member is both the front-rear direction and a direction perpendicular to the front-rear direction (more specifically the width direction). However, the present aspect is not limited thereto.

A connector according to a fifteenth aspect is the fourteenth aspect, wherein the impedance adjustment member includes a biasing portion to bias the sleeve toward the impedance adjustment member.

In the present aspect the impedance adjustment member includes the biasing portion to bias the sleeve toward the impedance adjustment member. Press contact between the impedance adjustment member and the sleeve can accordingly be achieved without an increase in the number of components.

The connector according to a sixteenth aspect is any one of the twelfth aspect to the fifteenth aspect, wherein the adjustment section includes a lid portion having a plate thickness direction facing in a direction intersecting with a plane perpendicular to a front-rear direction, the lid portion includes a side plate portion formed in a cantilever beam shape, and the sleeve contacts the side plate portion.

In the present aspect, the lid portion includes a side plate portion formed in a cantilever beam shape. This accordingly enables the lid portion including the side plate portions to be formed by bending processing rather than drawing, and enables a reduction in manufacturing cost to be achieved as a result.

The sleeve contacts the side plate portion having the cantilever beam shape. Vibration that is a cause of noise is accordingly suppressed.

Note that in a later described exemplary embodiment description is of an example in which there are a pair of the side plate portions formed. However, the side plate portion of the present aspect is not limited thereto.

A connector according to a seventeenth aspect is any one of the first aspect to the sixteenth aspect, wherein the terminal unit includes a conductive sleeve disposed at an outer side of an insulating cover that covers the inner conductor, and the dielectric member includes an entry portion disposed inside the sleeve.

In the present aspect the terminal unit includes the conductive sleeve disposed at the outer side of the insulating cover that covers the inner conductor. Changes to the cross-section profile of the insulating cover covering the inner conductor are accordingly suppressed, and the impedance is maintained constant as a result.

Moreover, the dielectric member includes the entry portion disposed inside the sleeve. The impedance at a portion of the inner conductor exposed from the insulating cover can accordingly be suppressed from rising.

More specifically, a constant length is difficult to achieve for a portion of the inner conductor exposed from the insulating cover. A long exposed portion results in a longer air layer formed between the sleeve and inner conductor, and in the impedance rising at this portion.

In order to address this issue, in the present aspect, part (the entry portion) of the dielectric member is disposed inside the sleeve, and this enables a large air layer to be suppressed from being formed between the sleeve and the inner conductor. As a result thereof this enables the impedance of the portion of the inner conductor exposed from the insulating cover to be suppressed from rising.

Note that in a later described exemplary embodiment description is of an example in which the entry portion has a tubular shape, however the entry portion of the present aspect is not limited thereto.

A connector according to an eighteenth aspect is the seventeenth aspect, wherein the entry portion is formed in a tubular shape so as to surround the inner conductor.

In the present aspect the entry portion is formed in a tubular shape so as to surround the inner conductor. This enables the effectiveness with which a rise in impedance is suppressed to be raised.

Note that in a later described exemplary embodiment description is of an example in which the entry portion is configured so as to surround the inner conductor without a gap in a direction about an axis of the inner conductor. However, the entry portion of the present aspect is not limited thereto, and may be formed with a slit or the like.

A connector according to a nineteenth aspects is the tenth aspect, wherein the projection portion is formed at the external terminal, and the impedance adjustment member includes a resilient contact portion that resiliently contacts the projection portion.

In the present aspect the projection portion is formed at the external terminal. The impedance adjustment member includes the resilient contact portion that resiliently contacts the projection portion. There is accordingly an improvement in the ease of assembly of the external terminal formed with the projection portion.

Note that the present aspect corresponds to a later described Modified Example 1.

Moreover, the dielectric member preferably includes an escape indentation at a position corresponding to the resilient contact portion, as in Modified Example 1. Forming the escape indentation enables the resilient contact portion pressed by the projection portion to escape into the escape indentation. However, in contrast to in Modified Example 1, the resilient contact portion may be configured thinner such that a face of the resilient contact portion opposing the dielectric member has an indented profile. A resilient contact portion configured in this manner is also able to resiliently deform by contact with the projection portion. Moreover, such a resilient contact portion may be combined with an escape indentation formed to the dielectric member.

Moreover, the resilient contact portion is preferably formed in a state in which a plate face is maintained (a state in which a flat plate face not subject to bend processing is maintained). Adopting such an approach enables the impedance adjustment member to be easily disposed at a position between the external terminal and the internal terminal. More specifically, the resilient contact portion can be suppressed from catching on a main body of the external terminal when being assembled (in a process of inserting the dielectric member into the main body of the external terminal).

A connector according to a twentieth aspect is the nineteenth aspect, wherein a through hole is formed in the impedance adjustment member, and the resilient contact portion is a spring supported at both sides formed so as to divide the through hole.

In the present aspect, the through hole is formed in the impedance adjustment member, and the resilient contact portion is the spring supported at both sides formed so as to divide the through hole. This enables parasitic inductance in the impedance adjustment member or the external terminal to be reduced in comparison to an embodiment in which the resilient contact portion is a cantilever spring.

A connector according to a twenty-first aspect is any one of the first to the twentieth aspect, wherein the terminal unit includes a conductive sleeve disposed at an outer side of an insulating cover that covers the inner conductor, the sleeve and the impedance adjustment member are anchored together in a front-rear direction, and the impedance adjustment member and the dielectric member are anchored together in the front-rear direction.

In the present aspect the terminal unit includes the conductive sleeve disposed at the outer side of the insulating cover that covers the inner conductor. Changes in the cross-section profile of the insulating cover covering the inner conductor are accordingly suppressed, and the impedance is maintained constant as a result.

The sleeve and the impedance adjustment member are anchored together in the front-rear direction, and the impedance adjustment member and the dielectric member are also anchored together in the front-rear direction. The sleeve, the impedance adjustment member, and the dielectric member can accordingly be prevented from being separated from each other by an external force (in particular a force pulling on the shield cable during use).

Note that “anchored together in the front-rear direction” means a configuration engaged with each other such that the relative positions in the front-rear direction do not change therebetween.

A connector according to a twenty-second aspect is any one of the first to the twenty-first aspect, wherein the impedance adjustment member includes a first press-fit portion press-fitted onto the external conductor, and the external terminal includes a main body enabling insertion of the dielectric member from rearward, and a second press-fit portion for press-fitting together with the shield cable formed further rearward than the main body.

Were the external terminal to include the first press-fit portion then normally there would be a need to form a step portion between the main body and the first press-fit portion in advance. However, a task to insert the dielectric member into the main body from the rear is made difficult by such a step portion.

In order to address this issue, in the present aspect the impedance adjustment member includes the first press-fit portion press-fitted onto the external conductor, and the external terminal does not include a press-fit portion press-fitted onto the external conductor. This thereby enables the external terminal to be configured with a structure facilitating insertion of the dielectric member into the main body from the rear.

Note that the present aspect corresponds to later described Modified Example 3. In Modified Example 3 an example is described in which the second press-fit portion is directly press-fitted onto an outer face of the outside covering of the shield cable, however the second press-fit portion of the present aspect is not limited thereto. For example, the external conductor of the shield cable may have a double-layer structure including a foil and a braid, with the braid folded back to the outside of the outside covering, and with the second press-fit portion press-fitted to the folded back portion thereof.

A connector according to a twenty-third aspect is the tenth aspect, wherein the projection portion is formed at the external terminal, and the external terminal includes a resilient support portion that resiliently supports the projection portion.

In the present aspect the projection portion is formed at the external terminal. The external terminal includes the resilient support portion that resiliently supports the projection portion. This is because the projection portion and the resilient support portion are easier to form large than in an embodiment in which the projection portion and the resilient support portion are formed to the impedance adjustment member.

Note that the resilient support portion described above is preferably a spring supported from both ends from the perspective of decreasing the parasitic inductance of the external terminal.

Note that the present aspect corresponds to later described Modified Examples 2, 3.

A connector according to a twenty-fourth aspect includes plural of the terminal units according to any one of the first to twenty-third aspects, and a housing that retains the plural terminal units.

In the present aspect, the connector include the plural terminal units and the housing that retains the plural terminal units. The terminal unit is configured with enhanced impedance matching, thereby enabling a connector having enhanced impedance matching to be obtained.

BRIEF DESCRIPTION OF DRAWINGS

Exemplary embodiments of the present disclosure will be described in detail based on the following figures, wherein.

DESCRIPTION OF EMBODIMENTS

Description follows regarding a connector 100 according to an exemplary embodiment.

Connector 100

Figure 1:
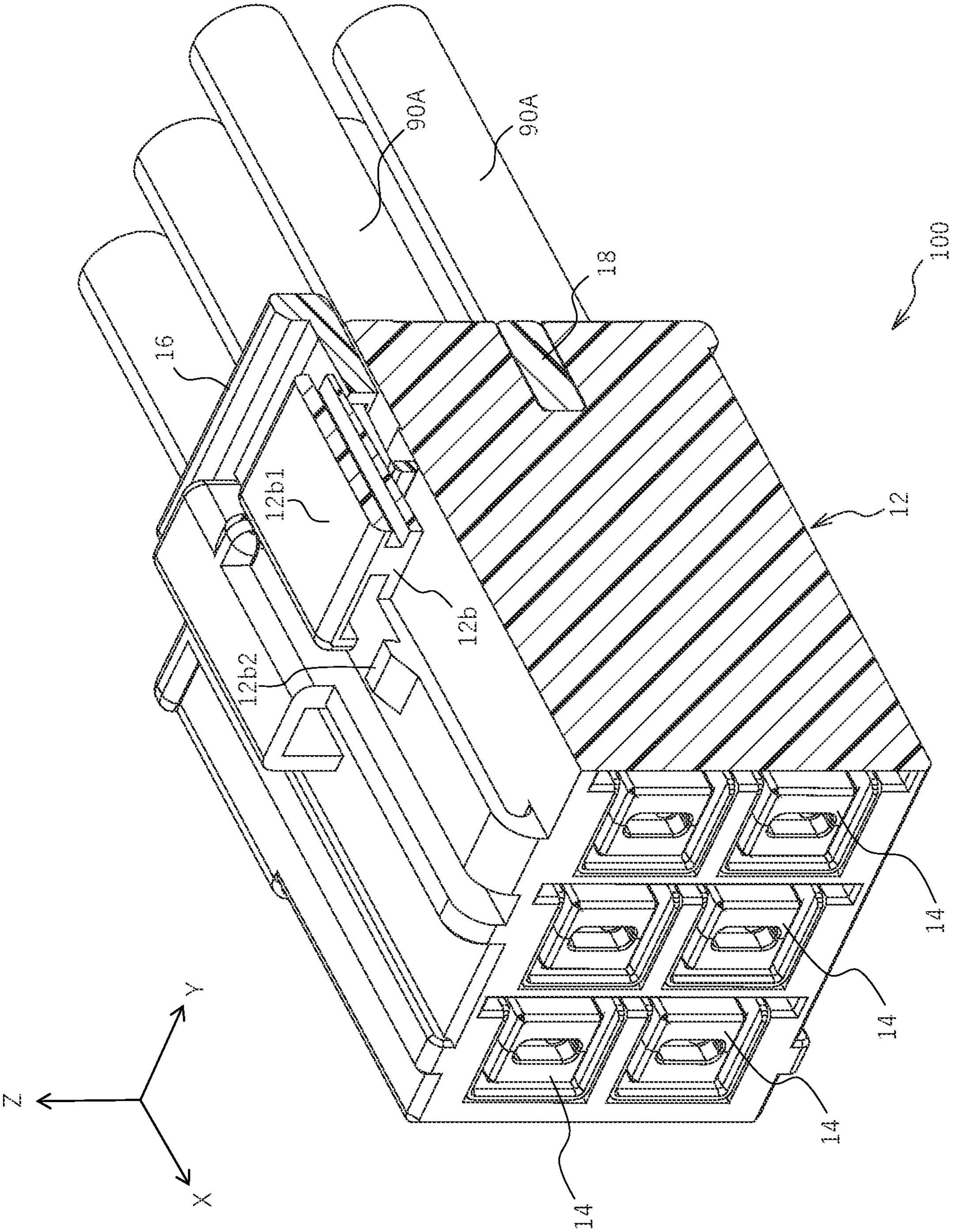
FIG. 1 is a perspective view (cross-section of a right half) illustrating a connector of an exemplary embodiment.
Figure 2:
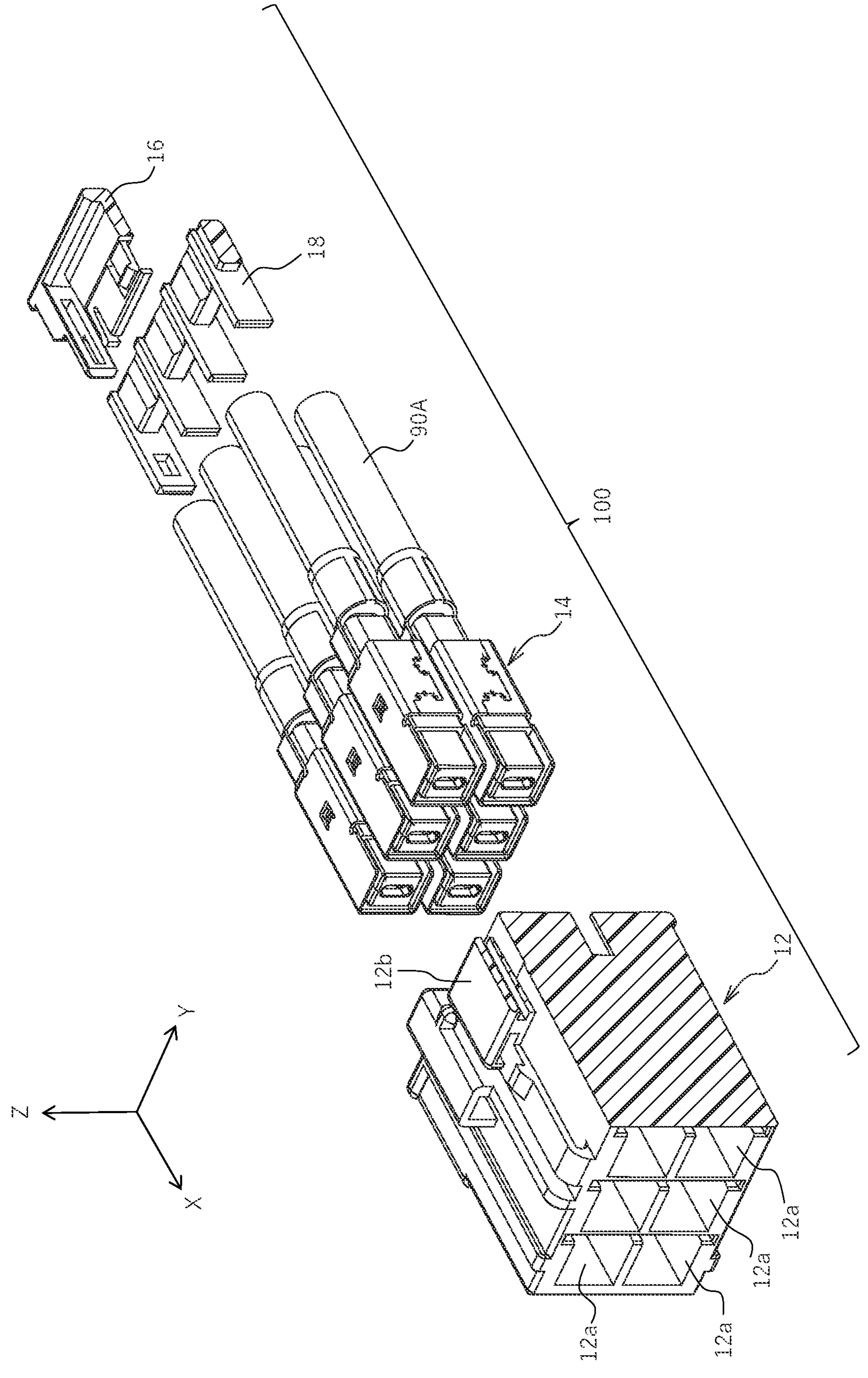
FIG. 2 is an exploded perspective view (cross-section of a right half) illustrating a connector of an exemplary embodiment.
Figure 10:
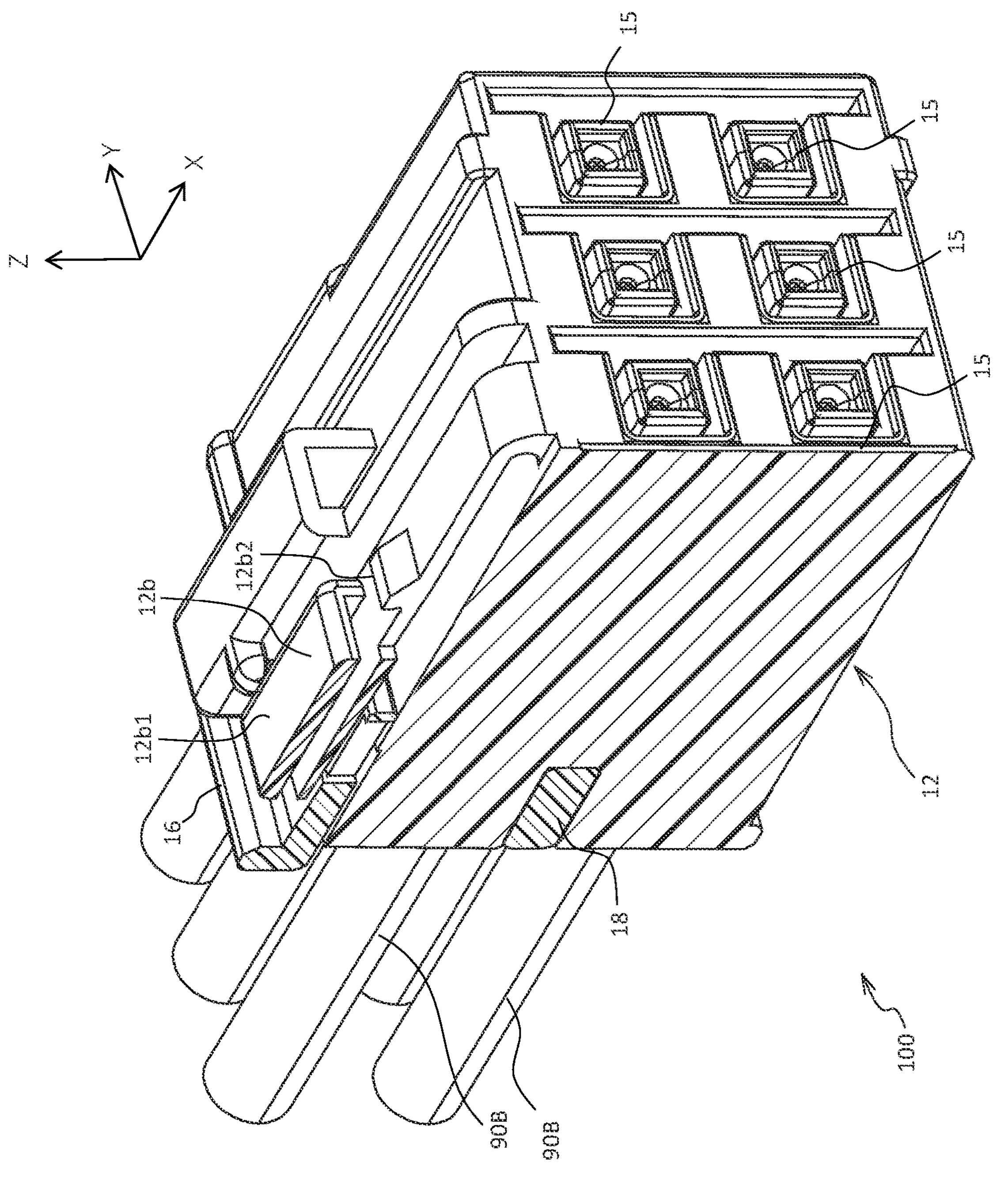
FIG. 10 is a perspective view (cross-section of a left half) illustrating a connector of an exemplary embodiment.
Figure 11:
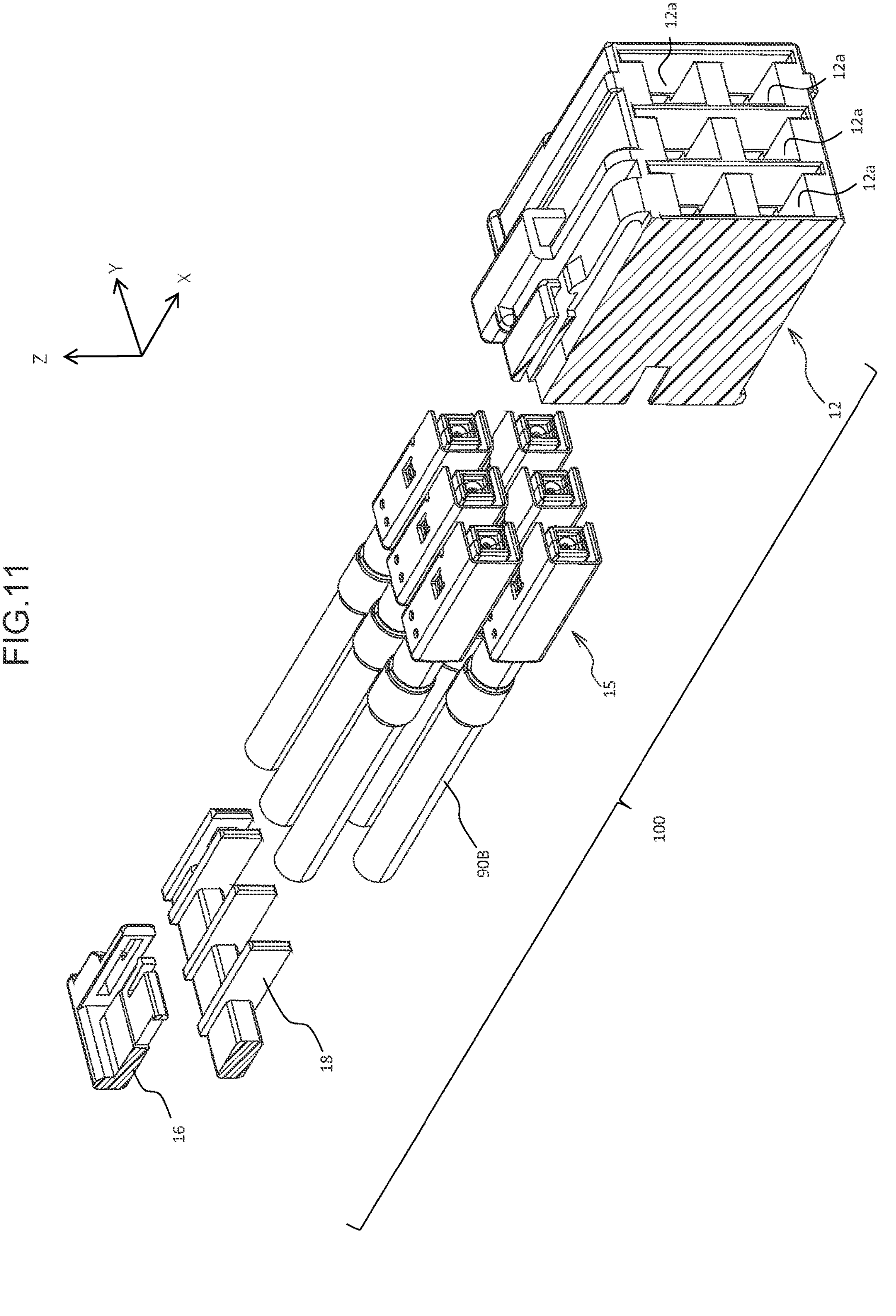
FIG. 11 is an exploded perspective view (cross-section of a left half) illustrating a connector of an exemplary embodiment.

FIG. 1 and FIG. 10 illustrate the connector 100 together with plural shield cables 90A, 90B. Note that FIG. 1 illustrates a right half of the connector 100, and FIG. 10 illustrates a left half of the connector 100. The right half and the left half of the connector 100 are inbuilt with different types of terminal units 14, 15.

Note that in these drawings an arrow X indicates a connector front direction, an arrow Y indicates a connector width direction one-side (left side), and the arrow Z indicates a connector upward direction.

The connector 100 includes a substantially cuboidal shaped housing 12, and plural terminal units 14, 15 housed in the housing 12.

The housing 12 includes plural terminal unit housing portions 12*a*. The terminal units 14, 15 are housed in the terminal unit housing portions 12*a*. The terminal unit housing portions 12*a* pierce through the housing 12 in the X direction (a connector front-rear direction).

The plural terminal unit housing portions 12*a* are configured from plural terminal unit housing portions 12*a* at positions in an upper section of the housing 12, and plural terminal unit housing portions 12*a* at positions in an lower section of the housing 12.

The terminal unit housing portions 12*a* are configured so as to enable the terminal units 14, 15 to be inserted therein from a minus X direction (connector rear direction). The terminal unit housing portions 12*a* are also configured such that the terminal units 14, 15 that have been inserted inside the terminal unit housing portions 12*a* are not able to be pulled out in a plus X direction.

The housing 12 includes a resilient anchor portion 12*b* for maintaining a connected state between the connector 100 and a counterpart side connector (connection target, not illustrated in the drawings). The resilient anchor portion 12*b* includes an operation portion 12*b*1 and a claw portion 12*b*2. The claw portion 12*b*2 is displaced by pressing the operation portion 12*b*1, so as to enable connection between the connector 100 and the counterpart side connector to be released. The resilient anchor portion 12*b* is formed to the upper section of the housing 12.

The connector 100 includes an anchor portion fixing member 16. The anchor portion fixing member 16 prevents flexing of the resilient anchor portion 12*b* in a state in which anchor portion fixing member 16 is mounted to the housing 12. Release of the connected state between the connector 100 and the counterpart side connector is prevented as a result thereof.

The connector 100 includes a stopper member 18. In a mounted state of the stopper member 18, the terminal units 14, 15 are prevented from being pulled out from the terminal unit housing portions 12*a* in the minus X direction (connector rear direction).

Terminal Unit 14

Next, description follows regarding the terminal units 14, with reference to FIG. 3 to FIG. 9.

Note that in these drawings an arrow X indicates a unit front direction (axial direction one-side), an arrow Y indicates a unit upward direction, and the arrow Z indicates a unit width direction one-side. Namely, each of the terminal units 14 is disposed in an orientation in which its width direction one-side faces in the connector upward direction.

Figure 6:
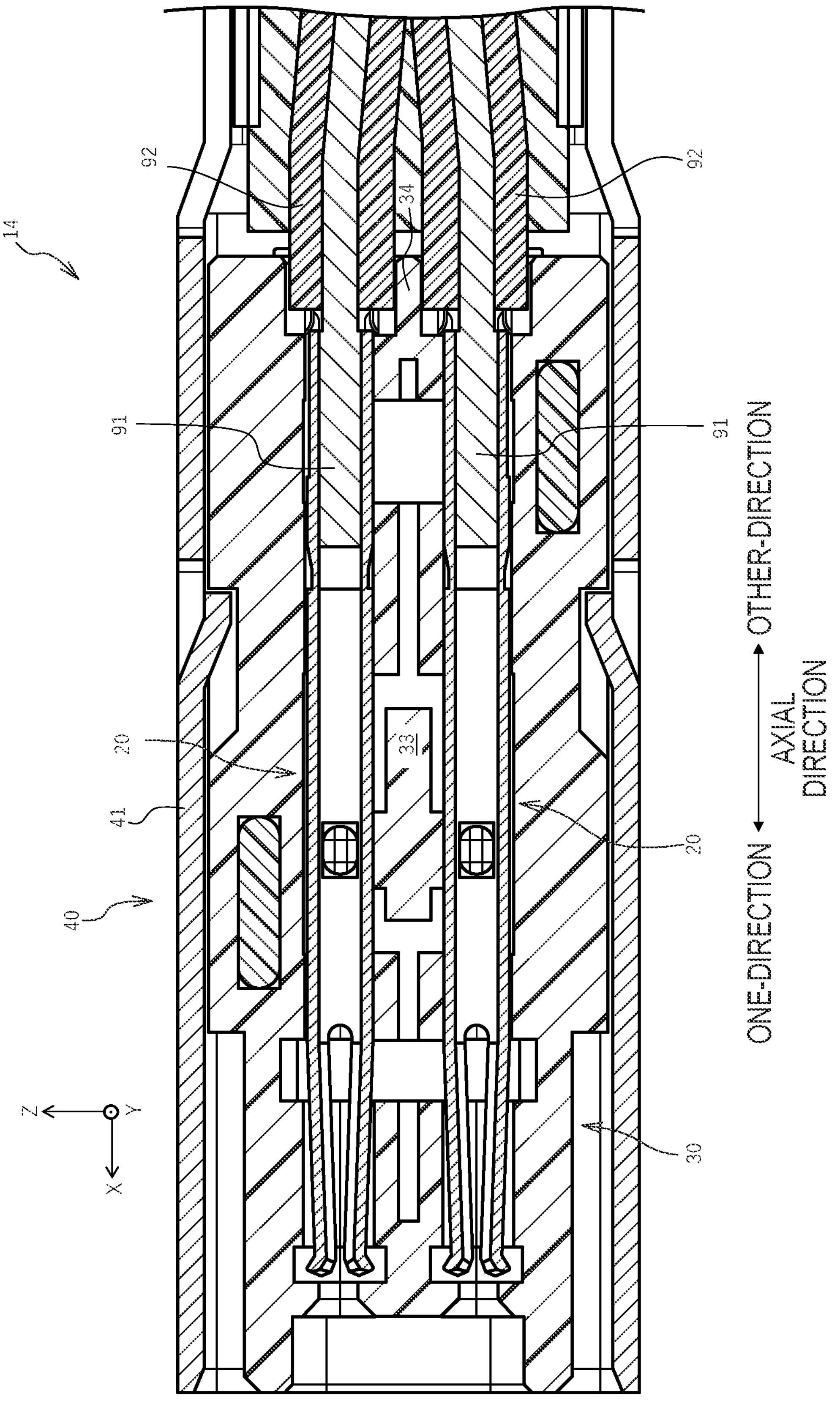
FIG. 6 is a cross-section of a terminal unit (a cross-section perpendicular to a unit up-down direction)

The terminal unit 14 is for mounting to a shield cable 90A that includes two inner conductors 91 (see FIG. 6).

Figure 4:
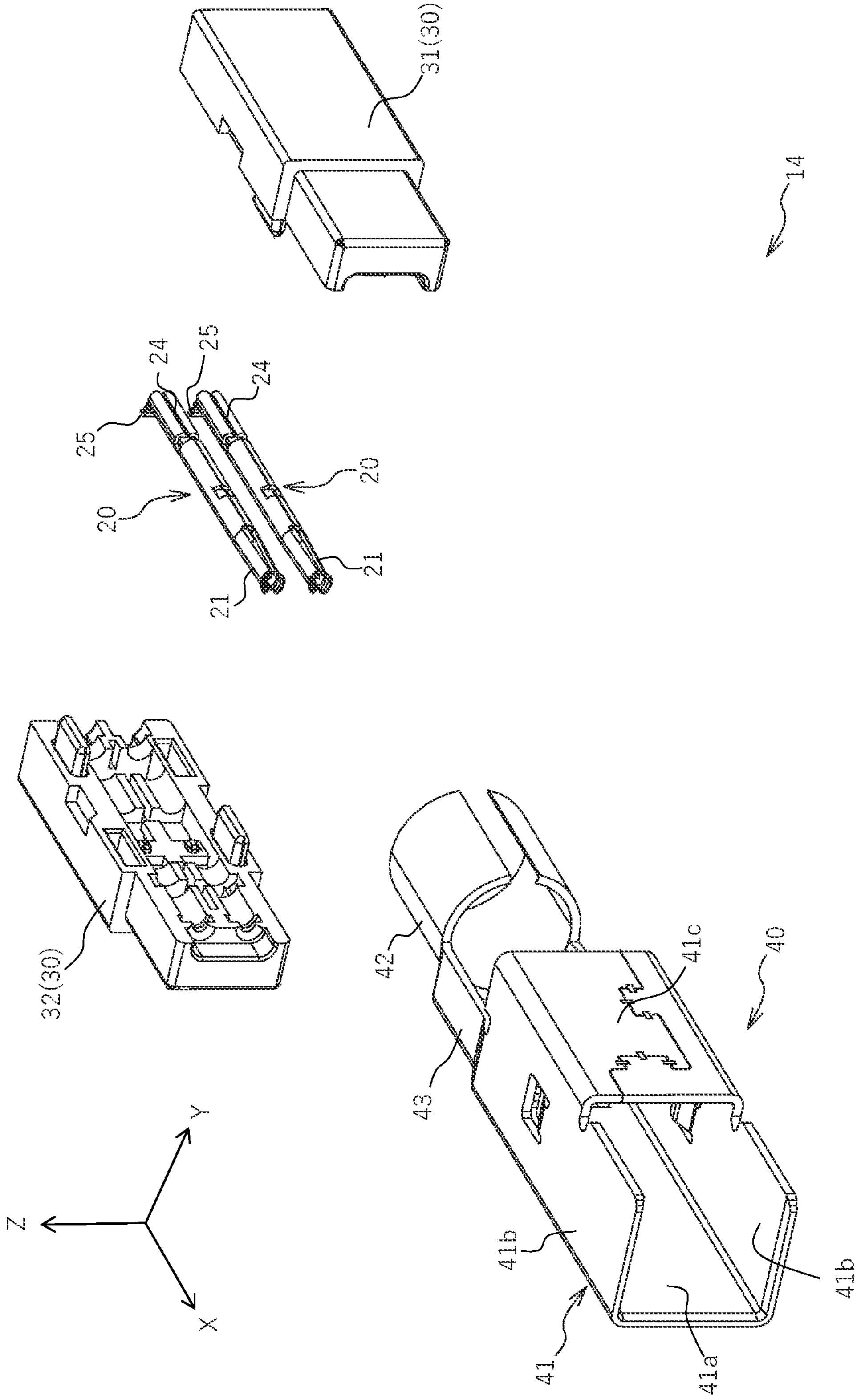
FIG. 4 is an exploded perspective view illustrating a terminal unit.

As illustrated in FIG. 4, the inbuilt terminal units 14 each include two internal terminals 20, a dielectric member 30, and an external terminal 40.

Internal Terminal 20

Figure 5:
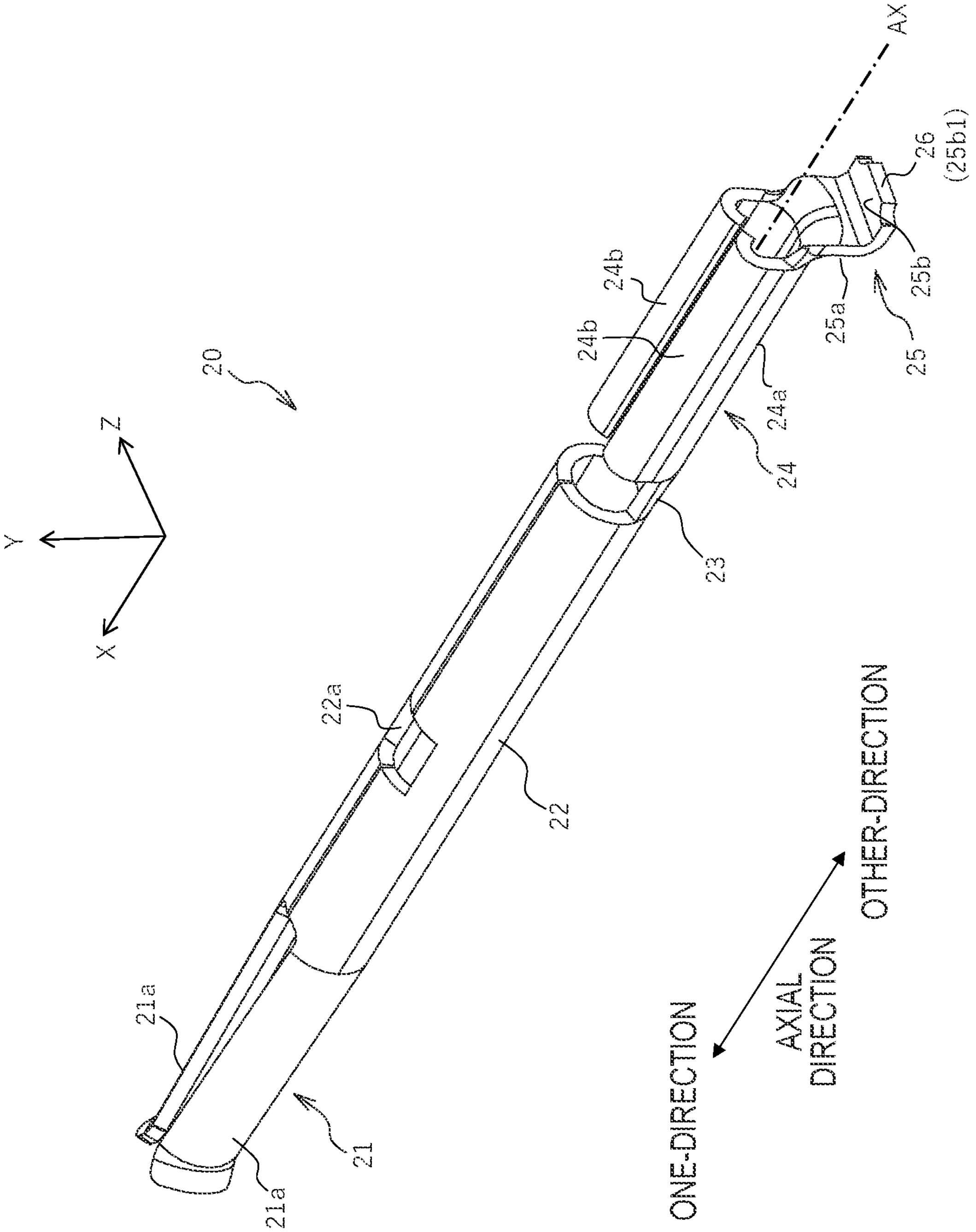
FIG. 5 is a perspective view illustrating an internal terminal.

FIG. 5 illustrates an enlargement of one of the internal terminals 20.

The internal terminals 20 are members for connecting to the inner conductors 91 of the shield cable 90A. The internal terminals 20 are manufactured such as by bending a metal plate material into a tube. The internal terminals 20 have substantially symmetrical structures along the unit width direction (Z direction).

Reference in the following description to a radial direction means a direction perpendicular to a virtual center axis AX parallel to the unit front-rear direction and passing through a center of the internal terminal 20. Radial direction outside means a direction going away from the center axis AX from out of the radial directions.

The internal terminals 20 each include a contact portion 21, a tube portion 22, a coupling portion 23, a press-fit portion 24, and an impedance adjustment section 25, in this order from the front side toward the rear side.

The contact portion 21 is a portion that contacts a signal terminal (not illustrated in the drawings) of the counterpart side connector. The contact portion 21 includes a pair of contact tabs 21*a*. The pair of contact tabs 21*a* contact a connection target (a signal terminal of the counterpart side connector) so as to sandwich the signal terminal from the unit width directions.

The tube portion 22 is a portion formed in a tube shape by bending a plate material. The tube portion 22 has a circular shaped cross-section orthogonal to the front-rear direction. End portions of the plate material are in an abutted state against each other at a position on a unit upper side (plus Y direction side) of the tube portion 22.

An anchor hole 22*a* is formed in the tube portion 22. Relative movement in the front-rear direction of the internal terminal 20 with respect to the dielectric member 30 is restricted by anchor protrusions 36 (see FIG. 7) of the dielectric member 30 being inserted into the anchor holes 22*a*. The anchor holes 22*a* are formed at two locations, on an upper face side (plus Y direction side) and lower face side (minus Y direction side, see FIG. 7) of the tube portion 22.

The coupling portion 23 is a portion that couples the tube portion 22 and the press-fit portion 24 together. More specifically, the coupling portion 23 couples a portion on a lower face side (minus Y direction side) of the tube portion 22 to a bottom plate portion 24*a* of the press-fit portion 24 in the front-rear direction. A cross-section profile (cross-section profile orthogonal to the front-rear direction) of the coupling portion 23 is a substantially circular arc shape.

The press-fit portion 24 is a portion for press-fitting onto the inner conductor 91.

The press-fit portion 24 includes the bottom plate portion 24*a* and a pair of press-fit tabs 24*b*. In a state in which the inner conductor 91 of the shield cable 90A is disposed at an inner face side of the bottom plate portion 24*a*, the pair of press-fit tabs 24*b* are deformed and press contacted against the inner conductor 91 at a vicinity of end portions of the press-fit tabs 24*b*. The press-fit portion 24 is thereby press-fitted onto the inner conductor 91, and the inner conductor 91 and the internal terminal 20 are connected together electrically.

The press-fit portion 24 includes a cross-section structure that is substantially uniform along the front-rear direction.

The impedance adjustment section 25 is a portion connected to the press-fit portion 24. A capacitance of the press-fit portion 24 is increased and the impedance of the press-fit portion 24 is lowered by providing the impedance adjustment section 25.

The impedance adjustment section 25 extends from a rear end portion of the bottom plate portion 24*a* of the press-fit portion 24. The impedance adjustment section 25 includes a radial direction extension portion 25*a* and a front-rear direction extension portion 25*b*.

The radial direction extension portion 25*a* is a portion connected to the bottom plate portion 24*a* of the press-fit portion 24 through a bent portion, and is a portion that extends toward the radial direction outside.

More specifically, the radial direction extension portion 25*a* has a plate thickness direction facing in the X direction (unit front-rear direction). The radial direction extension portion 25*a* has a width direction facing in the Z direction (unit width direction), and extends toward the radial direction outside (more specifically, unit lower side, minus Y direction). A width dimension of the radial direction extension portion 25*a* (unit width direction dimension) is preferably not less than 50% of the width dimension of the press-fit portion 24, and is more preferably not less than 80% thereof. The width dimension of the press-fit portion 24 referred to here means the width dimension in a state in which the press-fit portion 24 is press-fitted onto the inner conductor 91.

The front-rear direction extension portion 25*b* is a portion connected to the radial direction extension portion 25*a* through a bent portion, and is a portion extending toward the rear side (minus X direction).

More specifically, the front-rear direction extension portion 25*b* has a plate thickness direction facing in the unit up-down direction (Y direction). The front-rear direction extension portion 25*b* has a width direction facing in the unit width direction (Z direction), and extends toward the rear side (minus X direction). The width dimension of the front-rear direction extension portion 25*b* is preferably not less than 50% of the width dimension of the press-fit portion 24, and is more preferably not less than 80% thereof. In the present exemplary embodiment, the width dimension of the front-rear direction extension portion 25*b* is substantially the same as the width dimension of the radial direction extension portion 25*a*.

Figure 7:
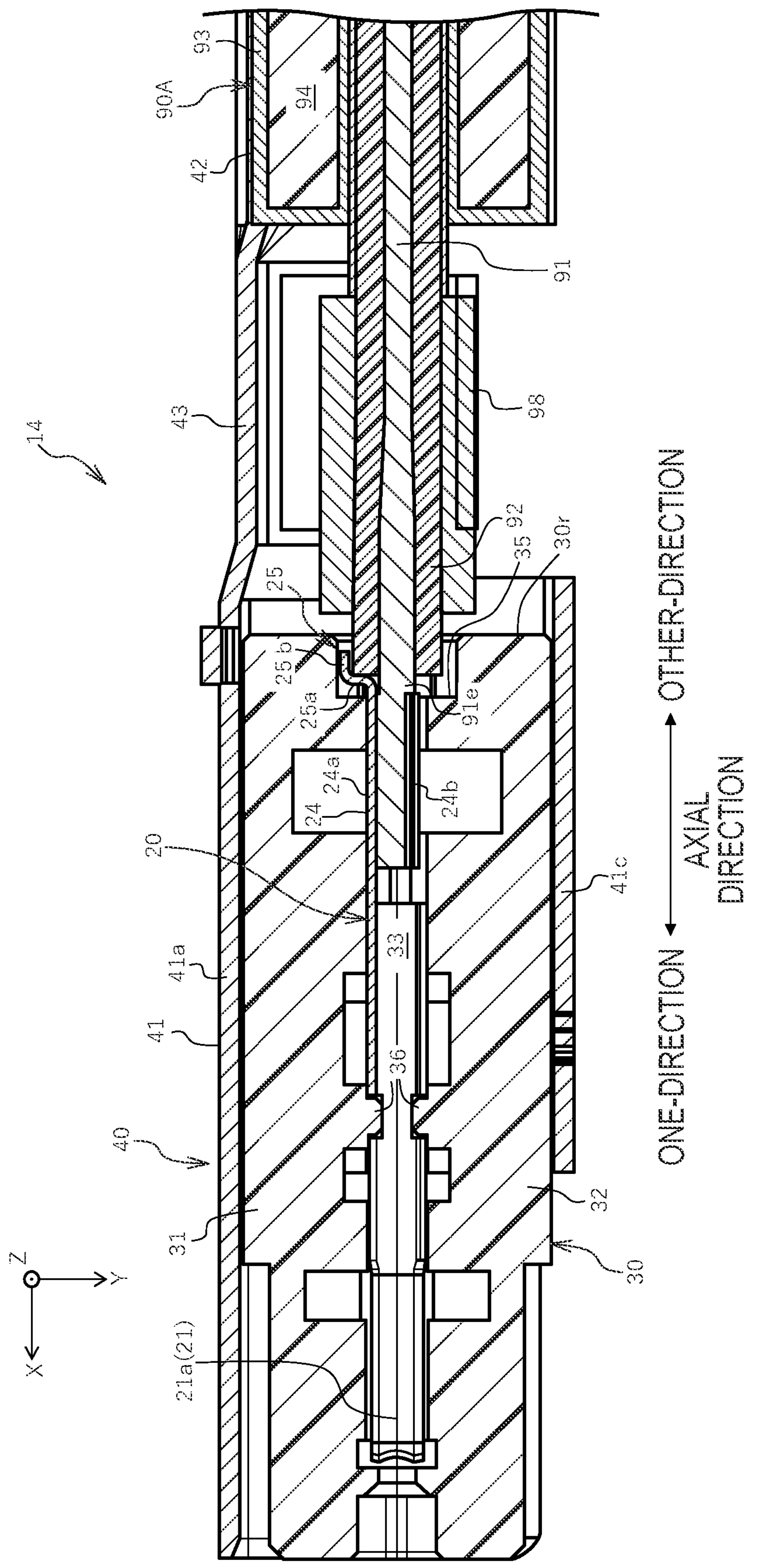
FIG. 7 is a cross-section of a terminal unit (a cross-section perpendicular to a unit width direction)

The front-rear direction extension portion 25*b* is disposed so as to be alongside a vicinity of an outer face of an insulating cover 92 of the shield cable 90A. As illustrated in FIG. 7, in a state in which the internal terminal 20 is mounted to the shield cable 90A, a gap between the front-rear direction extension portion 25*b* and the insulating cover 92 (a gap in the unit up-down direction in the present exemplary embodiment) is preferably smaller than a plate thickness of the front-rear direction extension portion 25*b*. Moreover, in a state in which the internal terminal 20 is mounted to the shield cable 90A, the insulating cover 92 is preferably in a state of contact with or of close proximity to the radial direction extension portion 25*a* of the impedance adjustment section 25.

The other end portion 25*b*1 of the front-rear direction extension portion 25*b* is a carrier severance portion 26. The carrier severance portion 26 is a portion that is finally severed from a carrier when the internal terminal 20 is manufactured using a progressive manufacturing process.

Dielectric Member 30

The dielectric member 30 is a member that retains the two internal terminals 20.

As illustrated in FIG. 4, the dielectric member 30 includes a first member 31 and a second member 32. The dielectric member 30 is configured by combining the first member 31 and the second member 32 in the unit up-down direction (Y direction).

As illustrated in FIG. 6 and FIG. 7, a housing space 33 for housing the internal terminal 20 is formed inside the dielectric member 30. The cross-section profile of the housing space 33 changes depending on position in the front-rear direction thereof.

The cross-section profile of the housing space 33 at a position corresponding to the rear end portion of the press-fit portion 24 (a portion adjoining the impedance adjustment section 25) is a profile conforming to an external profile of the press-fit portion 24 (more specifically is a circular shape). The rear end portion of the press-fit portion 24 of the internal terminal 20 is thereby configured so as not to be misplaced in radial direction position with respect to the dielectric member 30. Namely, the housing space 33 of one of the internal terminals 20 and the housing space 33 of the other internal terminal 20 are separated at this position, and a partition wall 34 (see FIG. 6) is interposed between the one internal terminal 20 and the other internal terminal 20.

Note that the size of the cross-section of the press-fit portion 24 readily varies in a state press-fitted onto the inner conductor 91. Thus the housing space 33 is formed with ample allowance for such conceivably occurring variation so as to enable housing at the position corresponding to the rear end portion of the press-fit portion 24.

However, as a result thereof, a certain level of gap appears between the press-fit portion 24 and the dielectric member 30, and so the impedance of the press-fit portion 24, or of an exposed portion 91*e* of the inner conductor 91, is not able to be sufficiently lowered using the dielectric member 30 alone.

The cross-section profile of the housing space 33 at a position corresponding to further toward the front side than the rear end portion of the press-fit portion 24 is enlarged in the unit up-down direction (Y direction) compared to the position corresponding to the rear end portion of the press-fit portion 24 (the portion adjoining the impedance adjustment section 25) (see FIG. 7). The housing space 33 of the one internal terminal 20 and the housing space 33 of the other internal terminal 20 are coupled together (see FIG. 6).

The cross-section profile of the housing space 33 at the position corresponding to the impedance adjustment section 25 is enlarged in the radial direction compared to at the position corresponding to the rear end portion of the press-fit portion 24 (the portion adjoining the impedance adjustment section 25). This thereby enables a size to be achieved that enables placement of the impedance adjustment section 25 and part (a front end portion) of the insulating cover 92. Looking at it another way, as illustrated in FIG. 7, this could be described as there being an indentation 35 having a depth direction toward the front side being provided to a rear face 30*r* of the dielectric member 30, with the indentation 35 being formed for placement of the impedance adjustment section 25 and part of (a front side portion) of the insulating cover 92 therein. The impedance adjustment section 25 is thereby not in a state projecting toward the rear side from the dielectric member 30 and is in a state surrounded by the dielectric member 30. At this position the housing space 33 of the one internal terminal 20 and the housing space 33 of the other internal terminal 20 are separated, with the partition wall 34 interposed between the one internal terminal 20 and the other internal terminal 20.

The dielectric member 30 includes the anchor protrusions 36. The anchor protrusions 36 are formed respectively to the first member 31 and the second member 32. The anchor protrusions 36 are disposed in the anchor holes 22*a* of the internal terminals 20.

External Terminal 40

The external terminal 40 is a member for connecting to an external conductor 93 and houses the dielectric member 30.

The external terminal 40 is manufactured by fold-bending a metal plate material or the like.

As illustrated in FIG. 4, the external terminal 40 includes a main body 41, an external conductor connection portion 42, and a coupling portion 43.

The main body 41 includes a first plate portion 41*a*, and a pair of second plate portions 41*b*.

The first plate portion 41*a* has a rectangular flat plate shape with a plate thickness direction facing in the unit up-down direction (Y direction). Each of the pair of second plate portions 41*b* has a rectangular flat plate shape with a plate thickness direction facing in the unit width direction (Z direction). The pair of second plate portions 41*b* are connected to the first plate portion 41*a* through bent portions.

The main body 41 includes a third plate portion 41*c*. The third plate portion 41*c* couples upper ends (plus Y direction ends) of the pair of second plate portions 41*b* together in the unit width direction. The third plate portion 41*c* has a rectangular flat plate shape with a plate thickness direction facing in the unit up-down direction (Y direction). The third plate portion 41*c* is formed by combining a pair of plate portions extending from the pair of the second plate portions 41*b*. An end at the front side of the third plate portion 41*c* is formed further toward the rear side than front side ends of the first plate portion 41*a* and the pair of second plate portions 41*b*.

Figure 8:
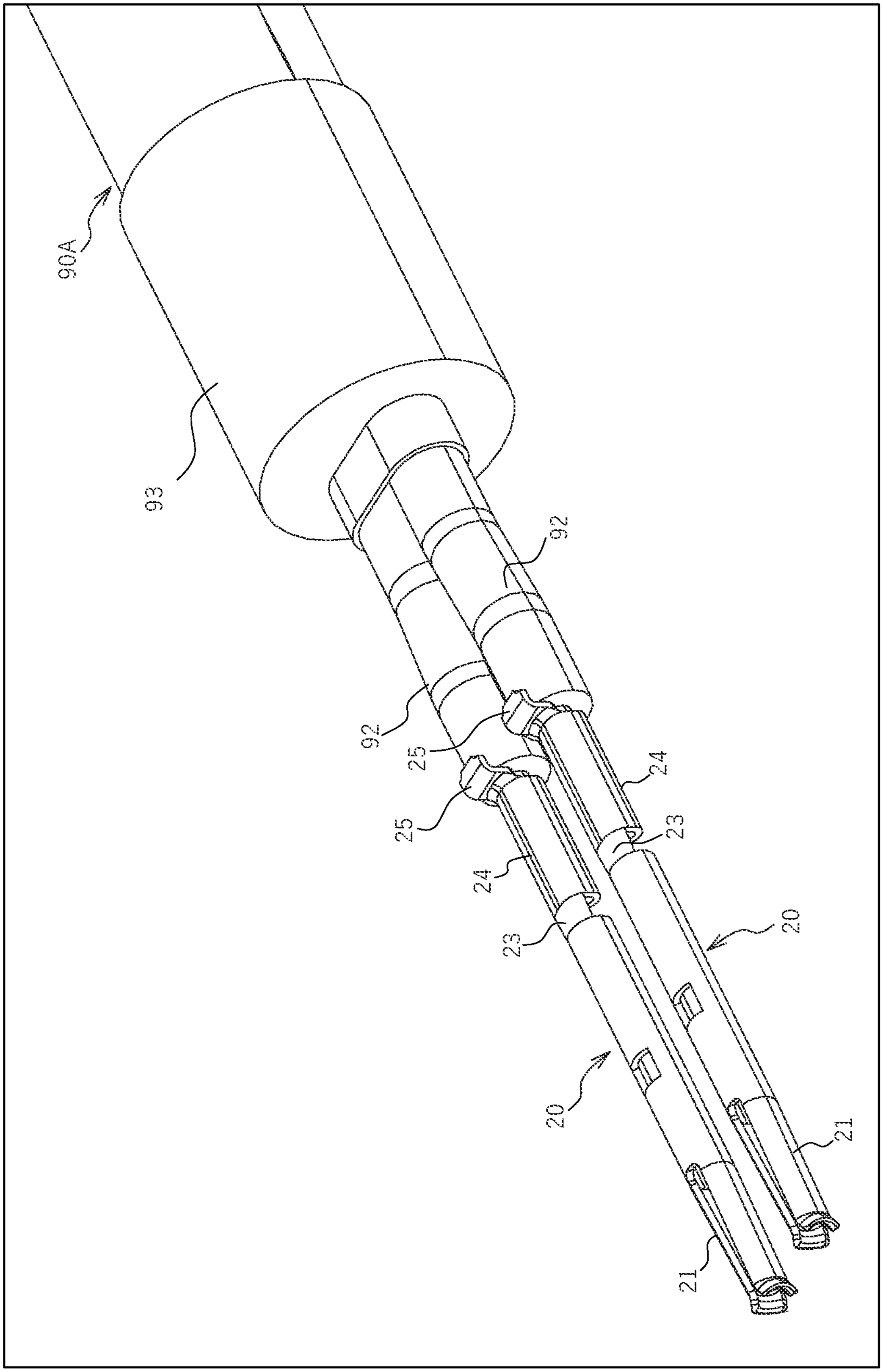
FIG. 8 is a perspective view of a terminal unit and illustrates a state mounted to a shield cable with an external terminal and a dielectric member omitted.

The external conductor connection portion 42 is a portion for connecting to the external conductor 93 of the shield cable 90A. Note that, as illustrated in FIG. 7 and FIG. 8, the external conductor 93 of the shield cable 90A is folded back at a vicinity of an extreme end of the shield cable 90A and overlaps at an outside of an outside covering 94, with the external conductor connection portion 42 being connected at the folded back portion.

The coupling portion 43 is a portion coupling the main body 41 and the external conductor connection portion 42 together in the X direction. A cross-section profile of the coupling portion 43 is a substantially U-shape open toward the plus Y direction.

Figure 3:
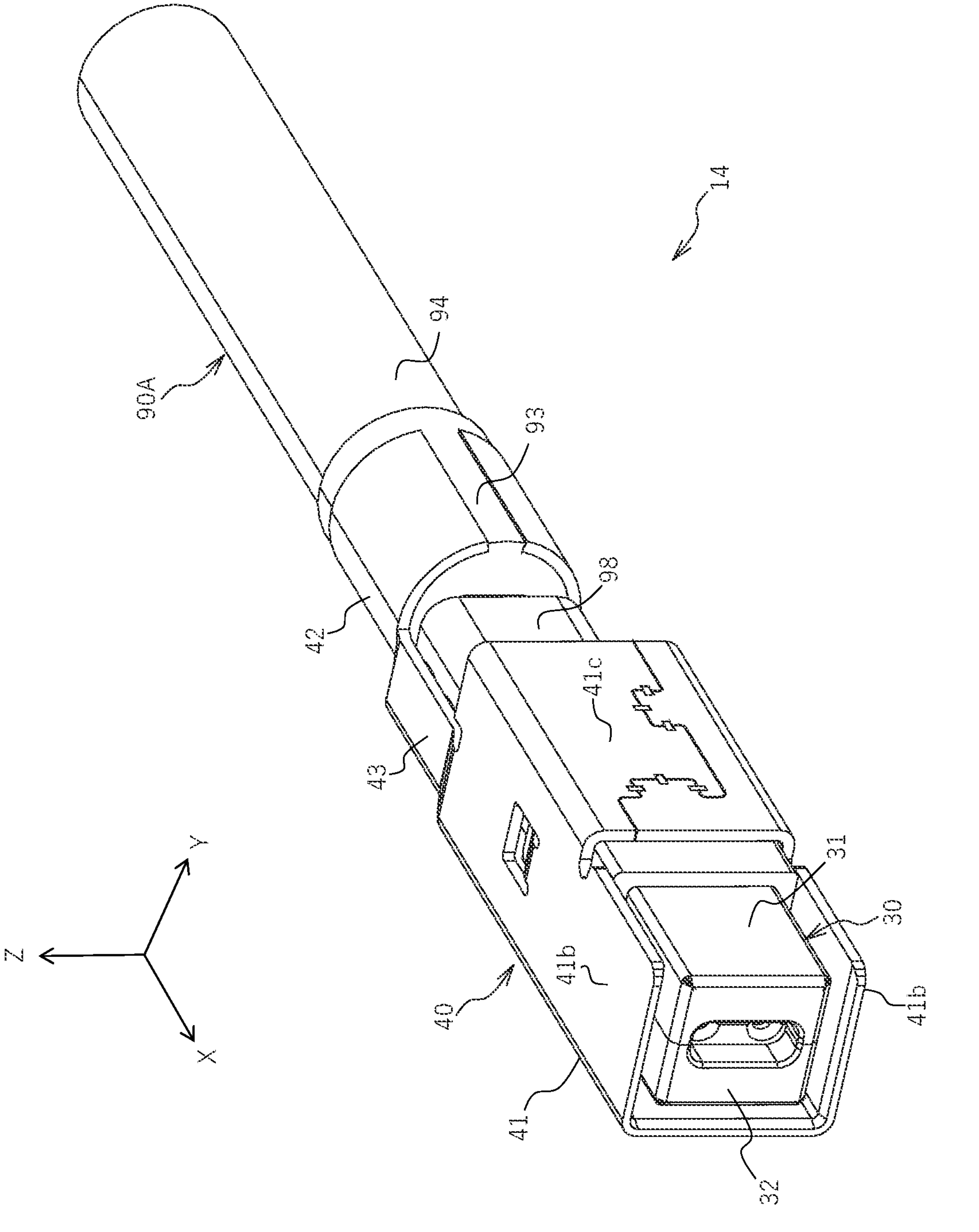
FIG. 3 is a perspective view illustrating a terminal unit.

Note that the inbuilt terminal units 14 each include an additional shield member 98 (see FIG. 3 and FIG. 7). The additional shield member 98 is a member extending in the X direction, and has a substantially U-shaped cross-section profile open in the minus Y direction. The two inner conductors 91 (and the two insulating covers 92) of the shield cable 90A are collectively surrounded in a circumferential direction by a combination of the coupling portion 43 and the additional shield member 98.

Terminal Unit 15

Next, description follows regarding the terminal units 15, with reference to FIG. 12 to FIG. 19).

Note that the arrow X in each of these drawings indicates a unit front direction (axial direction one-side), an arrow Y indicates a unit upward direction, and the arrow Z indicates a unit width direction one-side. Namely, each of the terminal units 15 is disposed in an orientation in which its width direction one-side faces in the connector upward direction.

Figure 12:
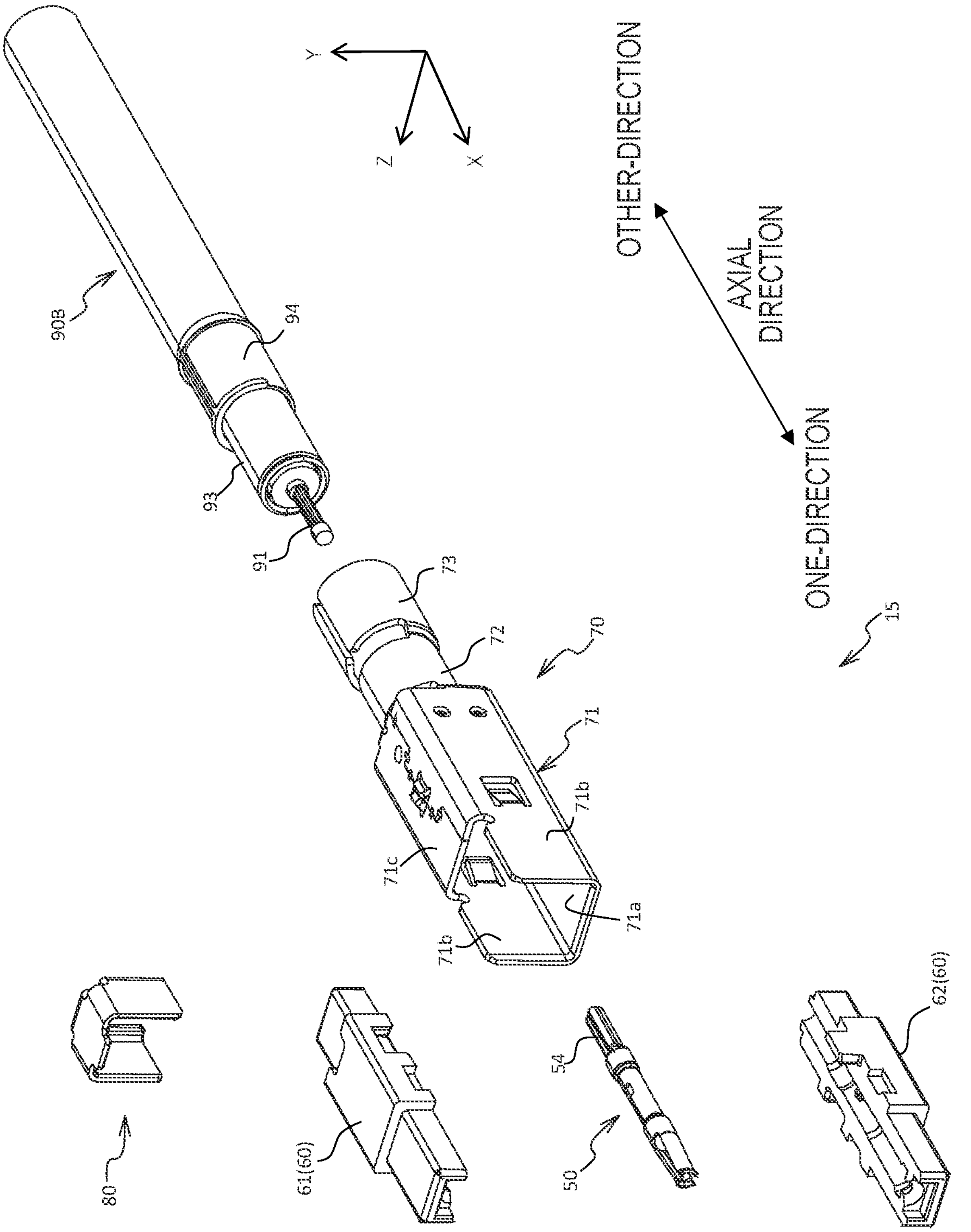
FIG. 12 is an exploded perspective view illustrating a terminal unit.

The terminal units 15 differ from the terminal units 14 in that they are mounted to shield cables 90B that each include a single inner conductor 91 (see FIG. 12).

As illustrated in FIG. 12, the terminal units 15 each include an internal terminal 50, a dielectric member 60, an external terminal 70, and an impedance adjustment member 80.

Internal Terminal 50

Figure 13:
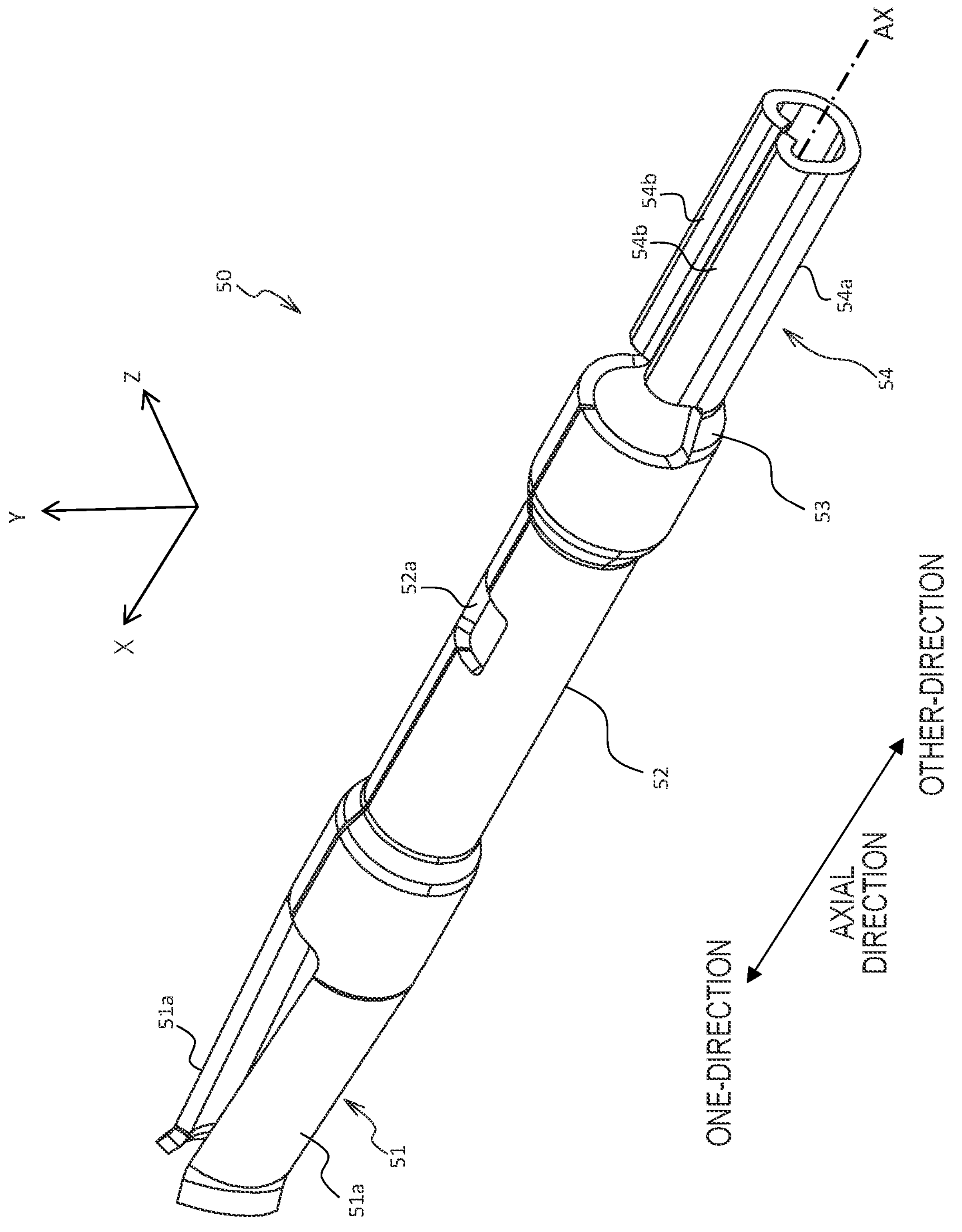
FIG. 13 is a perspective view illustrating an internal terminal.

FIG. 13 illustrates an enlargement of the internal terminal 50.

The internal terminal 50 is a member for connecting to the inner conductor 91 of the shield cable 90B. The internal terminal 50 is manufactured by bending a metal plate material into a tube shape or the like. The internal terminal 50 has a substantially symmetrical structure in the unit width direction (Z direction).

Note that reference in the following description to a radial direction means a direction perpendicular to a virtual center axis AX parallel to the unit front-rear direction and passing through a center of the internal terminal 50. The radial direction outside means a direction going away from the center axis AX from out of the radial directions.

The internal terminals 50 each include a contact portion 51, a tube portion 52, a coupling portion 53, and a press-fit portion 54 provided in this order from the front side toward the rear side. Note that the internal terminal 50 differs from the internal terminal 20 in not including an impedance adjustment section 25 (see FIG. 5).

The contact portion 51 is a portion for contacting a signal terminal (not illustrated in the drawings) of the counterpart side connector. The contact portion 51 includes a pair of contact tabs 51*a*. The pair of contact tabs 51*a* contact a connection target (a signal terminal of the counterpart side connector) so as to sandwich the signal terminal from the unit width direction.

The tube portion 52 is a portion formed in a tube shape by bending a plate material. The tube portion 52 has a circular shaped cross-section orthogonal to the front-rear direction. End portions of the plate material are in an abutted state against each other at a position on a unit upper side (plus Y direction side) of the tube portion 52.

Anchor holes 52*a* are formed in the tube portion 52. Relative movement in the front-rear direction of the internal terminal 50 with respect to the dielectric member 60 is restricted by anchor protrusions 66 (see FIG. 18) of the dielectric member 60 being inserted into the anchor holes 52*a*. The anchor holes 52*a* are formed at two locations, on an upper face side (plus Y direction side) and lower face side (minus Y direction side, see FIG. 18) of the tube portion 52.

An intermediate portion of the tube portion 52 has an external diameter smaller than at a front portion and a rear portion of the tube portion 52. The two anchor holes 52*a* are formed in the intermediate portion of the tube portion 52.

The coupling portion 53 is a portion that couples the tube portion 52 and the press-fit portion 54 together. More specifically, the coupling portion 53 couples a portion on a lower face side (minus Y direction side) of the tube portion 52 to a bottom plate portion 54*a* of the press-fit portion 54 in the front-rear direction. A cross-section profile (cross-section profile orthogonal to the front-rear direction) of the coupling portion 53 is a substantially circular arc shape.

The press-fit portion 54 is a portion press-fitted onto the inner conductor 91 of the shield cable 90B.

The press-fit portion 54 includes the bottom plate portion 54*a* and a pair of press-fit tabs 54*b*. In a state in which the inner conductor 91 of the shield cable 90B is disposed at an inner face side of the bottom plate portion 54*a*, the pair of press-fit tabs 54*b* are deformed and press contacted against the inner conductor 91 at a vicinity of end portions of the press-fit tabs 54*b*. The press-fit portion 54 is thereby press-fitted onto the inner conductor 91, and the inner conductor 91 and the internal terminal 50 are connected together electrically.

The press-fit portion 54 has a cross-section structure that is substantially uniform along the front-rear direction.

Dielectric Member 60

The dielectric member 60 is a member that retains the internal terminal 50.

As illustrated in FIG. 12, the dielectric member 60 includes a first member 61 and a second member 62. The dielectric member 60 is configured by combining the first member 61 and the second member 62 in the unit up-down direction (Y direction).

Figure 18:
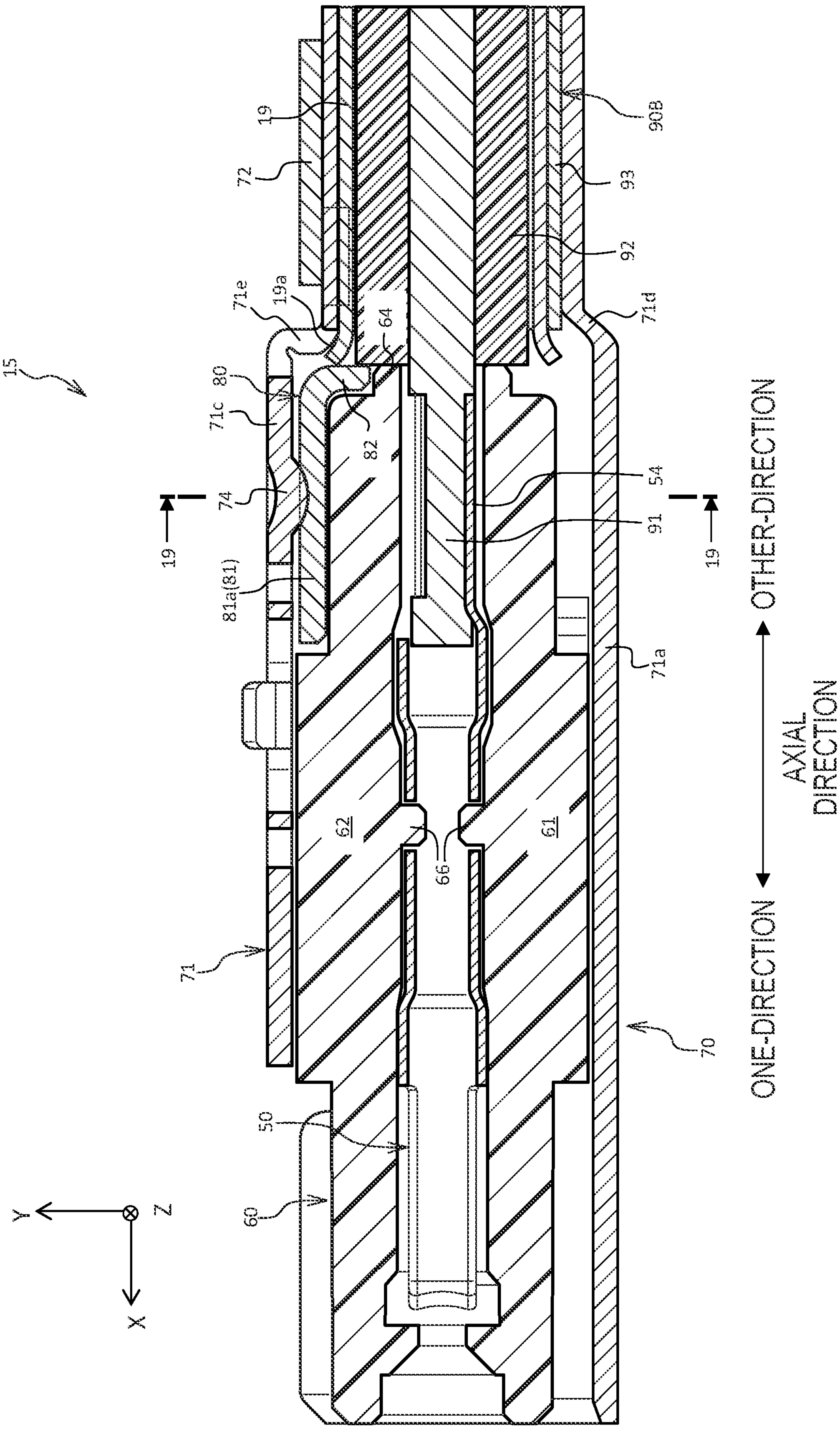
FIG. 18 is a cross-section taken along a front-rear direction of a terminal unit.
Figure 19:
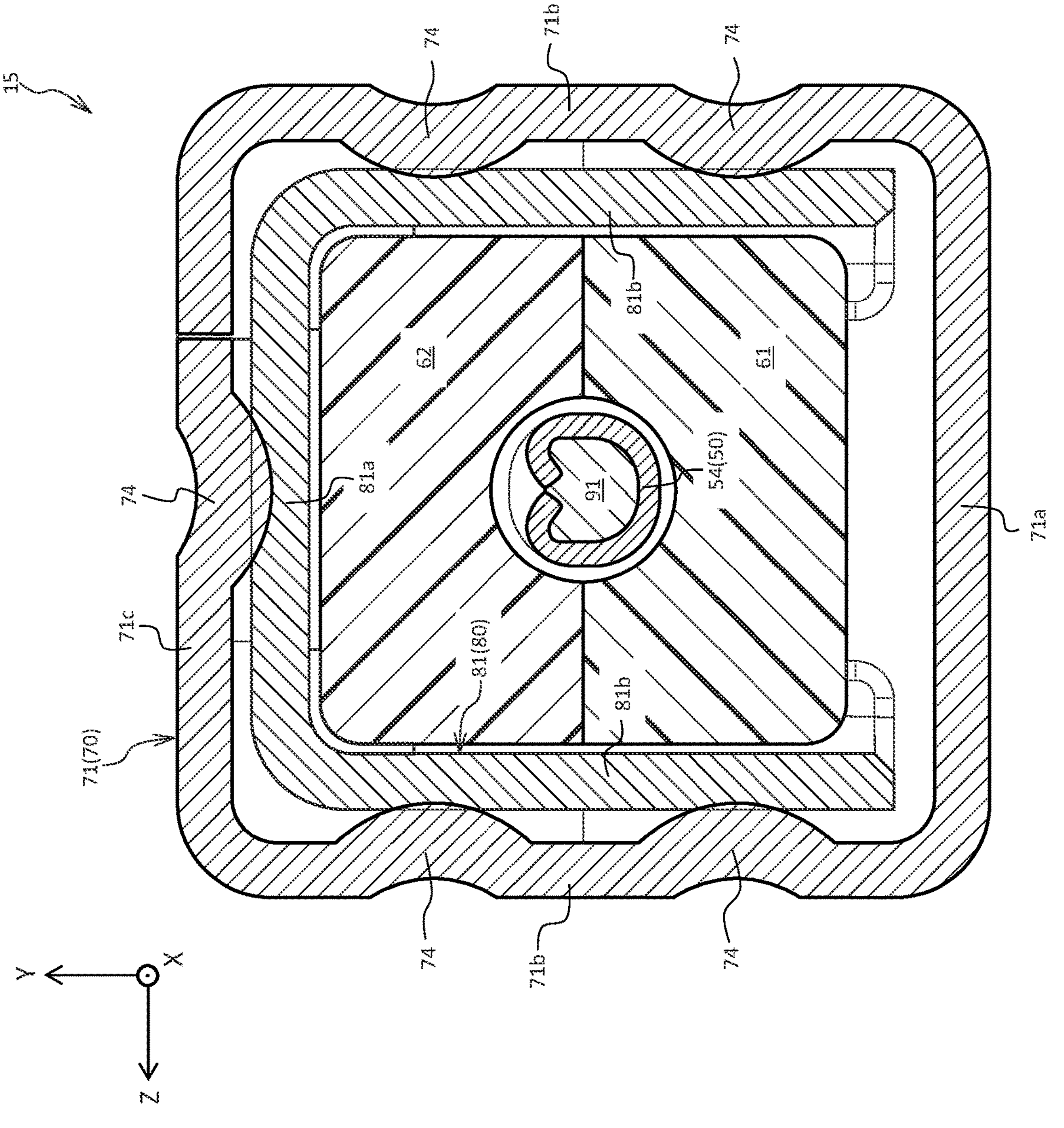
FIG. 19 is a cross-section orthogonal to a front-rear direction of a terminal unit (a cross-section along line 19-19 of FIG. 18)

As illustrated in FIG. 18 and FIG. 19, a space for housing the internal terminal 50 is formed inside the dielectric member 60. The cross-section profile of the space for housing the internal terminal 50 has a profile substantially conforming to an external profile of the internal terminal 50.

As illustrated in FIG. 18, the dielectric member 60 includes the anchor protrusions 66. The anchor protrusions 66 are formed respectively to the first member 61 and the second member 62. The anchor protrusions 66 are disposed in the anchor holes 52*a* of the internal terminals 50 (see FIG. 13).

Figure 14:
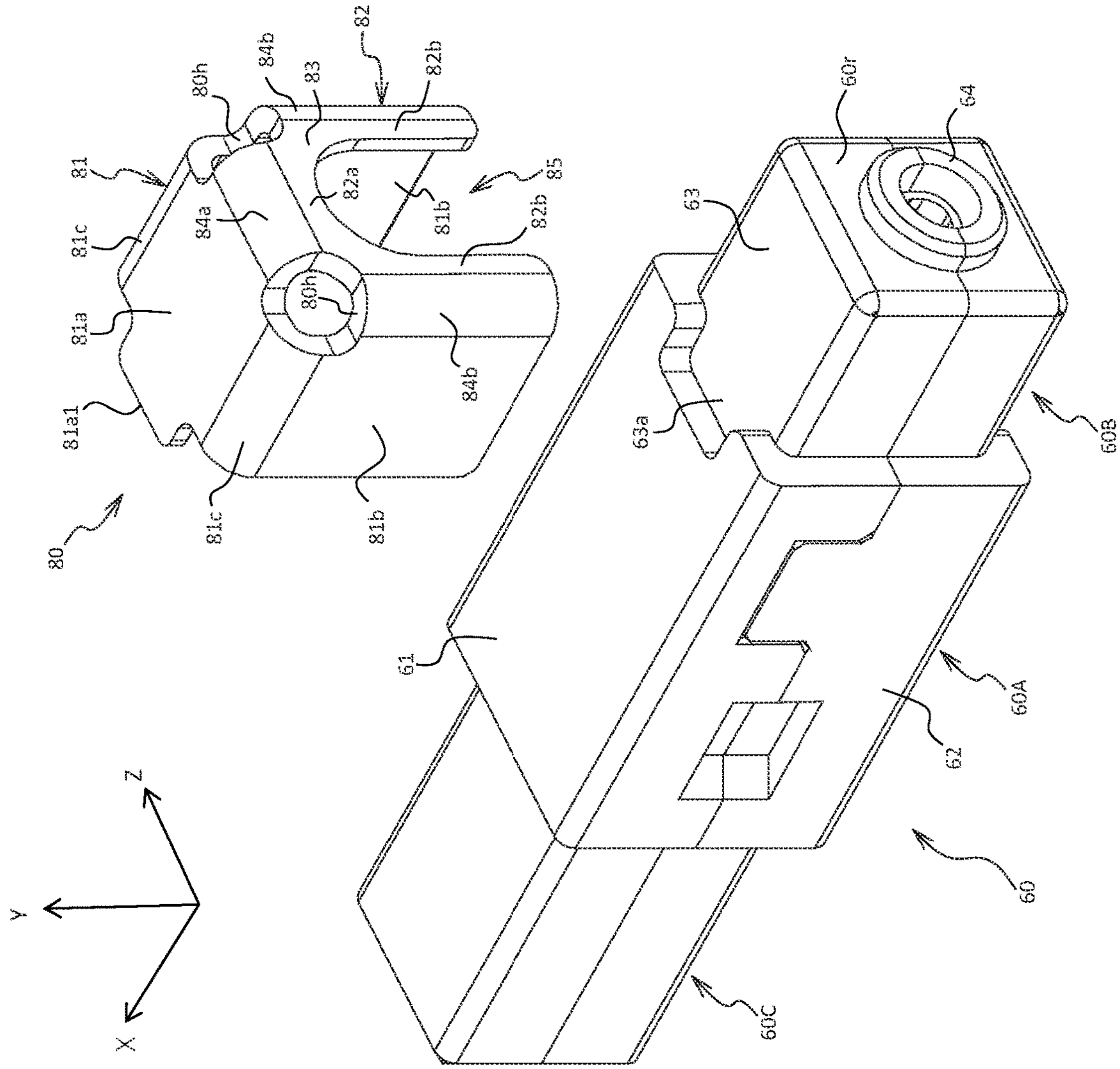
FIG. 14 is a perspective view illustrating a dielectric member and an impedance adjustment member.

As illustrated in FIG. 14, a placement indentation 63 for placement of the impedance adjustment member 80 is formed in an outer face of the dielectric member 60.

The placement indentation 63 is formed to a rear portion 60B of the dielectric member 60. Due to forming the placement indentation 63, the rear portion 60B of the dielectric member 60 has a cross-section profile (cross-section profile perpendicular to the front-rear direction) that is smaller than that of an intermediate portion 60A, which is a general portion. More specifically, the placement indentation 63 is formed spanning an entire periphery of an upper face of the outer face of the dielectric member 60, a pair of side faces thereof (faces facing toward the unit width direction outside), and a lower face thereof. However, depending on a profile of the impedance adjustment member 80 of the present exemplary embodiment, a portion of the placement indentation 63 corresponding to a lower face of the dielectric member 60 may be omitted.

Note that a front portion 60C of the dielectric member 60 in the present exemplary embodiment has a smaller cross-section profile than that of the intermediate portion 60A (general portion).

The placement indentation 63 includes a projection tab placement portion 63*a*. The projection tab placement portion 63*a* is a portion where a projection tab 81*al* of the impedance adjustment member 80, described later, is disposed, and is a portion enlarged toward the front side compared to other portions of the placement indentation 63. The projection tab placement portion 63*a* is formed to an upper face side of the dielectric member 60.

The dielectric member 60 includes a tubular projection section 64.

The tubular projection section 64 projects in a tubular shape toward the rear side from a rear face 60*r* of the dielectric member 60. The tubular projection section 64 is placed between a lid portion 82 of the impedance adjustment member 80 and the inner conductor 91 (see FIG. 18). This enables shorting between the impedance adjustment member 80 and the inner conductor 91 to be prevented, and enables the impedance at this location to be lowered.

Impedance Adjustment Member 80

The impedance adjustment member 80 is a member for adjusting impedance of the press-fit portion 54. The impedance adjustment member 80 is configured by a conductive member. The impedance adjustment member 80 is formed as a separate body from the internal terminal 50 and the external terminal 70.

As illustrated in FIG. 14, the impedance adjustment member 80 includes a front-rear direction extension portion 81 having plate thickness directions facing in directions along a plane (YZ plane) perpendicular to the front-rear direction and extending in the front-rear direction (X direction), and includes a lid portion 82 having plate thickness directions facing in directions intersecting with a plane (YZ plane) perpendicular to the front-rear direction.

The front-rear direction extension portion 81 includes a pair of opposing plate portions 81*b* opposing each other so as to sandwich the internal terminal 50, and a coupling plate portion 81*a* that couples the pair of opposing plate portions 81*b* together. A pair of bent portions 81*c* formed by bending a plate material are formed between the pair of opposing plate portions 81*b* and the coupling plate portion 81*a*. The bent portions 81*c* extend in the front-rear direction (X direction).

The lid portion 82 includes a flat plate portion 83 having a plate thickness direction facing in a direction orthogonal to a plane (YZ plane) perpendicular to the front-rear direction (namely, facing in the front-rear direction), and includes connection bent portions 84*a*, 84*b* connecting the flat plate portion 83 and the front-rear direction extension portion 81 together.

The connection bent portions 84*a*, 84*b* include a pair of first bent portions 84*b* for connecting the flat plate portion 83 and the pair of opposing plate portions 81*b* together, and a second bent portion 84*a* for connecting the flat plate portion 83 and the coupling plate portion 81*a* together. The first bent portions 84*b* extend in the unit up-down direction (Y direction), and the second bent portion 84*a* extends in the unit width direction (Z direction).

A pass through portion 85 is formed in the lid portion 82 to let the inner conductor 91 pass through in the front-rear direction, with the pass through portion 85 being open in a one-direction (the minus Y direction that is a unit downward direction in the present exemplary embodiment) perpendicular to the front-rear direction. This results in a configuration in which the lid portion 82 includes a pair of side plate portions 82*b* disposed so as to sandwich the inner conductor 91, and an upper plate portion 82*a* that couples the pair of side plate portions 82*b* together. The pass through portion 85 is formed between the pair of side plate portions 82*b*. The first bent portions 84*b* belong to the side plate portions 82*b*, and the second bent portion 84*a* belongs to the upper plate portion 82*a*.

A pair of through holes 80*h* are formed between the pair of first bent portions 84*b* and the second bent portion 84*a*. This thereby enables easy manufacture of the impedance adjustment member 80.

The projection tab 81*a*1 for placing in the projection tab placement portion 63*a* of the dielectric member 60 is formed to the front-rear direction extension portion 81. Adopting such an approach prevents mistakes in the placement direction of the impedance adjustment member 80 with respect to the dielectric member 60 (placement from the unit upper direction side in the present exemplary embodiment). Note that the cross-section profile (cross-section profile perpendicular to the front-rear direction) of the rear portion 60B of the dielectric member 60 is a substantially square shape in the present exemplary embodiment.

External Terminal 70

Figure 15:
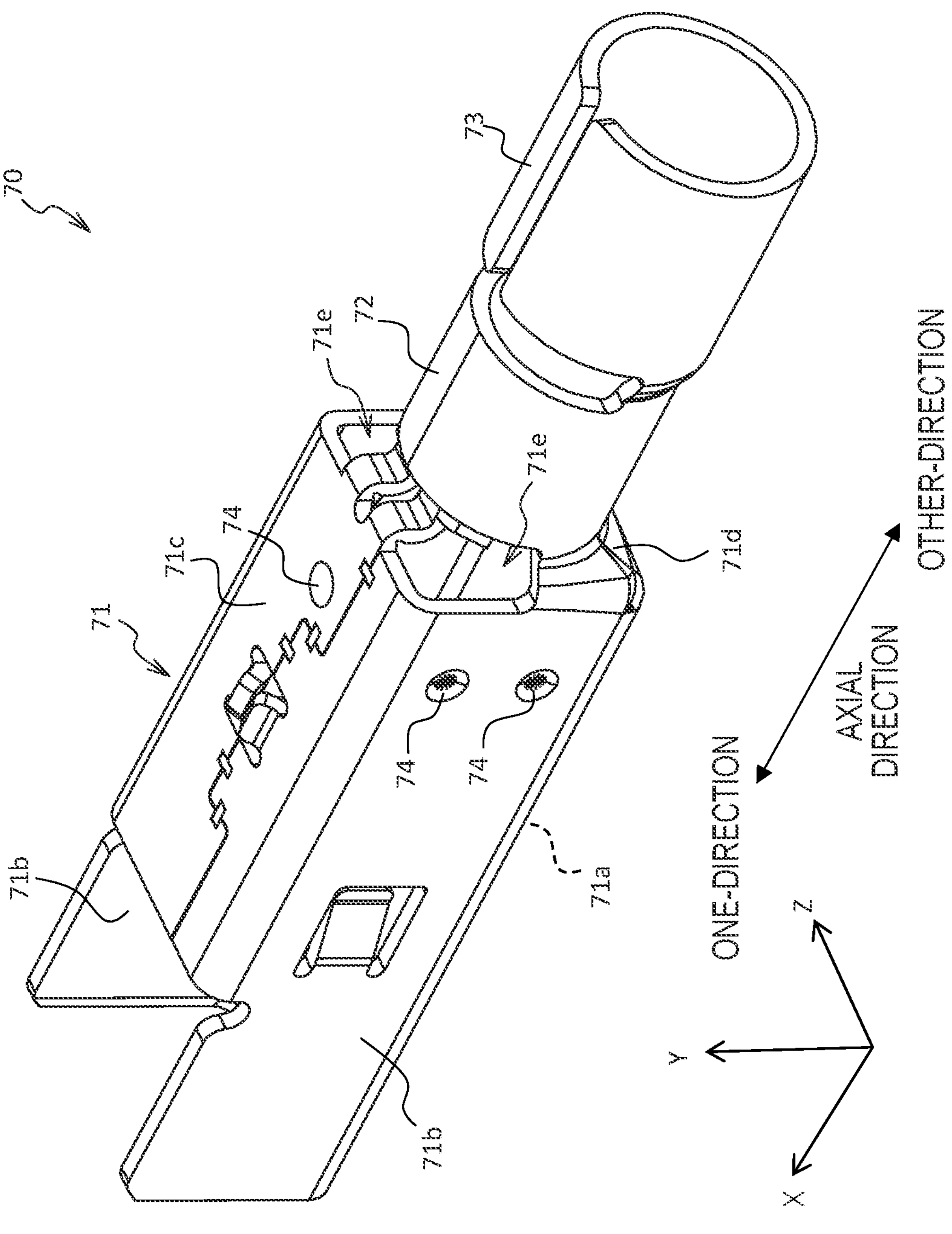
FIG. 15 is a perspective view illustrating an external terminal.
Figure 16:
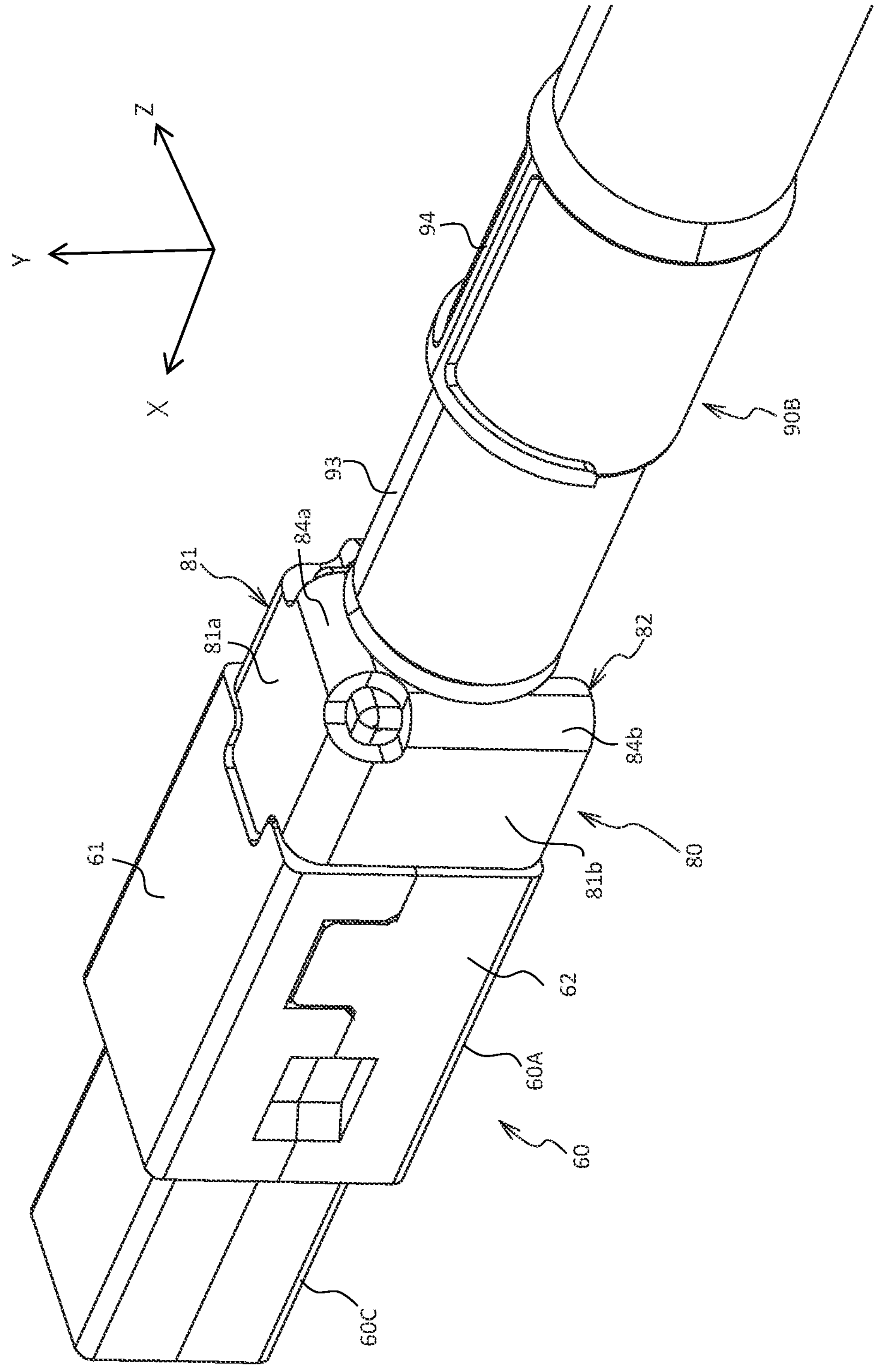
FIG. 16 is perspective view illustrating a terminal unit with an external conductor omitted.
Figure 17:
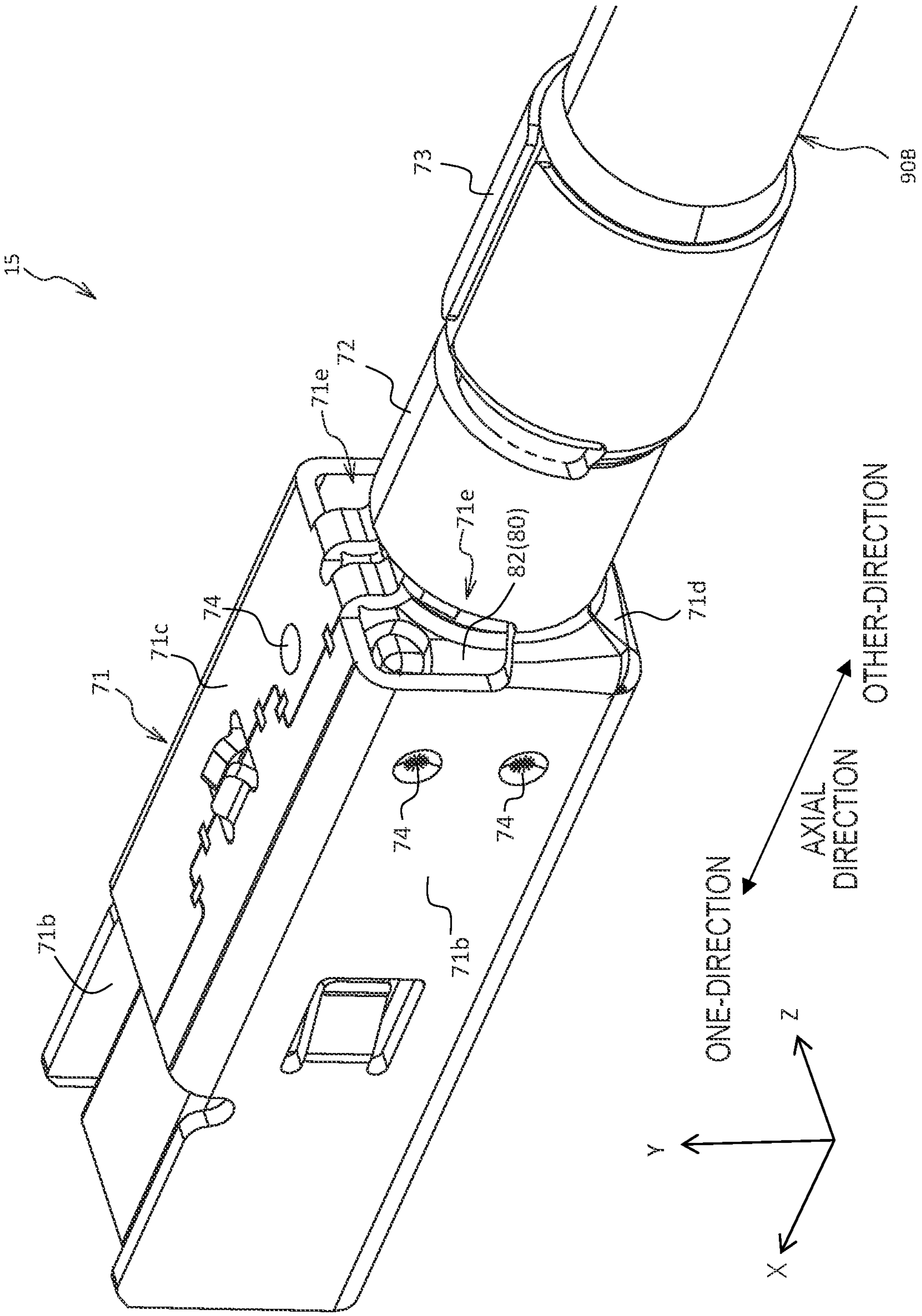
FIG. 17 is a perspective view of a terminal unit.

FIG. 15 is a perspective view of the external terminal 70.

The external terminal 70 is a member connected to the external conductor 93 of the shield cable 90B (see FIG. 12) and is for housing the internal terminal 50, the dielectric member 60, and the impedance adjustment member 80. The external terminal 70 is manufactured by bending a metal plate material or the like.

As illustrated in FIG. 15, the external terminal 70 includes a main body 71, and a first press-fit portion 72.

The main body 71 includes a first plate portion 71*a*, and a pair of second plate portions 71*b*. The first plate portion 71*a* has a rectangular flat plate shape with a plate thickness direction facing in the unit up-down direction (Y direction). Each of the pair of second plate portions 71*b* has a rectangular flat plate shape with a plate thickness direction facing in the unit width direction (Z direction). The pair of second plate portions 71*b* are connected to the first plate portion 71*a* through bent portions.

The main body 71 includes a third plate portion 71*c*. The third plate portion 71*c* couples upper ends (plus Y direction ends) of the pair of second plate portions 71*b* together in the unit width direction. The third plate portion 71*c* has a rectangular flat plate shape with a plate thickness direction facing in the unit up-down direction (Y direction). The third plate portion 71*c* is formed by combining together a pair of plate portions extended from the pair of second plate portions 71*b*. A front end of the third plate portion 71*c* is formed further toward the rear side than front ends of the first plate portion 71*a* and the pair of second plate portions 71*b*.

A tubular section 71*a*, 71*b*, 71*c* for housing the internal terminal 50 and the dielectric member 60 inside is formed by the first plate portion 71*a*, the pair of second plate portions 71*b*, and the third plate portion 71*c*. The main body 71 includes a rear face portion 71*d* as well as the tubular section 71*a*, 71*b*, 71*c*.

The rear face portion 71*d* is formed so as to close off part of the internal space of the main body 71 from the rear side. The rear face portion 71*d* functions so as to couple the tubular section 71*a*, 71*b*, 71*c* and the first press-fit portion 72 together.

As illustrated in FIG. 15, the rear face portion 71*d* only closes off part of the internal space of the main body 71, and openings 71*e* are formed in the main body 71 so as to open the internal space toward the rear side. More specifically, the rear face portion 71*d* closes off a lower portion of the internal space of the main body 71, and the openings 71*e* are formed to an upper portion of the main body 71.

The first press-fit portion 72 is a portion for connecting to the external conductor 93 of the shield cable 90B. More specifically, the first press-fit portion 72 is connected so as to be wound onto the external conductor 93 of the shield cable 90B from the outer peripheral side. The first press-fit portion 72 is also sometimes referred to below as connection portion 72.

The external terminal 70 includes a second press-fit portion 73 fixed to an outside of the outside covering 94 of the shield cable 90B (see FIG. 12). The second press-fit portion 73 is formed further toward the rear side than the first press-fit portion 72.

As illustrated in FIG. 18, a conductive sleeve 19 is inserted between the insulating cover 92 and the external conductor 93 of the shield cable 90B. The sleeve 19 has a circular tubular shape. An enlarged diameter portion 19*a* enlarged toward the radial direction outside is formed to a front end portion of the sleeve 19. Forming the enlarged diameter portion 19*a* suppresses the insulating cover 92 and the inner conductor 91 of the shield cable 90B from moving toward the rear side with respect to the external conductor 93 and the outside covering 94. A front end of the sleeve 19 preferably contacts the impedance adjustment member 80 (the lid portion 82 in the present exemplary embodiment).

As illustrated in FIG. 15 and FIG. 19, the main body 71 includes plural projection portions 74 for making contact with the impedance adjustment member 80.

The projection portions 74 are formed so to project toward the internal space of the tubular section 71*a*, 71*b*, 71*c*. The projection portions 74 are respectively formed to the pair of second plate portions 71*b* and the third plate portion 71*c*. More specifically, two of the projection portions 74 are respectively formed to each of the pair of second plate portions 71*b*, and a single projection portion 74 is formed to the third plate portion 71*c*. The plural (five) projection portions 74 are formed at the same front-rear direction position as each other. The projection portions 74 formed to the second plate portions 71*b* contact the opposing plate portions 81*b* of the front-rear direction extension portion 81 of the impedance adjustment member 80, and the projection portion 74 formed to the third plate portion 71*c* contacts the coupling plate portion 81*a* of the front-rear direction extension portion 81 of the impedance adjustment member 80. The projection portions 74 each have a dome shaped profile.

Operation and Advantageous Effects

Next, description follows regarding operation and advantageous effects related to the configuration of the terminal unit 14 from out of the operation and advantageous effects of the present exemplary embodiment.

In the present exemplary embodiment, as illustrated in FIG. 3, the terminal unit 14 is mounted to the shield cable 90A. As illustrated in FIG. 6 to FIG. 8, the shield cable 90A includes two of the inner conductors 91, and the external conductor 93 for shielding the two inner conductors 91.

As illustrated in FIG. 4, the terminal unit 14 includes two of the internal terminals 20 for connecting to the two inner conductors 91, the dielectric member 30 retaining the two internal terminals 20, and the external terminal 40 for connecting to the external conductor 93. The external terminal 40 houses the dielectric member 30.

As illustrated in FIG. 5, the internal terminals 20 each include the contact portion 21 for contacting to the connection target (signal terminal of the counterpart side connector), and the press-fit portion 24 for press-fitting onto the inner conductor 91. The contact portion 21 is provided at the front side, and the press-fit portion 24 is provided at the rear side.

The internal terminals 20 each further include the impedance adjustment section 25 connected to the press-fit portion 24. The capacitance of the press-fit portion 24 is accordingly increased, enabling the impedance of the press-fit portion 24 to be lowered.

Furthermore, the impedance adjustment section 25 projects toward the rear side with respect to the press-fit portion 24. This accordingly enables the impedance at the portion 91*e* exposed from the insulating cover 92 (sometimes referred to below as inner conductor exposed portion 91*e*, see FIG. 7 and FIG. 9) to be prevented from rising excessively at a portion of the inner conductors 91 of the shield cable 90A further to a rear side than a position press-fitted together with the press-fit portion 24.

Figure 9:
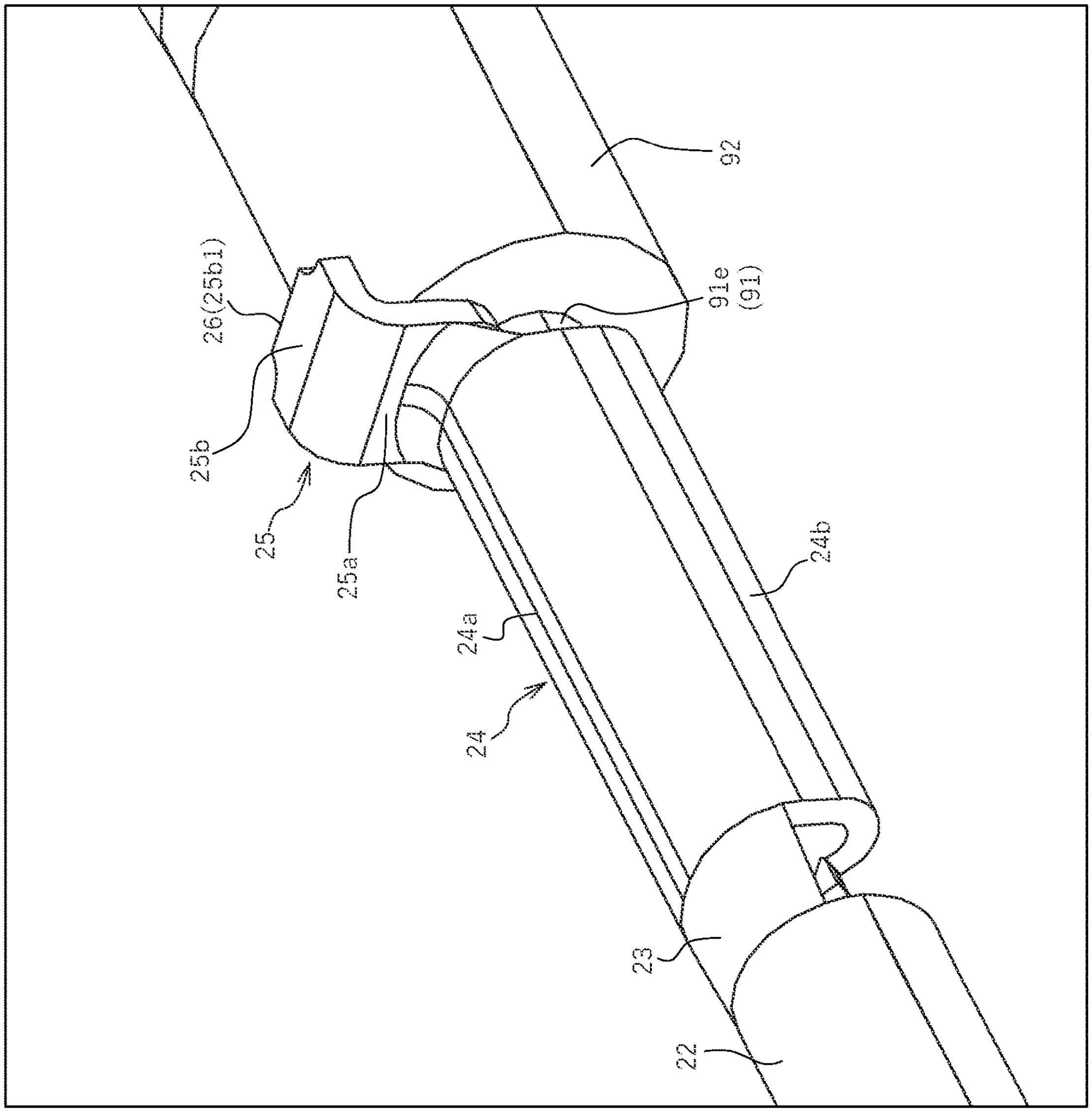
FIG. 9 is an enlarged perspective view of an internal terminal connected to a shield cable in a vicinity of an impedance adjustment section.

Moreover as illustrated in FIG. 9, in the present exemplary embodiment the impedance adjustment section 25 includes a front-rear direction extension portion 25*b* extending in the front-rear direction. Note that although in the present exemplary embodiment the radial direction extension portion 25*a* is formed between the press-fit portion 24 and the front-rear direction extension portion 25*b*, the radial direction extension portion 25*a* may be omitted. This means that the radial direction extension portion 25*a* can be disposed along the inner conductor 91 or along the insulating cover 92 covering the inner conductor 91. The length of the impedance adjustment section 25 can be secured as a result thereof, enabling impedance matching to be enhanced even more.

Moreover, in the present exemplary embodiment, the impedance adjustment section 25 further includes the radial direction extension portion 25*a* extending in the radial direction. The radial direction extension portion 25*a* is positioned between the press-fit portion 24 and the front-rear direction extension portion 25*b*. This thereby enables the press-fit portion 24 to be brought into close proximity to the insulating cover 92, and also enables the front-rear direction extension portion 25*b* to be disposed along the insulating cover 92. As a result the impedance matching can be enhanced even more.

Moreover, in the present exemplary embodiment the impedance adjustment section 25 is formed as a single body together with the press-fit portion 24. This means that manufacture of the internal terminals 20 is easier than an embodiment in which the impedance adjustment section 25 is formed as a separate body from the press-fit portion 24.

Moreover, in the present exemplary embodiment, the impedance adjustment section 25 extends from a rear end portion of the bottom plate portion 24*a* of the press-fit portion 24. This means that manufacture of the internal terminals 20 is easier than an embodiment in which the impedance adjustment section 25 extends from a portion other than a rear end portion of the bottom plate portion 24*a*.

Moreover, in the present exemplary embodiment, as illustrated in FIG. 9, the impedance adjustment section 25 is not a structure that surrounds the inner conductor 91 in the circumferential direction. This enables the impedance to be prevented from dropping excessively compared to an embodiment in which the impedance adjustment section 25 is a structure that surrounds the inner conductor 91 in the circumferential direction.

Moreover, in the present exemplary embodiment, the terminal unit 14 includes the two internal terminals 20. Neither of the impedance adjustment sections 25 provided to the two respective internal terminals 20 is disposed between the two inner conductors 91 (see FIG. 6).

Were one of the impedance adjustment sections 25 provided to the two respective internal terminals 20 to be disposed between the two inner conductors 91 then there might have been a concern that would have a bad effect on impedance matching, however, the present exemplary embodiment is able to prevent this from occurring.

In the present exemplary embodiment, the dielectric member 30 includes the partition wall 34 (see FIG. 6) positioned between the impedance adjustment sections 25 provided to the two internal terminals 20. This thereby enables the impedance to be lowered compared to an embodiment not including such a partition wall 34.

Moreover as illustrated in FIG. 5, in the present exemplary embodiment the end portion 25*b*1 on the opposite side of the impedance adjustment section 25 to the side connected to the press-fit portion 24 is configured by the carrier severance portion 26. This enables the internal terminals 20 including the impedance adjustment sections 25 to be manufactured by adjusting a position where the internal terminals 20 are severed from the carrier in the manufacturing processes thereof. This results in easy manufacture of the internal terminals 20.

Moreover as illustrated in FIG. 6 and FIG. 7, in the present exemplary embodiment the dielectric member 30 surrounds the impedance adjustment sections 25 in a circumferential direction. The impedance of the exposed portions 91*e* of the inner conductors 91 can accordingly be lowered compared to an embodiment in which the dielectric member 30 does not surround the impedance adjustment sections 25 in the circumferential direction.

Next, description follows regarding operation and advantageous effects related to the configuration of the terminal units 15 from out of the operation and advantageous effects of the present exemplary embodiment.

As illustrated in FIG. 12, in the present exemplary embodiment the terminal units 15 are each for mounting to the shield cable 90B. The shield cable 90B includes the inner conductor 91, and the external conductor 93 shielding the inner conductor 91.

The terminal units 15 each include the internal terminal 50 for connecting to the inner conductor 91, the dielectric member 60 for retaining the internal terminal 50, and the external terminal 70 for connecting to the external conductor 93. The external terminal 70 houses the internal terminal 50.

The internal terminal 50 includes the press-fit portion 54 for press-fitting onto the inner conductor 91.

The terminal unit 15 further includes the conductive impedance adjustment member 80 formed as a separate body from the internal terminal 50 and the external terminal 70. The impedance adjustment member 80 includes an adjustment section 80 disposed at a position that is between the external terminal 70 and the internal terminal 50 that is a position enabling the impedance of the press-fit portion 54 to be adjusted (see FIG. 18). Note that in the present exemplary embodiment the entire impedance adjustment member 80 is configured by the adjustment section 80.

An excessive rise in the impedance of the press-fit portion 54 is thereby suppressed from occurring, enabling enhanced impedance matching to the terminal unit 15.

Moreover as illustrated in FIG. 15, in the present exemplary embodiment the external terminal 70 includes the main body 71 housing the internal terminal 50, and the connection portion 72 for connecting to the external conductor 93 provided at a rear side with respect to the main body 71. The openings 71*e* are formed in the main body 71 so as to open the internal space of the main body 71 toward the rear side. This enables easier manufacture of the external terminal 70 including the main body 71 than embodiments not including openings 71*e* formed to the main body 71 in this manner.

Furthermore, as illustrated in FIG. 14, the adjustment section 80 includes the lid portion 82. The lid portion 82 is a portion that has plate thickness directions facing in directions intersecting with a plane perpendicular to the front-rear direction, and is disposed so as to narrow the openings 71*e* (see FIG. 17). Due to the openings 71*e* of the main body 71 being narrowed in this manner, crosstalk can be prevented from occurring between the internal terminal 50 and other electrical components.

Moreover, in the present exemplary embodiment, as illustrated in FIG. 14, the lid portion 82 includes the pair of side plate portions 82*b* disposed so as to sandwich the inner conductor 91, and includes the upper plate portion 82*a* coupling the pair of side plate portions 82*b* together. The pass through portion 85 is formed to let the inner conductor 91 pass through in the front-rear direction between of the pair of side plate portions 82*b*, and the pass through portion 85 is open in a one-direction perpendicular to the front-rear direction.

This enables the impedance adjustment member 80 to be placed with respect to the inner conductor 91 from the one-direction perpendicular to the front-rear direction (from the unit upward direction in the present exemplary embodiment) when assembling the terminal units 15. Assembly of the terminal units 15 is facilitated thereby.

Moreover, in the present exemplary embodiment the adjustment section 80 includes the front-rear direction extension portion 81. The front-rear direction extension portion 81 has a plate thickness direction facing in a direction along a plane (YZ plane) perpendicular to the front-rear direction and extends in a front-rear direction (X direction).

This accordingly enables impedance matching to be enhanced compared to embodiments with an adjustment section 80 not including the front-rear direction extension portion 81.

Moreover, in the present exemplary embodiment, as illustrated in FIG. 14, the front-rear direction extension portion 81 includes the pair of opposing plate portions 81*b* opposing each other so as to sandwich the internal terminal 50, and the coupling plate portion 81*a* coupling the pair of opposing plate portions 81*b* together.

This enables impedance matching to be enhanced compared to embodiments without, for example, the front-rear direction extension portion 81 formed so as to sandwich the internal terminal 50.

Moreover as illustrated in FIG. 19, in the present exemplary embodiment the three plate portions of the pair of opposing plate portions 81*b* and the coupling plate portion 81*a* each contact the external terminal 70. This enables suppression of the generation of vibration noise caused by the plate portions 81*a*, 81*b* and the external terminal 70.

In the present exemplary embodiment, contact between each of the three plate portions 81*a*, 81*b* (the pair of opposing plate portions 81*b* and the coupling plate portion 81*a*) and the external terminal 70 is realized through the projection portions 74 formed to at least one out of the front-rear direction extension portion 81 or the external terminal 70.

This enables a more stable contact state to be maintained than an embodiment in which planar portions thereof make contact with each other. Moreover, parasitic inductance in the impedance adjustment member 80 or the external terminal 70 can be reduced in comparison to an embodiment in which contact is made through a cantilever spring, such as a spring tab.

Moreover as illustrated in FIG. 19, in the present exemplary embodiment the contact between each of the three plate portions 81*a*, 81*b* and the external terminal 70 is realized through the projection portions 74 formed to the external terminal 70.

This enables large projection portions 74 to be formed more easily than an embodiment in which the projection portions 74 are formed to the front-rear direction extension portion 81 of the impedance adjustment member 80. This is because it is easier to form the external terminal 70 large than the front-rear direction extension portion 81. As a result thereof, contact can be stabilized between the external terminal 70 and the impedance adjustment member 80.

Moreover as illustrated in FIG. 14, in the present exemplary embodiment the impedance adjustment member 80 is disposed at an outer face of the dielectric member 60.

The placement indentation 63 that the impedance adjustment member 80 is disposed in is formed to the outer face of the dielectric member 60.

This enables the dielectric member 60 and the impedance adjustment member 80 to be efficiently housed in the external terminal 70.

Description follows regarding Modified Examples 1, 2, 3 of the terminal units 15.

Modified Example 1: Terminal Unit 115

Next, description follows regarding a terminal unit 115 according to a Modified Example 1, with reference to FIG. 20 to FIG. 26.

Note that components and portions appended with the same reference signs in the drawings to those of the above exemplary embodiment have basically the same configuration as those of the exemplary embodiments described above.

Figure 20:
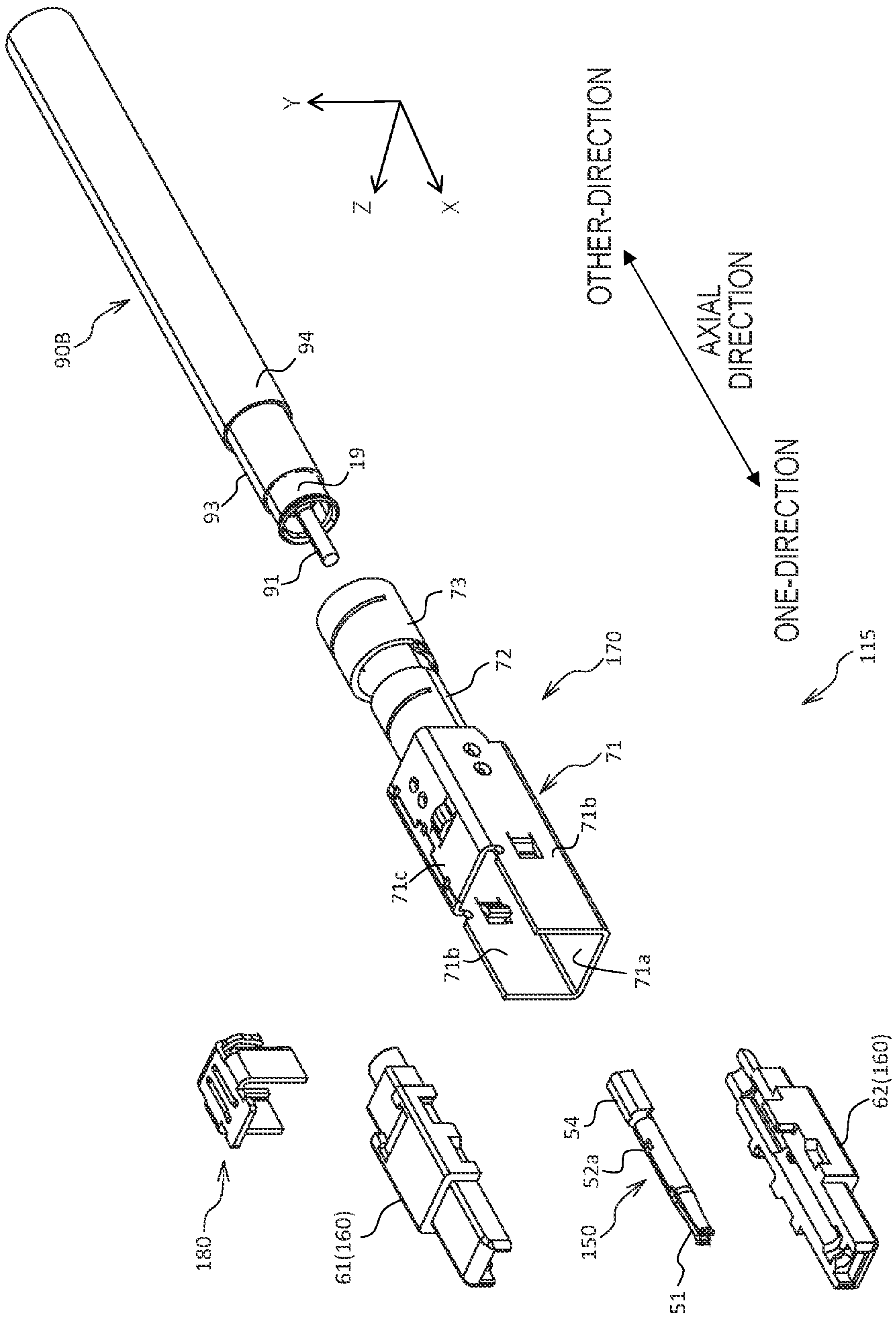
FIG. 20 is an exploded perspective view of a terminal unit according to a Modified Example 1.
Figure 21:
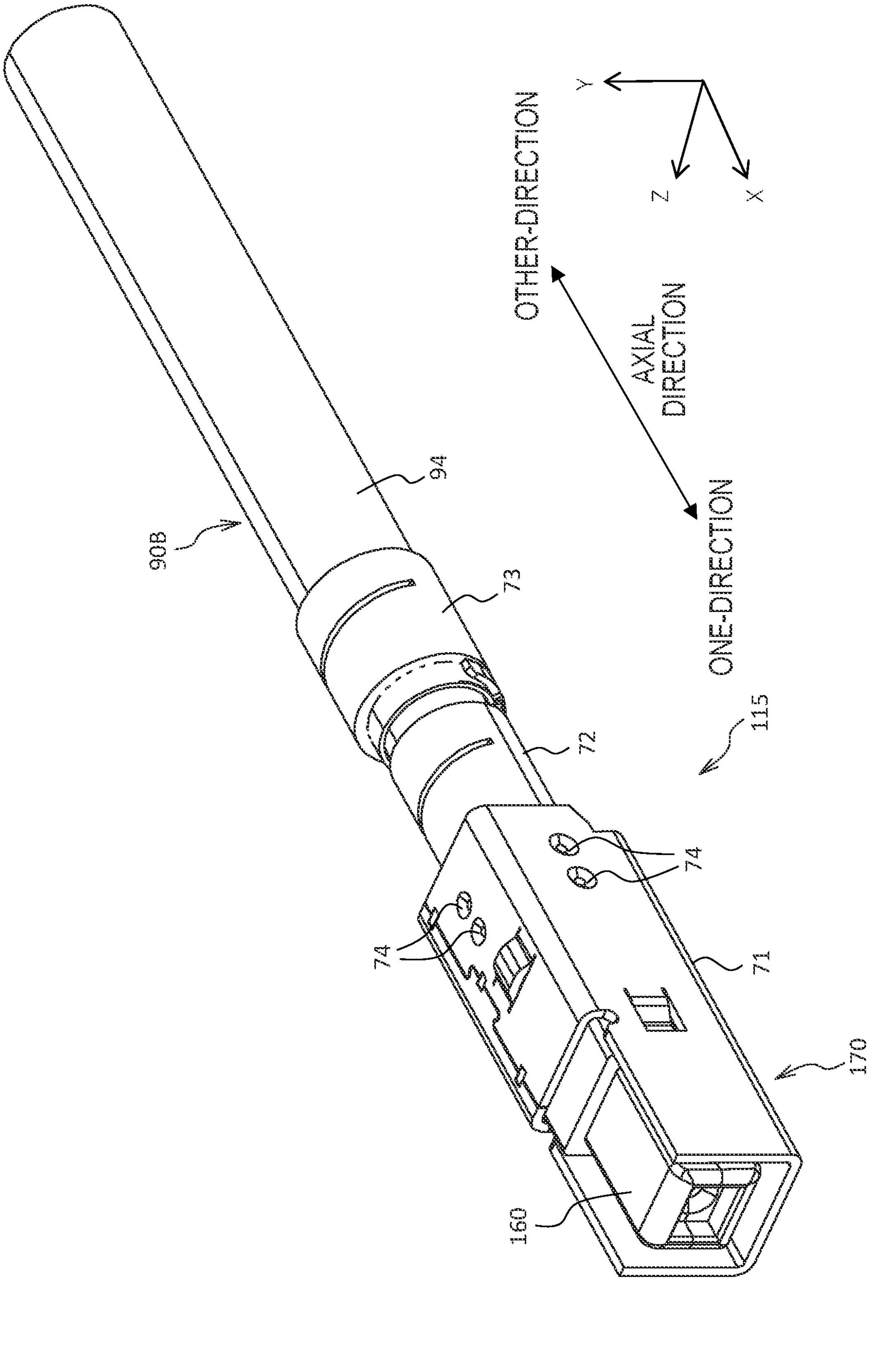
FIG. 21 is a perspective view of a terminal unit according to the Modified Example 1.

As illustrated in FIG. 20, the terminal unit 115 according to Modified Example 1 includes an internal terminal 150, a dielectric member 160, an external terminal 170, an impedance adjustment member 180, and a sleeve 19.

Internal Terminal 150

The internal terminal 150 is for connecting to the inner conductor 91 of the shield cable 90B.

Dielectric Member 160

The dielectric member 160 retains the internal terminal 150 and is housed in a main body 71 of the external terminal 170.

Figure 22:
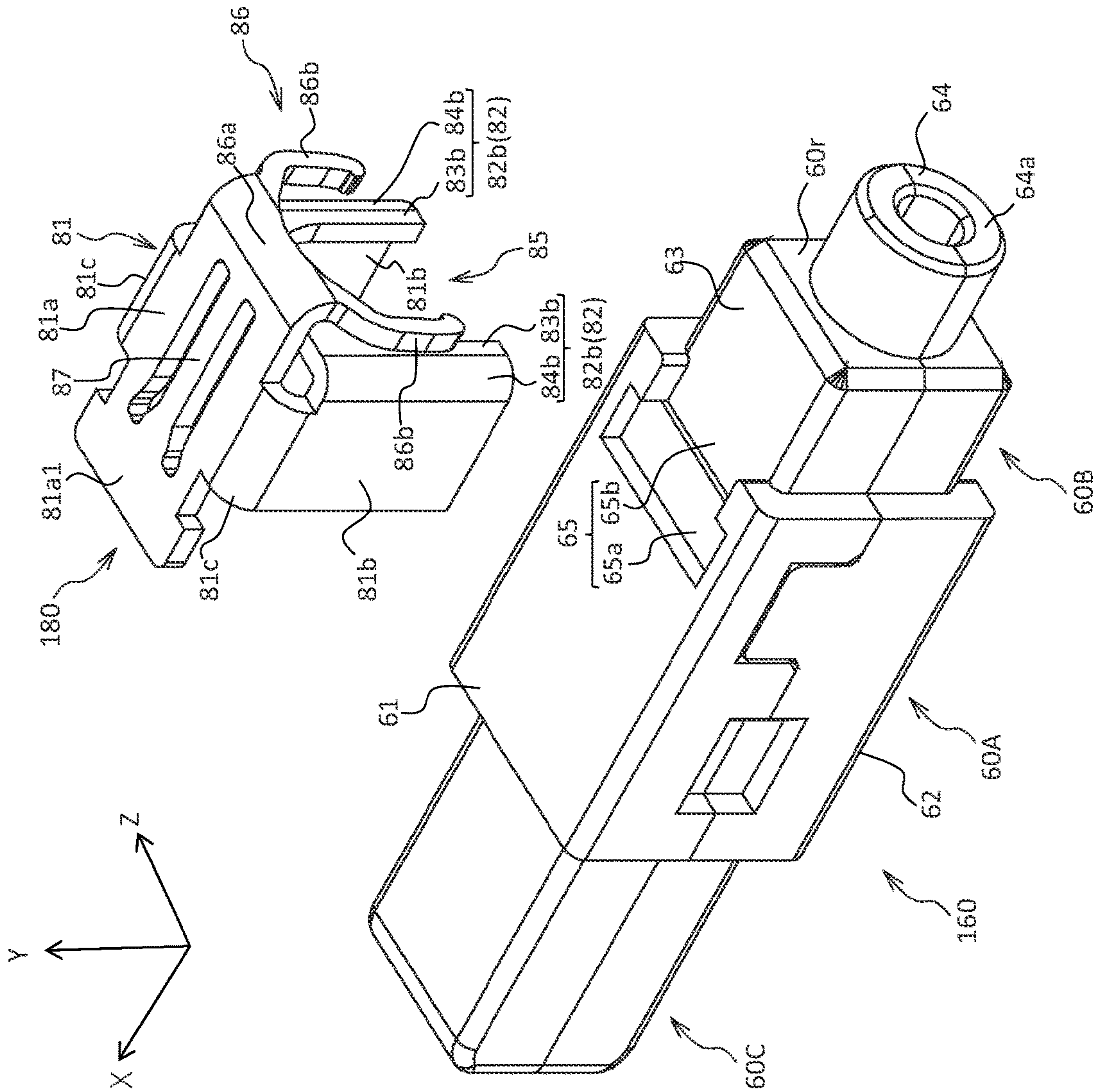
FIG. 22 is a perspective view illustrating a dielectric member and an impedance adjustment member according to the Modified Example 1.

As illustrated in FIG. 22, a placement indentation 63 for placement of the impedance adjustment member 180 is formed to an outer face of the dielectric member 160.

The placement indentation 63 is formed to a rear portion 60B of the dielectric member 160. Due to forming the placement indentation 63, the rear portion 60B of the dielectric member 160 has a cross-section profile (cross-section profile perpendicular to the front-rear direction) that is smaller than an intermediate portion 60A, which is a general portion. More specifically, the placement indentation 63 is formed spanning an entire periphery of an upper face of the outer face of the dielectric member 160, a pair of side faces thereof (faces facing toward the unit width direction outside), and a lower face thereof. However, depending on the profile of the impedance adjustment member 180 of the present exemplary embodiment, a portion of the placement indentation 63 corresponding to a lower face of the dielectric member 160 may be omitted.

An enlarged indentation 65 is formed to the outer face of the dielectric member 160 for placement of a projection tab **81*al* of the impedance adjustment member 180. The enlarged indentation 65 is connected to the placement indentation 63. The enlarged indentation 65 is formed to the intermediate portion 60A of the dielectric member 160. The enlarged indentation 65 is formed to an upper face of the dielectric member 160**.

The enlarged indentation 65 includes a wide-width portion **65*a* and a narrow-width portion 65*b*. The width dimension of the wide-width portion 65*a* is greater than that of the narrow-width portion 65*b*. The narrow-width portion 65*b* connects the wide-width portion 65*a* and the placement indentation 63** together.

The narrow-width portion **65*b* of the enlarged indentation 65 is positioned in the same plane as the placement indentation 63. The wide-width portion 65*a* of the enlarged indentation 65 is positioned above the placement indentation 63. A step is formed at a boundary between the wide-width portion 65*a* and the narrow-width portion 65*b* of the enlarged indentation 65**.

The narrow-width portion **65*b* of the enlarged indentation 65 and the placement indentation 63 are indented downward relative to the wide-width portion 65*a* of the enlarged indentation 65. This indentation serves the function of escape indentations 63, 65*b* to permit deformation of a resilient contact portion 87 of the impedance adjustment member 180**, described later.

The dielectric member 160 includes a tubular projection section 64.

The tubular projection section 64 has a tubular shape (specifically a circular tubular profile) and projects out toward the rear side from a rear face **60*r* of the dielectric member 160. The tubular projection section 64 surrounds the inner conductor 91. This accordingly enables shorting between the inner conductor 91 and other members (the impedance adjustment member 180** in the present exemplary embodiment) to be prevented, and also enables the impedance to be lowered at this location.

Figure 26:
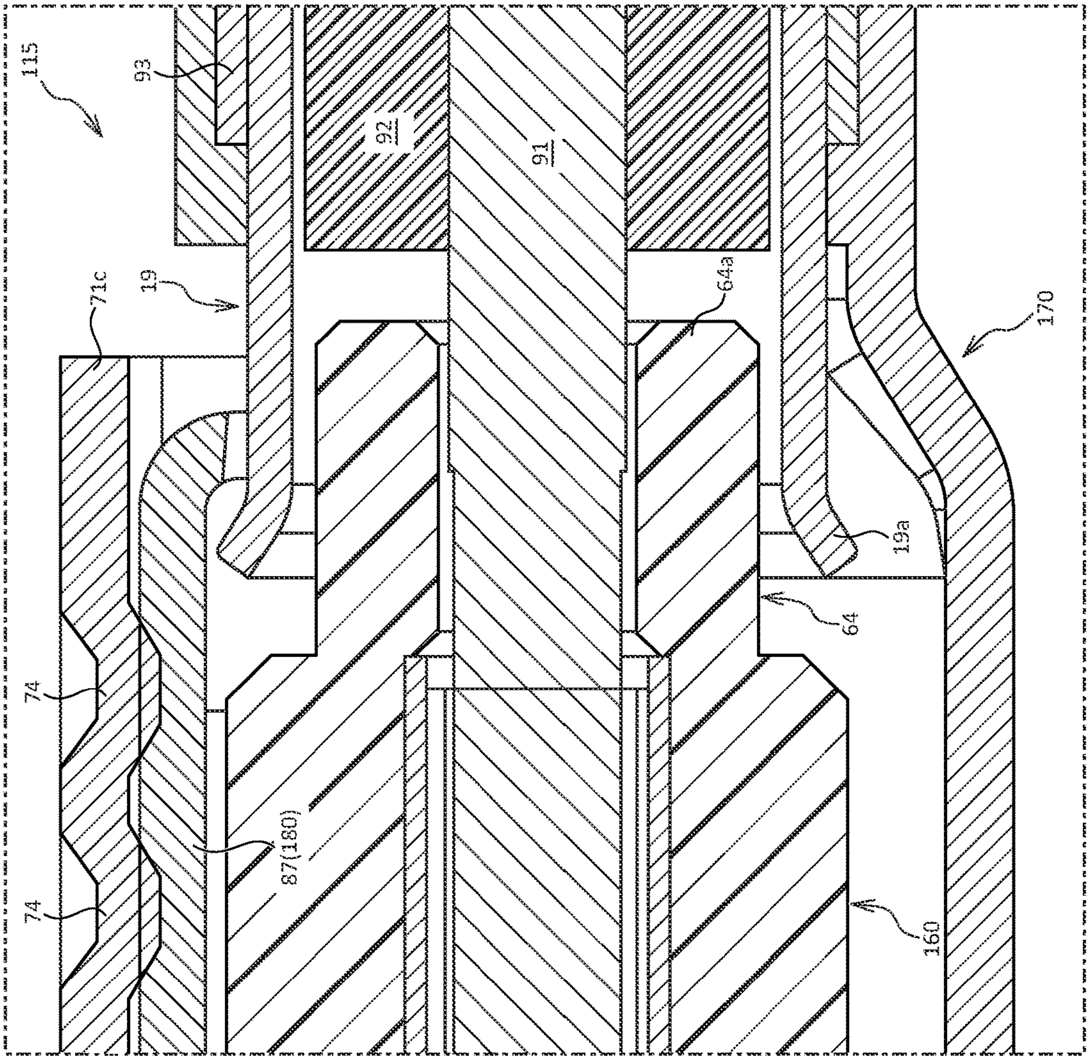
FIG. 26 is a cross-section illustrating an enlargement of a projection portion according to the Modified Example 1.

As illustrated in FIG. 26, a portion **64*a* at a leading-end-side of the tubular projection section 64 is disposed inside the sleeve 19. A portion of the tubular projection section 64 that is disposed inside the sleeve 19 is called an entry portion 64*a***.

A front-rear dimension of the entry portion **64*a* is preferably not less than ⅓ the front-rear dimension of the tubular projection section 64, and is more preferably not less than ½ thereof. The front-rear dimension of the entry portion 64*a*** is, for example, 0.2 mm or greater.

Impedance Adjustment Member 180

As illustrated in FIG. 22, the impedance adjustment member 180 includes a front-rear direction extension portion 81 having plate thickness directions facing in directions along a plane (YZ plane) perpendicular to the front-rear direction and extending in the front-rear direction (X direction), and a lid portion 82 having plate thickness directions facing in directions intersecting with a plane (YZ plane) perpendicular to the front-rear direction.

The front-rear direction extension portion 81 includes a pair of opposing plate portions **81*b* opposing each other so as to sandwich the internal terminal 150, and a coupling plate portion 81*a* that couples the pair of opposing plate portions 81*b* together. A pair of bent portions 81*c* formed by bending a plate material are formed between the pair of opposing plate portions 81*b* and the coupling plate portion 81*a*. The bent portions 81*c*** extend in the front-rear direction (X direction).

The lid portion 82 includes flat plate portions **83*b*, 83*b* having plate thickness directions facing in the front-rear direction, and connection bent portions 84*b*, 84*b* connecting the flat plate portions 83*b*, 83*b* and the front-rear direction extension portion 81** together.

The connection bent portions **84*b*, 84*b* include a pair of first bent portions 84*b*, 84*b* connecting the flat plate portions 83*b*, 83*b* and the pair of opposing plate portions 81*b* together. The first bent portions 84*b*** extend in the up-down direction (Y direction).

The flat plate portions **83*b*, 83*b* include a pair of separate portions 83*b*, 83*b* that are separated from each other. The pair of separate portions 83*b*, 83*b* respectively connect to the pair of first bent portions 84*b*, 84*b***.

In other words, the lid portion 82 includes a pair of side plate portions **82*b* disposed so as to sandwich the inner conductor 91. The lid portion 82 does not include a portion (upper plate portion) to couple the pair of side plate portions 82*b* together. Each of the side plate portions 82*b* is configured from a first bent portion 84*b* and a separate portion 83*b***.

A pass through portion 85 is accordingly formed to the lid portion 82 to let the inner conductor 91 and the tubular projection section 64 pass through in the front-rear direction, and that is open in a one-direction (the minus Y direction that is a downward direction in the present exemplary embodiment) perpendicular to the front-rear direction. The pass through portion 85 is accordingly a space formed between the pair of side plate portions **82*b***.

A width dimension of the separate portion **83*b* is large at an upper portion of the lid portion 82 and a width dimension of the separate portion 83*b* is small at a lower portion of the lid portion 82. This means that the width dimension of a space between the pair of side plate portions 82*b* at an upper portion of the lid portion 82 is narrow, and a width dimension of a space between the pair of side plate portions 82*b* at a lower portion of the lid portion 82** is wide.

The projection tab **81*al* is formed to the front-rear direction extension portion 81 for placement in the enlarged indentation 65 of the dielectric member 160. Due to adopting such a configuration, mistakes are prevented in the direction of placement of the impedance adjustment member 180 with respect to the dielectric member 160** (placement from the unit upper direction side in the present exemplary embodiment).

A leading end portion of the projection tab 81*al* has a larger width dimension than a base end portion of the projection tab 81*al*. Namely, the shape of the projection tab 81*al* corresponds to the shape of the enlarged indentation 65 of the dielectric member 160. The impedance adjustment member 180 and the dielectric member 160 are accordingly anchored together in the front-rear direction (axial direction).

The impedance adjustment member 180 includes a biasing portion 86 to bias the sleeve 19 toward the impedance adjustment member 180.

The biasing portion 86 is formed at a rear end of the impedance adjustment member 180. The biasing portion 86 includes a bent portion 86*a* formed to a rear end of the coupling plate portion 81*a* and extending in a width direction, and a pair of biasing tabs 86*b* extending from the bent portion 86*a*. Each of the pair of biasing tabs 86*b* has a plate thickness directions facing in the front-rear direction. The pair of biasing tabs 86*b* extend from the bent portion 86*a* a direction toward the width direction outside and obliquely downward. The pair of biasing tabs 86*b* extend along the outer peripheral face of the sleeve 19. The sleeve 19 is sandwiched in the width direction between the pair of biasing portion 86. The pair of biasing tabs 86*b* are in a resiliently deformed state when this occurs.

Figure 23:
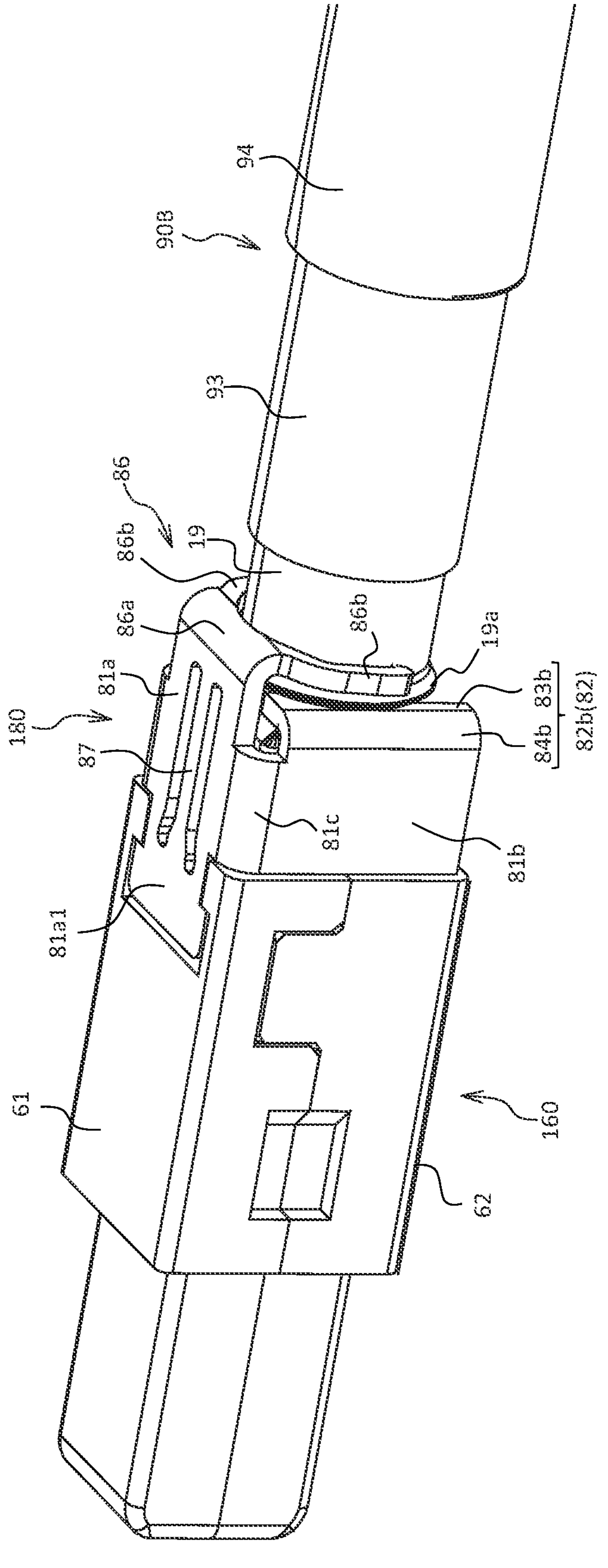
FIG. 23 is a diagram illustrating a terminal unit according to the Modified Example 1, with an external terminal omitted.

Moreover, as illustrated in FIG. 23, the enlarged diameter portion 19*a* of the sleeve 19 is sandwiched in the front-rear direction between the pair of biasing tabs 86*b* and the pair of side plate portions 82*b*. In other words, the pair of biasing tabs 86*b* of the biasing portion 86 bias the enlarged diameter portion 19*a* of the sleeve 19 toward the lid portion 82 of the impedance adjustment member 180. The impedance adjustment member 180 and the sleeve 19 are accordingly anchored together in the front-rear direction (axial direction). In other words, the biasing portion 86 restricts the sleeve 19 from moving toward the rear side with respect to the dielectric member 160. The biasing portion 86 is sometimes referred to as restricting portion 86 below.

Note that the biasing portion 86 is a portion having plate thickness directions facing in directions intersecting with a plane perpendicular to the front-rear direction, and is disposed so as to narrow an opening on the rear side of the main body 71. This means that the biasing portion 86 is sometimes referred to as a lid portion 86.

The impedance adjustment member 180 includes the resilient contact portion 87 that resiliently contacts projection portions 74 of the external terminal 170.

More specifically, a through hole is formed in the impedance adjustment member 180, and the resilient contact portion 87 is formed so as to divide the through hole. The resilient contact portion 87 is accordingly a spring supported from both ends. The resilient contact portion 87 extends in the front-rear direction. The resilient contact portion 87 is formed to the coupling plate portion 81*a*. The resilient contact portion 87 is positioned in the same plane as a plate portion (the coupling plate portion 81*a*) formed with the through hole. In other words, the resilient contact portion 87 maintains a flat plate face on the plate portion formed with the through hole. The resilient contact portion 87 is formed at a position corresponding to the escape indentations 63, 65*b* of the dielectric member 160. Deformation is accordingly permitted toward the dielectric member 160 side of the resilient contact portion 87.

External Terminal 170

The external terminal 170 is connected to the external conductor 93 of the shield cable 90B. The external terminal 170 houses the internal terminal 150, the dielectric member 160, and the impedance adjustment member 180. The external terminal 170 is manufactured such as by bending a metal plate material.

The external terminal 170 includes a main body 71.

As illustrated in FIG. 20, the main body 71 includes a first plate portion 71*a* and a pair of second plate portions 71*b*. The first plate portion 71*a* has a rectangular flat plate shape with a plate thickness direction facing in the unit up-down direction (Y direction). Each of the pair of second plate portions 71*b* has a rectangular flat plate shape with a plate thickness direction facing in the unit width direction (Z direction). The pair of second plate portions 71*b* are connected to the first plate portion 71*a* through bent portions.

The main body 71 includes a third plate portion 71*c*. The third plate portion 71*c* couples upper ends (plus Y direction ends) of the pair of second plate portions 71*b* together in the unit width direction. The third plate portion 71*c* has a rectangular flat plate shape with a plate thickness direction facing in the unit up-down direction (Y direction). The third plate portion 71*c* is formed by combining a pair of plate portions extended from the pair of second plate portions 71*b*.

A front end of the third plate portion 71*c* is formed further toward the rear side than front ends of the first plate portion 71*a* and the pair of second plate portions 71*b*.

The external terminal 170 includes a first press-fit portion 72.

The first press-fit portion 72 is press-fitted onto the external conductor 93 of the shield cable 90B from the outside.

The external terminal 170 includes a second press-fit portion 73.

The second press-fit portion 73 is press-fitted onto the outside covering 94 of the shield cable 90B from the outside. The second press-fit portion 73 is formed further toward the rear side than the first press-fit portion 72. The second press-fit portion 73 has a larger diameter of target to be press-fitted onto than the first press-fit portion 72.

Figure 24:
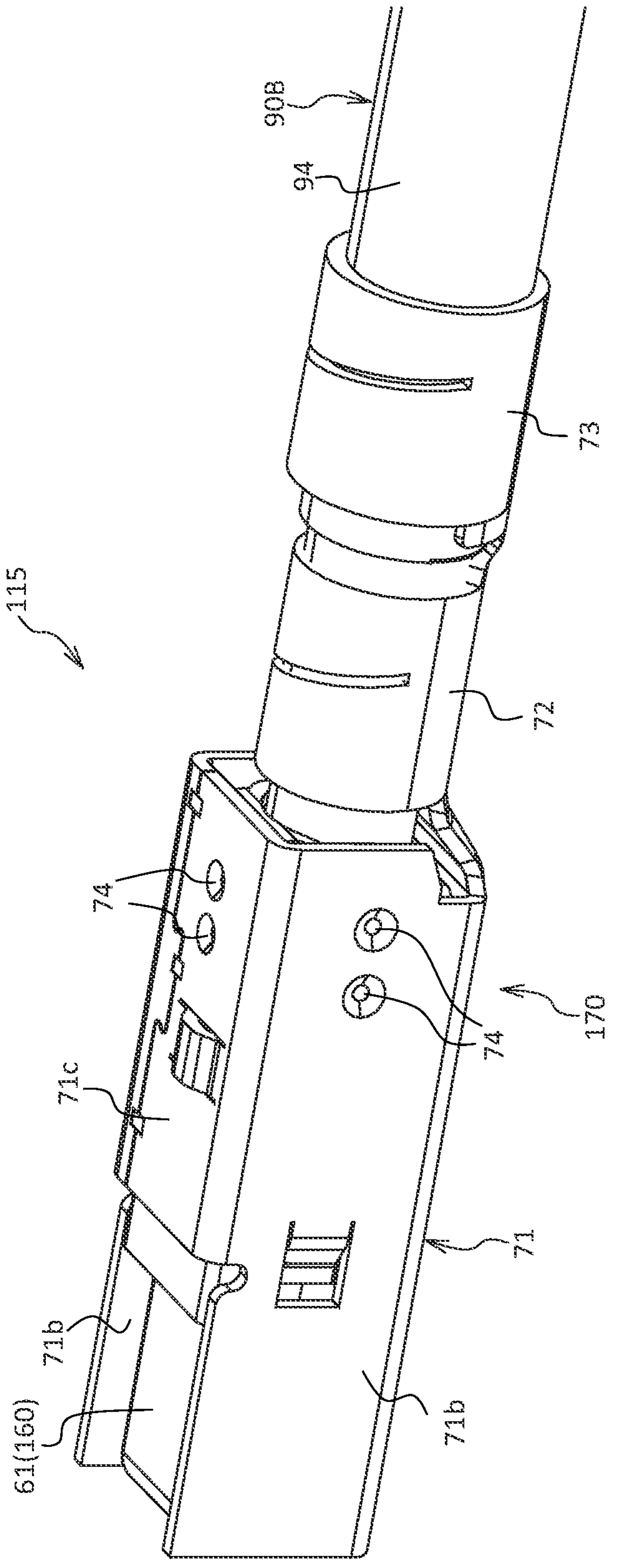
FIG. 24 is a diagram illustrating a terminal unit according to the Modified Example 1.

As illustrated in FIG. 24, the main body 71 includes plural projection portions 74 that make contact with the impedance adjustment member 180.

The projection portions 74 are shaped so as to project toward the inside of the main body 71, and more specifically have a dome shaped profile.

The projection portions 74 are respectively formed to the pair of second plate portions 71*b* and the third plate portion 71*c*. More specifically, there are two projection portions 74 formed to each of the pair of second plate portions 71*b* and the third plate portion 71*c*. These two projection portions 74 are arranged along the front-rear direction. The projection portions 74 formed to the second plate portions 71*b* make contact with the opposing plate portions 81*b* of the front-rear direction extension portion 81 of the impedance adjustment member 180, and the projection portions 74 formed to the third plate portion 71*c* make contact with the coupling plate portion 81*a* of the front-rear direction extension portion 81 of the impedance adjustment member 180. The projection portions 74 formed to the third plate portion 71*c* make contact with the resilient contact portion 87 formed to the coupling plate portion 81*a*.

Sleeve 19

Figure 25:
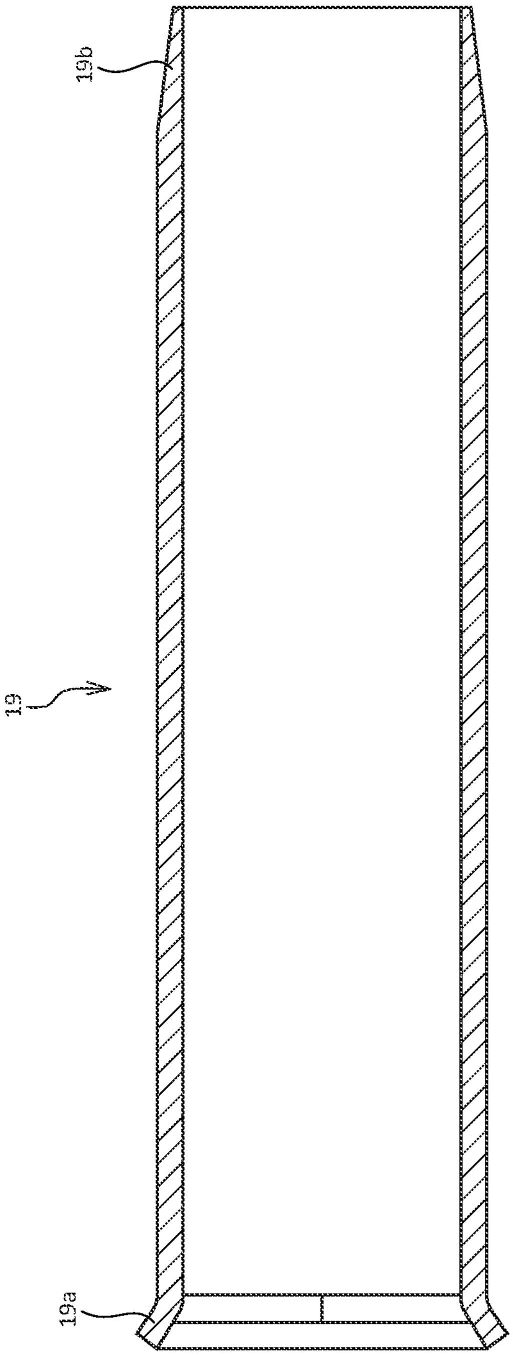
FIG. 25 is a cross-section illustrating a sleeve according to the Modified Example 1.

As illustrated in FIG. 25, the sleeve 19 is a component manufactured by drawing.

The sleeve 19 is formed from a conductive member. The sleeve 19 has a circular tubular shape. The sleeve 19 is inserted between an insulating cover 92 and the external conductor 93 of the shield cable 90B. The sleeve 19 is disposed at the outside of the insulating cover 92, and functions so as to retain the shape of the insulating cover 92.

The sleeve 19 includes an enlarged diameter portion 19*a* formed to a leading end portion of the sleeve 19. The enlarged diameter portion 19*a* has an outer diameter enlarged compared to other portions. The enlarged diameter portion 19*a* is sandwiched in the front-rear direction between the lid portion 82 and the biasing portion 86 of the impedance adjustment member 180 (see FIG. 23). The sleeve 19 thereby makes press contact with the impedance adjustment member 180.

The sleeve 19 includes a reduced diameter portion 19*b* formed at a rear end portion of the sleeve 19. The reduced diameter portion 19*b* has an external diameter that reduces on progression toward the rear. This configuration facilitates a task of inserting the sleeve 19 between the insulating cover 92 and the external conductor 93 of the shield cable 90B.

Operation and Advantageous Effects

Description follows regarding operation and advantageous effects of Modified Example 1.

In Modified Example 1, the terminal unit 115 includes the internal terminal 150 for connecting to the inner conductor 91, the dielectric member 160 for retaining the internal terminal 150, and the external terminal 170 for connecting to the external conductor 93. The external terminal 170 houses the internal terminal 150. The internal terminal 150 includes the press-fit portion 54 press-fitted to the inner conductor 91.

The terminal unit 115 is further provided with the conductive impedance adjustment member 180 formed as a separate body from the internal terminal 150 and the external terminal 170. The impedance adjustment member 180 is positioned between the external terminal 170 and the internal terminal 150, and includes the adjustment section 180 disposed at a position able to adjust the impedance of the press-fit portion 54. Note that the entire conductive impedance adjustment member 180 is configured by the adjustment section 180 in the Modified Example 1.

The impedance of the press-fit portion 54 is thereby suppressed from rising excessively, enabling enhanced impedance matching to the terminal unit 115.

Moreover in Modified Example 1, the terminal unit 115 includes the conductive sleeve 19 disposed at the outside of the insulating cover 92 and covering the inner conductor 91. This suppresses changes to the cross-section profile of the insulating cover 92 covering the inner conductor 91, and the impedance is maintained constant as a result.

Namely, the external terminal 170 is press-fitted to the shield cable 90B, and so there is a concern that a deformed state of the shield cable 90B, such as an elliptical shape or the like, might result from such press-fitting. The sleeve 19 suppresses this from occurring.

Moreover similarly to in the above exemplary embodiment, the sleeve 19 and the impedance adjustment member 180 make contact with each other in the Modified Example 1. This thereby enables suppression of vibration that causes noise.

Note that although the Modified Example 1 also exhibits other operation and advantageous effects due to configuration similar to that of the above exemplary embodiment, duplicate explanation thereof will be omitted. Description follows regarding operation and advantageous effects due to configuration different from that of the above exemplary embodiment.

In the Modified Example 1, the contact between the sleeve 19 and the impedance adjustment member 180 is press contact. This thereby enables the sleeve 19 and the impedance adjustment member 180 to be prevented from ceasing to make contact due to manufacturing tolerance of the sleeve 19, vibration during use, or the like.

Moreover, in the Modified Example 1 the impedance adjustment member 180 includes the biasing portion 86 that biases the sleeve 19 toward the impedance adjustment member 180. This means that the impedance adjustment member 180 and the sleeve 19 can be placed in press contact without an increase in the number of components.

Moreover, in the Modified Example 1 the lid portion 82 includes the side plate portions 82*b* formed in cantilever beam shapes. This thereby enables the lid portion 82 to be formed by bending processing rather than drawing, and as a result enables a reduction in manufacturing cost.

Moreover, as illustrated in FIG. 23, the sleeve 19 makes contact with the side plate portions 82*b* having cantilever beam shapes. Thus vibration that causes noise is accordingly suppressed.

Moreover in Modified Example 1, as illustrated in FIG. 26, the dielectric member 160 includes the entry portion 64*a* disposed inside the sleeve 19. This enables a rise in impedance to be suppressed from occurring at a portion of the inner conductor 91 exposed from the insulating cover 92.

More specifically, a constant length is difficult to achieve for the portion of the inner conductor 91 exposed from the insulating cover 92. A long exposed portion results in a long air layer being formed between the sleeve 19 and inner conductor 91, and in the impedance rising at this portion.

In order to address this issue, in the Modified Example 1, part (the entry portion 64*a*) of the dielectric member 160 is disposed inside the sleeve 19, and this enables a long air layer to be suppressed from being formed between the sleeve 19 and the inner conductor 91. As a result thereof this enables the impedance to be suppressed from rising at the portion of the inner conductor 91 exposed from the insulating cover 92.

Furthermore, the entry portion 64*a* is also formed in a tube shape so as to surround the inner conductor 91. This enables an enhanced effect on suppressing the impedance from rising.

Moreover in the Modified Example 1, as illustrated in FIG. 22, the impedance adjustment member 180 includes the resilient contact portion 87 that makes resilient contact with the projection portions 74 formed to the external terminal 170. The ease of assembly of the external terminal 170 formed with the projection portions 74 is raised thereby. Namely, this facilitate a task of inserting the dielectric member 160 mounted with the impedance adjustment member 180 into the main body 71 of the external terminal 170.

Furthermore, the resilient contact portion 87 is a spring supported from both ends formed so as to divide the through hole in the impedance adjustment member 180. This enables parasitic inductance in the impedance adjustment member 180 or the external terminal 170 to be decreased compared to an embodiment in which the resilient contact portion 87 is a cantilevered spring.

Moreover in Modified Example 1, as illustrated in FIG. 23, the sleeve 19 and the impedance adjustment member 180 are anchored together in the front-rear direction, and the impedance adjustment member 180 and the dielectric member 160 are also anchored together in the front-rear direction. This enables the sleeve 19, the impedance adjustment member 180, and the dielectric member 160 to be prevented from being separated by external force (in particular a force pulling on the shield cable 90B during use).

Modified Example 2: Terminal Unit 215

Next, description follows regarding a terminal unit 215 according to a Modified Example 2, with reference to FIG. 27 to FIG. 30.

Note that the same reference numerals are appended in the drawings to components or portions having the same configuration as the above exemplary embodiment and modified example, and explanation thereof will be omitted.

Figure 27:
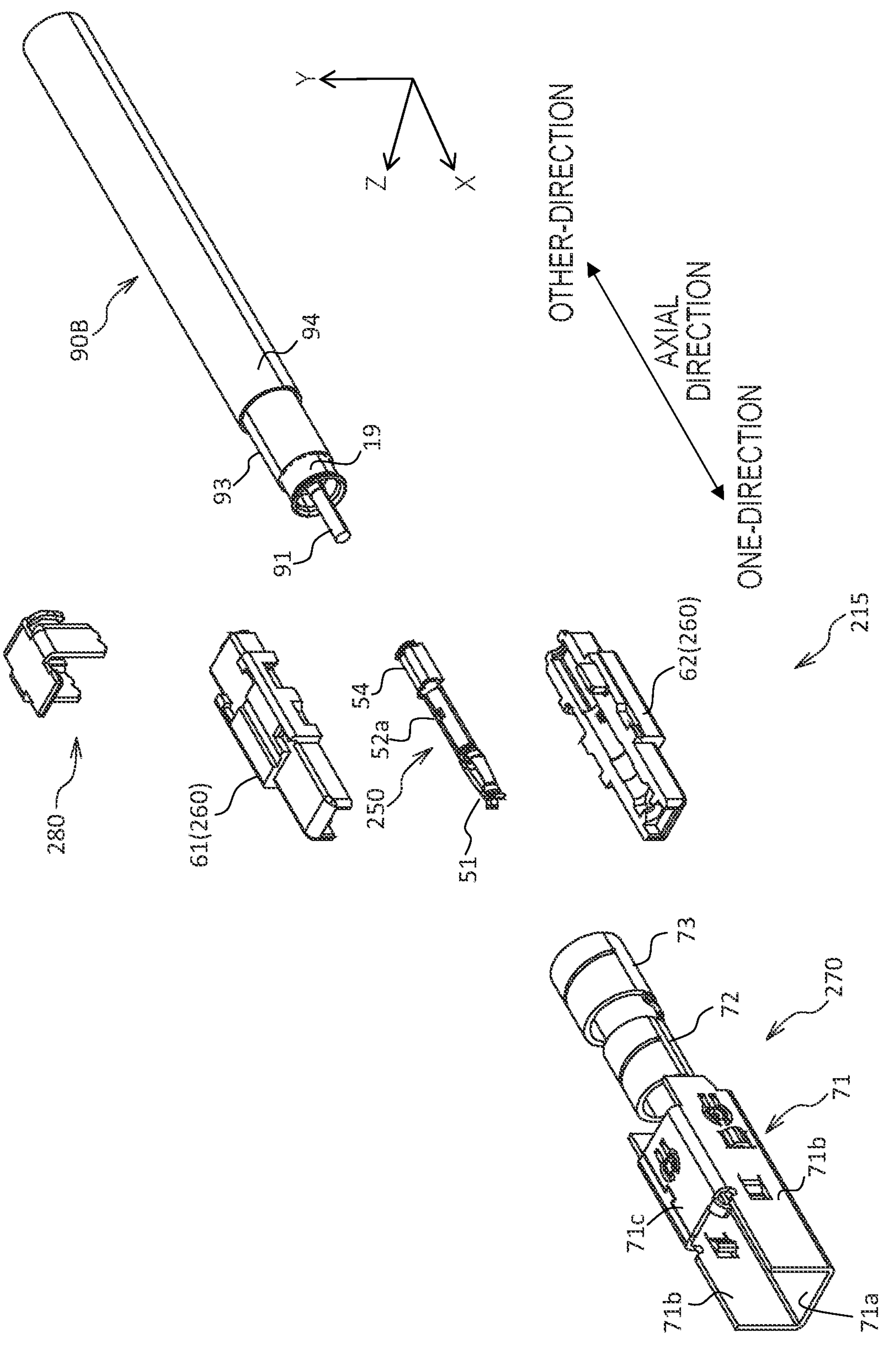
FIG. 27 is an exploded perspective view illustrating a terminal unit according to a Modified Example 2.
Figure 28:
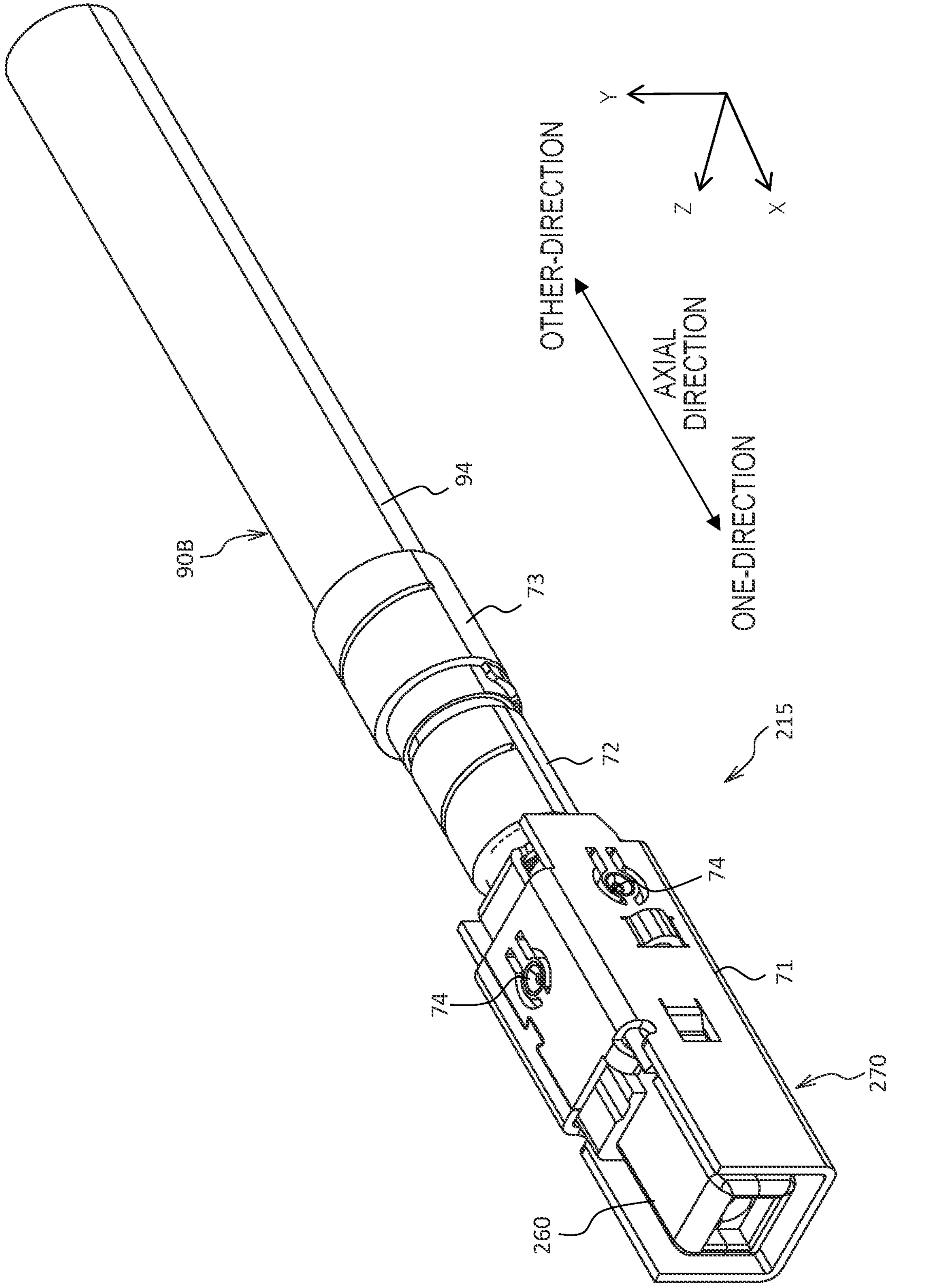
FIG. 28 is a perspective view of a terminal unit according to the Modified Example 2.

As illustrated in FIG. 27, the terminal unit 215 includes an internal terminal 250, a dielectric member 260, an external terminal 270, an impedance adjustment member 280, and a sleeve 19.

Assembly Procedure

An assembly procedure of the terminal unit 215 is basically as follows.

(1) The internal terminal 250 is press-fitted onto the inner conductor 91 of the shield cable 90B, the dielectric member 260 is assembled thereto, and the internal terminal 250 is housed in the dielectric member 260.

(2) The impedance adjustment member 280 is mounted to the dielectric member 260.

(3) The dielectric member 260 is inserted into the main body 71 of the external terminal 270 from the rear side of the main body 71. When this is being performed, the dielectric member 260 is inserted from the rear in a direction from rearward and obliquely above the main body 71 of the external terminal 270.

(4) The first press-fit portion 72 of the external terminal 270 is press-fitted onto the external conductor 93 of the shield cable 90B, and the second press-fit portion 73 is press-fitted onto the outside covering 94 of the shield cable 90B.

Note that a main point of difference to the above exemplary embodiment and the Modified Example 1 is that the direction in which the dielectric member 260 is inserted with respect to the main body 71 of the external terminal 270 is from the rear and not from the front.

Dielectric Member 260

In contrast to Modified Example 1 (FIG. 22) in which the wide-width portion 65*a* of the enlarged indentation 65 is positioned above the placement indentation 63, in the Modified Example 2 (FIG. 29) the wide-width portion 65*a* is positioned in the same plane as the placement indentation 63. This means that in Modified Example 2 the entire enlarged indentation 65 is positioned in the same plane as the placement indentation 63. This is related to the dielectric member 260 not including a resilient contact portion (see the resilient contact portion 87 of FIG. 22).

Figure 29:
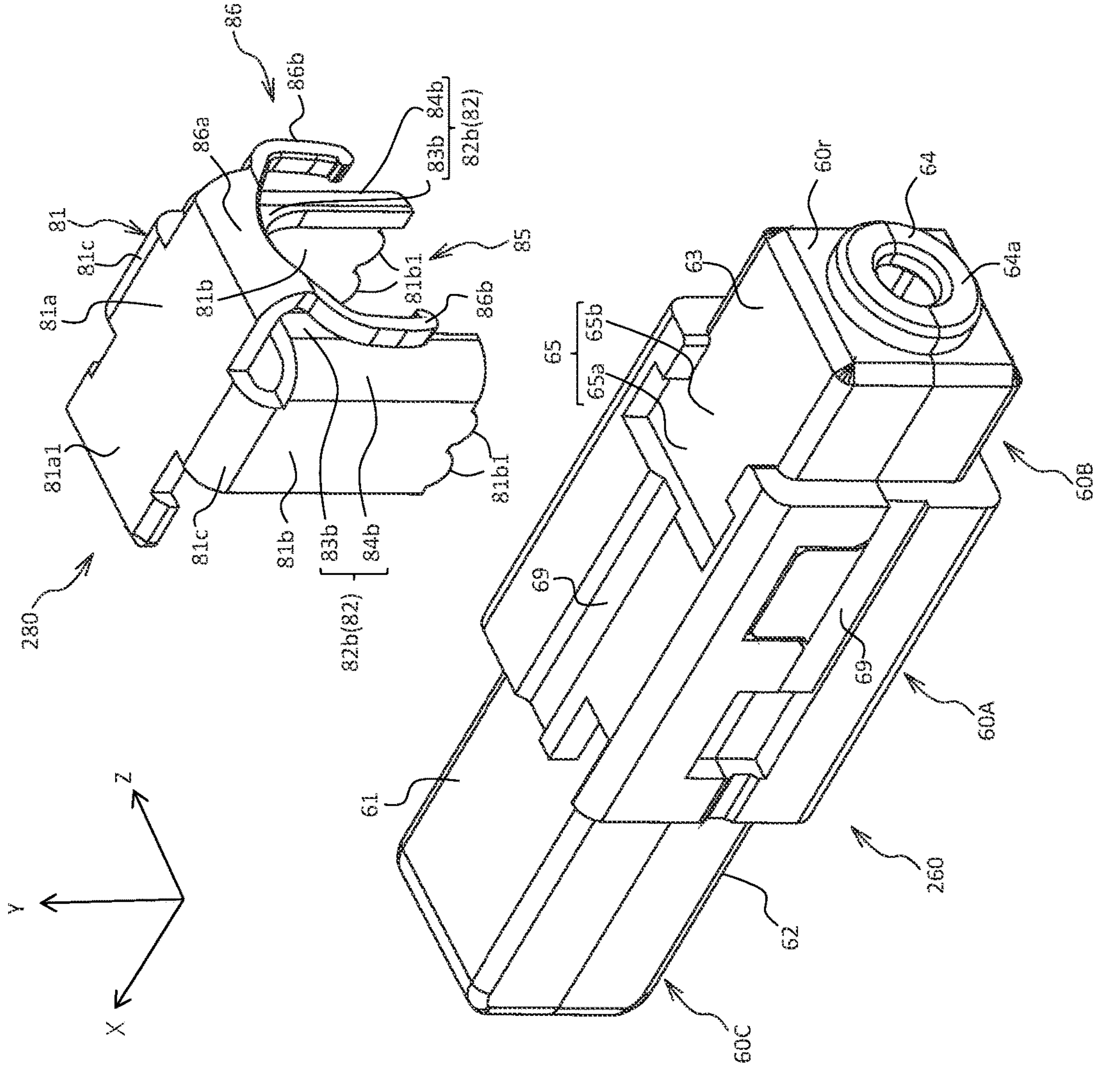
FIG. 29 is a perspective view illustrating a dielectric member and an impedance adjustment member according to the Modified Example 2.

As illustrated in FIG. 29, the tubular projection section 64 of the dielectric member 260 has a smaller projection amount than that of the tubular projection section 64 of Modified Example 1 (see FIG. 22). This means that, while not illustrated in the drawings, although part of the leading-end-side of the tubular projection section 64 (the entry portion 64*a*) is disposed inside the sleeve 19, the front-rear dimension of the entry portion 64*a* is extremely small (about 50 μm).

Grooves 69 corresponding to the projection portions 74 of the external terminal 270 are formed in the dielectric member 260. This means that the ease of manufacture is raised for a process of inserting the dielectric member 260 into the main body 71 of the external terminal 270 from the rear side. The grooves 69 are grooves extending along the front-rear direction. The grooves 69 are each formed to an upper face of the intermediate portion 60A (general portion) of the dielectric member 260 and to a pair of side faces thereof.

Impedance Adjustment Member 280

The impedance adjustment member 280 does not include a resilient contact portion (see the resilient contact portion 87 of FIG. 22) to resiliently contact the projection portions 74 of the external terminal 270.

The impedance adjustment member 280 includes protrusion portions 81*b*1 that project toward the main body 71 of the external terminal 270. The protrusion portions 81*b*1 are formed to a lower end of each of a pair of opposing plate portions 81*b*. A stable contact state is accordingly achieved between the impedance adjustment member 280 and the external terminal 270. There are two of the protrusion portions 81*b*1 formed to each of the opposing plate portions 81*b*. The shape of the protrusion portions 81*b*1 is a downwardly convex circular arc shape.

External Terminal 270

Figure 30:
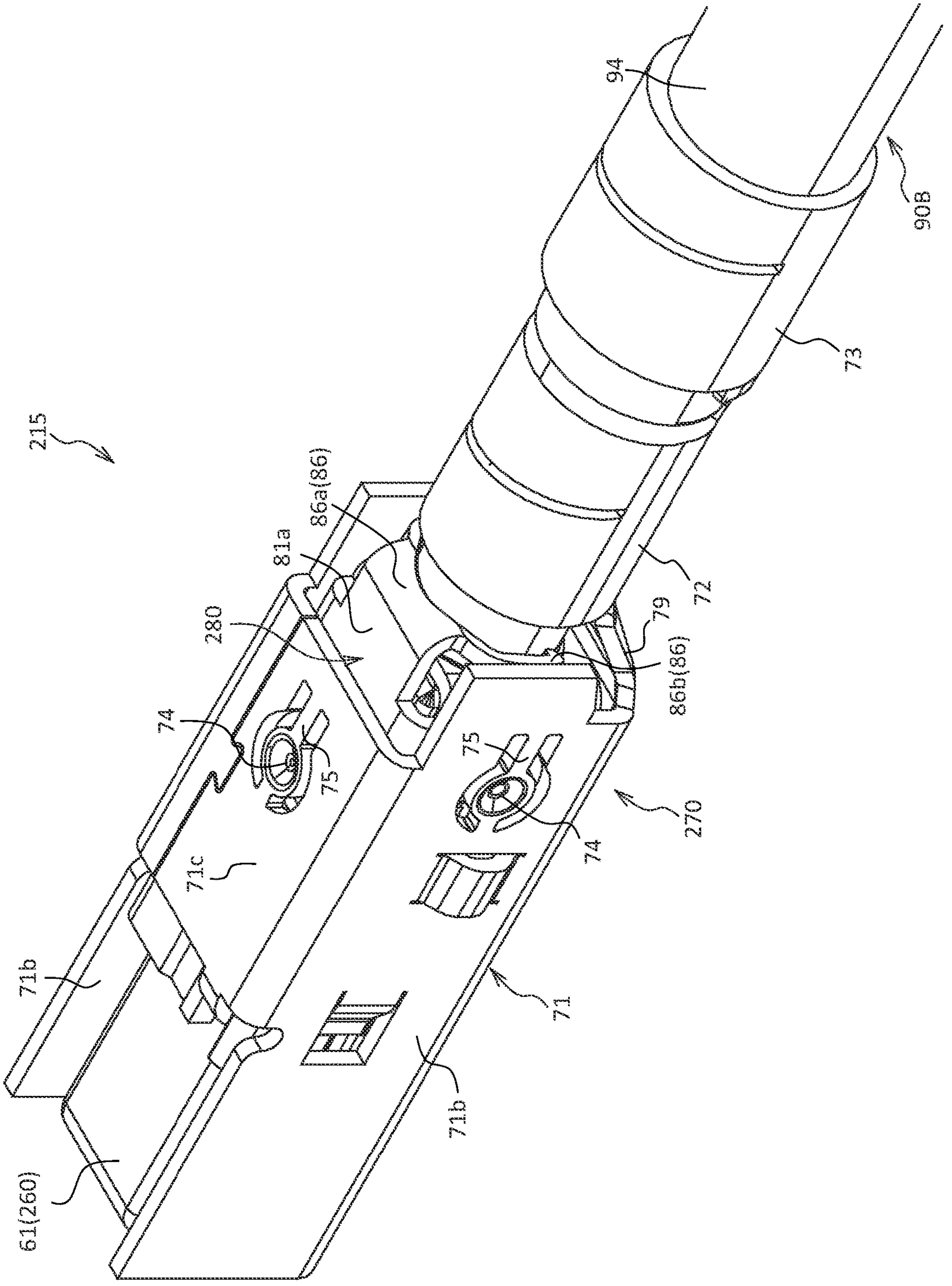
FIG. 30 is a diagram illustrating a terminal unit according to the Modified Example 2.

As illustrated in FIG. 27, the main body 71 of the external terminal 270 includes a first plate portion 71*a*, a pair of second plate portions 71*b*, and a third plate portion 71*c*, and as illustrated in FIG. 30, a rear end of the third plate portion 71*c* is formed further toward the front than the rear end of the pair of second plate portions 71*b*. This enables a process in which the dielectric member 260 is inserted into the main body 71 from the rear.

Note that a portion of the further rearward than the rear end of the third plate portion 71*c* is shielded by part of the impedance adjustment member 280 (the coupling plate portion 81*a* and the bent portion 86*a* of the biasing portion 86).

As illustrated in FIG. 30, the main body 71 includes plural projection portions 74 that make contact with the impedance adjustment member 280.

The projection portions 74 are shaped so as to project toward the inside of the main body 71, and more specifically have a dome shaped profile. The projection portions 74 are respectively formed to the pair of second plate portions 71*b* and the third plate portion 71*c*. More specifically, there is a single projection portion 74 formed to each of the pair of second plate portions 71*b* and the third plate portion 71*c*.

The main body 71 also includes resilient support portions 75 that resiliently support the projection portions 74. The resilient support portions 75 are provided so as to correspond to each of the plural projection portions 74. The resilient support portions 75 are springs supported from both ends. More specifically, the resilient support portions 75 and the projection portions 74 are formed so as to divide through holes formed piercing through plate portions configuring the main body 71. The resilient support portions 75 are formed at the front and rear of the respective projection portions 74. The portions of the resilient support portions 75 positioned at the front side of the projection portions 74 are shorter than portions positioned at the rear side of the projection portions 74.

Operation and Advantageous Effects

Explanation follows regarding operation and advantageous effects of Modified Example 2.

As illustrated in FIG. 27, in Modified Example 2 the terminal unit 215 includes the internal terminal 250 for connecting to the inner conductor 91, the dielectric member 260 that retains the internal terminal 250, and the external terminal 270 for connecting to the external conductor 93. The external terminal 270 houses the internal terminal 250. The internal terminal 250 includes a press-fit portion 54 press-fitted onto the inner conductor 91.

The terminal unit 215 further includes the conductive impedance adjustment member 280 formed as a separate body from the internal terminal 250 and the external terminal 270. The impedance adjustment member 280 is disposed at a position that is between the external terminal 270 and the internal terminal 250 and includes an adjustment section 280 that is disposed at a position able to adjust the impedance of the press-fit portion 54. Note that in the Modified Example 2 the entire impedance adjustment member 280 is configured by the adjustment section 280.

An excessive rise in the impedance of the press-fit portion 54 is thereby suppressed from occurring, enabling enhanced impedance matching to the terminal unit 215.

Note that although the Modified Example 2 also exhibits other advantageous effects due to configuration similar to that of the above exemplary embodiment and Modified Example 1, duplicate explanation thereof will be omitted. Description follows regarding operation and advantageous effects due to configuration different from that of the above exemplary embodiment and Modified Example 1.

As illustrated in FIG. 30, in Modified Example 2 the external terminal 270 includes the resilient support portions 75 that resiliently support the projection portions 74. This makes a structure to obtain a desired contact pressure while still securing ease of assembly of the terminal unit 215 easier to realize than an embodiment in which the resilient support portions 75 are formed to the impedance adjustment member 280.

Furthermore, the resilient support portions 75 are springs supported from both ends formed so as to divide through holes formed in the impedance adjustment member 280. This enables a parasitic inductance in the impedance adjustment member 280 or the external terminal 270 to be decreased compared to an embodiment in which the resilient support portions 75 are cantilevered springs.

Moreover in Modified Example 2, the insertion direction of the dielectric member 260 with respect to the main body 71 of the external terminal 270 is from the rear. This facilitates the manufacturing processes of the terminal unit 215.

Moreover in Modified Example 2, the rear end of the third plate portion 71*c* of the main body 71 of the external terminal 270 is formed further forward than the rear end of the pair of second plate portions 71*b*. Thus in relation to a process of inserting the dielectric member 260 from the rear of the main body 71, this either enables this process to be performed or raises the ease of performing this task.

Modified Example 3: Terminal Unit 315

Next, description follows regarding a terminal unit 315 according to a Modified Example 3, with reference to FIG. 31 to FIG. 37.

Note that the same reference numerals are appended in the drawings to components or portions having the same configuration as the above exemplary embodiment and modified examples, and explanation thereof will be omitted.

Figure 31:
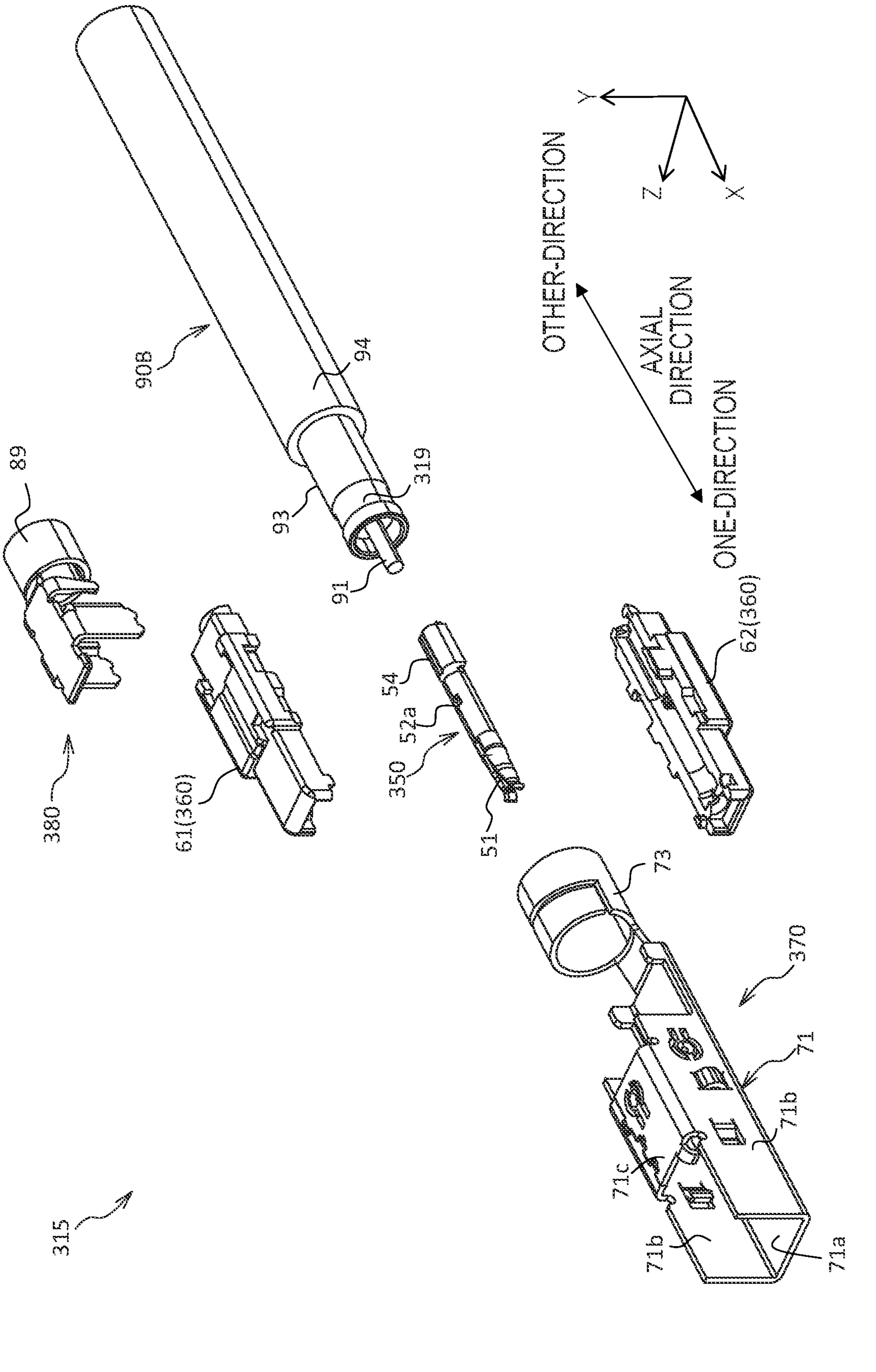
FIG. 31 is an exploded perspective view illustrating a terminal unit according to a Modified Example 3.
Figure 32:
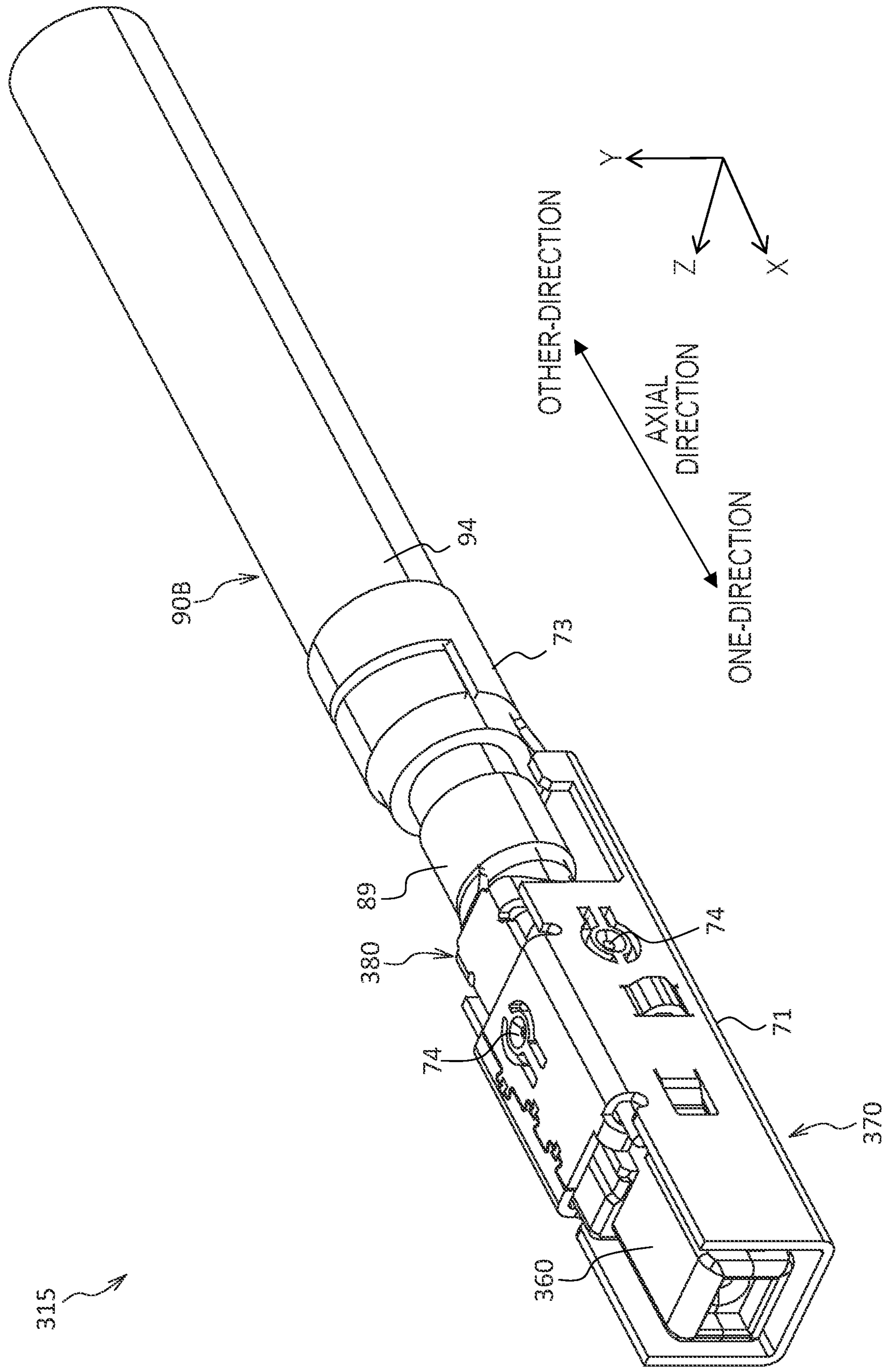
FIG. 32 is a perspective view illustrating a terminal unit according to the Modified Example 3.

As illustrated in FIG. 31, the terminal unit 315 includes an internal terminal 350, a dielectric member 360, an external terminal 370, an impedance adjustment member 380, and a sleeve 319.

Assembly Procedure

An assembly procedure of the terminal unit 315 is basically as follows.

(1) The internal terminal 350 is press-fitted onto the inner conductor 91 of the shield cable 90B, the dielectric member 360 is assembled thereto, and the internal terminal 350 is housed in the dielectric member 360.

(2) The impedance adjustment member 380 is mounted to the dielectric member 360 and a first press-fit portion 89 is press-fitted onto the external conductor 93 of the shield cable 90B.

(3) The dielectric member 360 is inserted into the main body 71 of the external terminal 370 from the rear side of the main body 71. When this is being performed, the dielectric member 360 is inserted from the rear in a direction from rearward and obliquely above the main body 71 of the external terminal 370.

(4) The second press-fit portion 73 of the external terminal 370 is press-fitted onto the outside covering 94 of the shield cable 90B.

Figure 33:
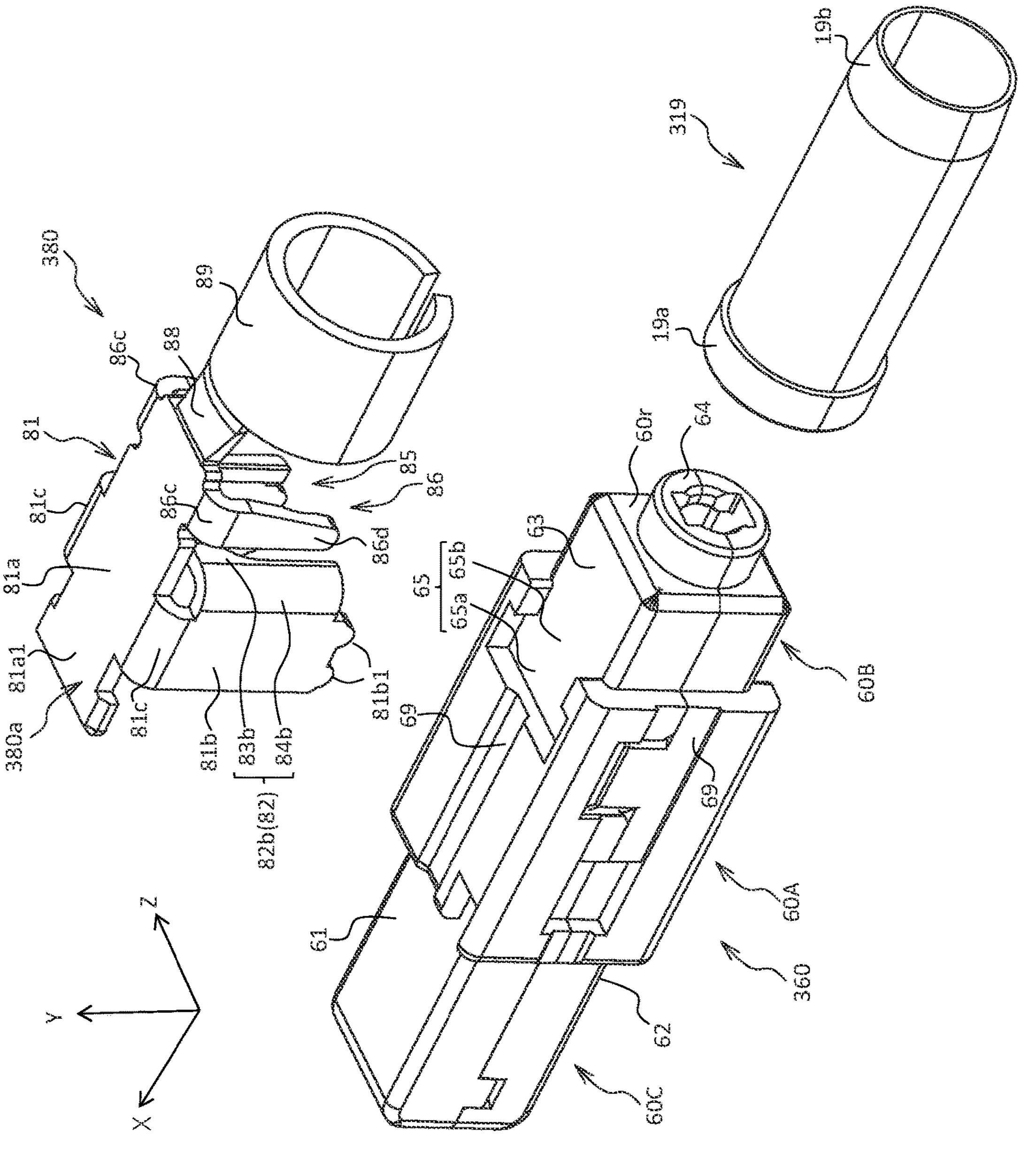
FIG. 33 is a perspective view illustrating a dielectric member, an impedance adjustment member, and a sleeve according to the Modified Example 3.

As illustrated in FIG. 33, the impedance adjustment member 380 includes the front-rear direction extension portion 81 and the lid portion 82.

The front-rear direction extension portion 81 includes a pair of opposing plate portions 81*b*, and a coupling plate portion 81*a*.

The lid portion 82 includes flat plate portions 83*b*, 83*b* and connection bent portions 84*b*, 84*b*.

The connection bent portions 84*b*, 84*b* include a pair of first bent portions 84*b* connecting the flat plate portions 83*b*, 83*b* and the pair of opposing plate portions 81*b* together. The first bent portions 84*b* extend in the unit up-down direction (Y direction).

The flat plate portions 83*b*, 83*b* include a pair of separate portions 83*b* that are each coupled to the pair of respective first bent portions 84*b*. The pair of separate portions 83*b* are separated from each other.

In other words, the lid portion 82 includes a pair of side plate portions 82*b* disposed so as to sandwich the inner conductor 91. The lid portion 82 does not include an upper plate portion (see upper plate portion 82*a* of FIG. 14) to couple the pair of side plate portions 82*b* together. Each of the side plate portions 82*b* are configured from the first bent portion 84*b* and the separate portion 83*b*.

A pass through portion 85 is accordingly formed in the lid portion 82 allowing the inner conductor 91 and the tubular projection section 64 to pass through in the front-rear direction, with the pass through portion 85 being open in a one-direction perpendicular to the front-rear direction (the unit downward direction that is the minus Y direction in Modified Example 3). The pass through portion 85 is a space formed between the pair of side plate portions 82*b*.

Figure 36:
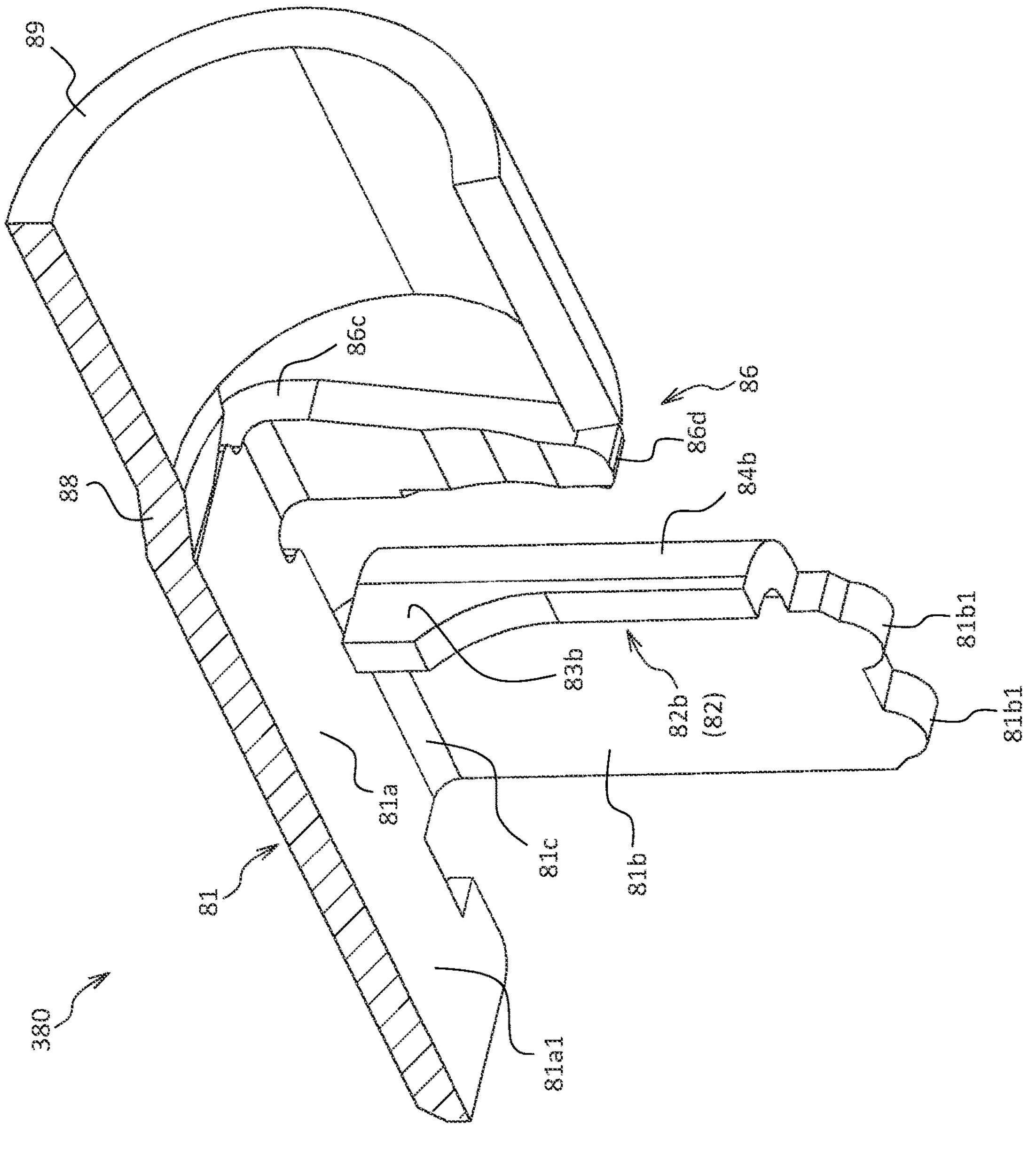
FIG. 36 is a cross-section perspective view illustrating an impedance adjustment member according to the Modified Example 3.
Figure 37:
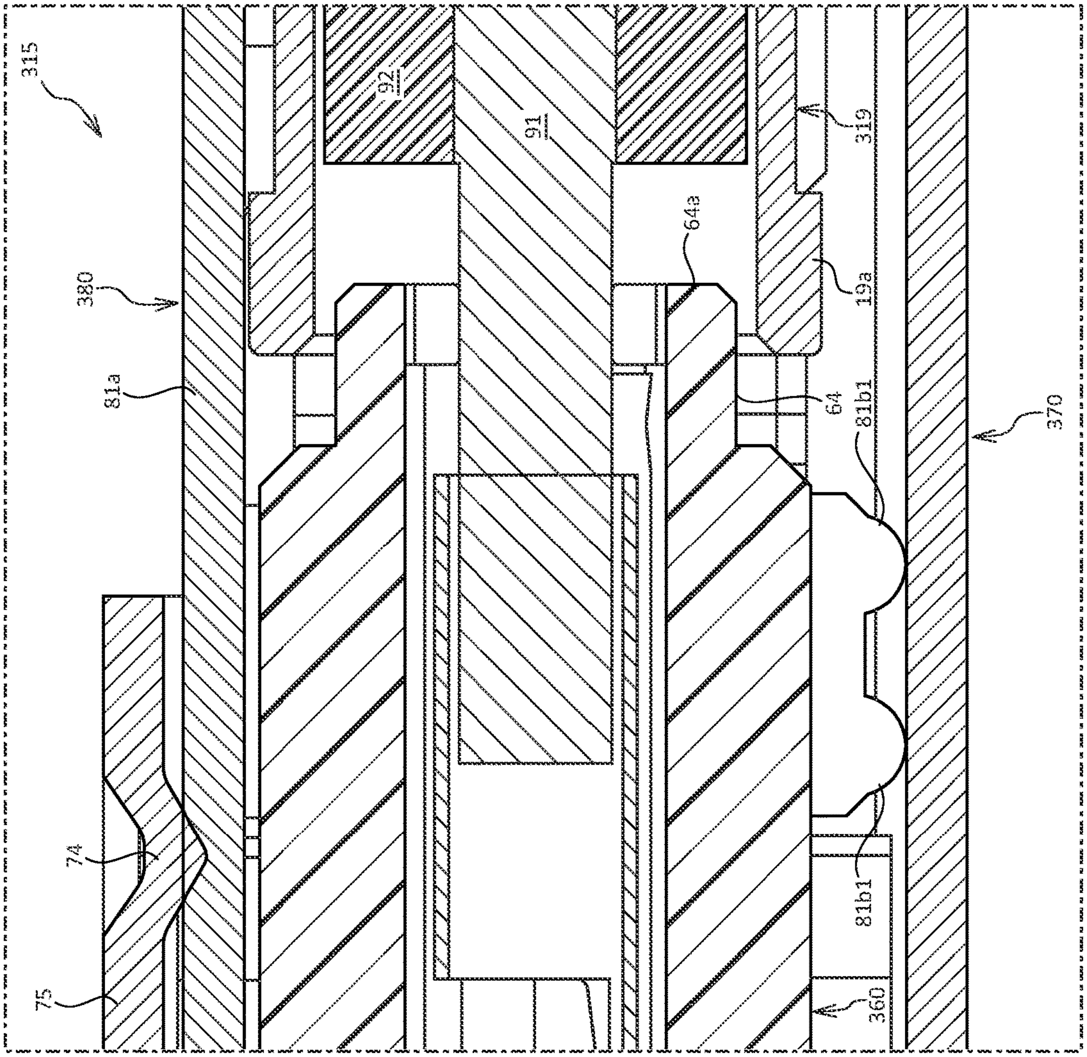
FIG. 37 is a cross-section illustrating an entry portion according to the Modified Example 3.

As illustrated in FIG. 36, a width dimension of the separate portion 83*b* is large at an upper portion of the lid portion 82 and a width dimension of the separate portion 83*b* is small at a lower portion of the lid portion 82. The width dimension of the space between the pair of side plate portions 82*b* is accordingly narrow at the upper portion of the lid portion 82, and the width dimension of the space between the pair of side plate portions 82*b* is wide at the lower portion of the lid portion 82.

The projection tab 81*al* is formed to the front-rear direction extension portion 81 for placement in the projection tab placement portion 63*a* of the dielectric member 360.

The impedance adjustment member 380 includes a biasing portion 86 to bias the sleeve 319 toward the impedance adjustment member 380.

The biasing portion 86 includes a pair of bent portions 86*c* and a pair of biasing tabs 86*d*. Each of the pair of biasing tabs 86*d* have a plate thickness direction facing in the unit width direction. The pair of bent portions 86*c* are formed at the width direction outside of the coupling plate portion 81*a* and extend in the front-rear direction.

Figure 34:
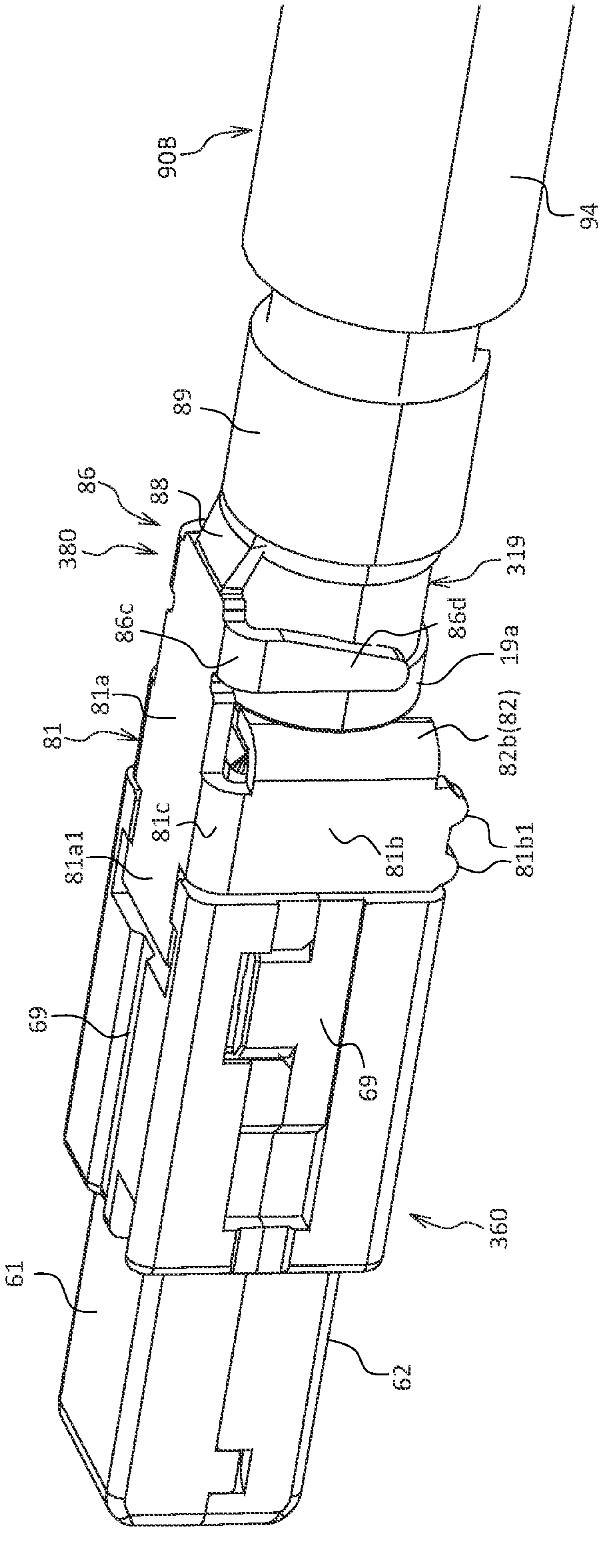
FIG. 34 is a diagram illustrating a terminal unit according to the Modified Example 3 with an external terminal omitted.

As illustrated in FIG. 34, an enlarged diameter portion 19*a* of the sleeve 319 is sandwiched in the front-rear direction between the pair of biasing tabs 86*d* and the pair of side plate portions 82*b*. In other words, the biasing portion 86 provided with the pair of biasing tabs 86*d* biases the enlarged diameter portion 19*a* of the sleeve 319 toward the lid portion 82 of the impedance adjustment member 380. The impedance adjustment member 380 and the sleeve 319 are accordingly anchored together in the front-rear direction (axial direction).

Moreover, the sleeve 319 is sandwiched in the width direction between the pair of biasing tabs 86*d*. The pair of biasing tabs 86*d* are thereby in a resiliently deformed state. The contact between the impedance adjustment member 380 and the sleeve 319 is accordingly resilient contact.

The front-rear dimension of the biasing tabs 86*d* gradually reduces on progression in the unit downward direction, which is the mounting direction of the impedance adjustment member 380.

More specifically, plate ends at a rear side of the biasing tabs 86*d* extend in directions inclined with respect to the unit downward direction, and plate ends at a front side of the biasing tabs 86*d* extend in a direction parallel to the unit downward direction. The plate ends at the front side of the biasing tabs 86*d* make contact with the enlarged diameter portion 19*a* of the sleeve 319.

The impedance adjustment member 380 includes the first press-fit portion 89.

The first press-fit portion 89 is press-fitted onto the external conductor 93 of the shield cable 90B. More specifically, the first press-fit portion 89 is press-fitted onto the external conductor 93 at a position outside the sleeve 319.

An upper side portion of the first press-fit portion 89 is positioned further downward than the coupling plate portion 81*a*. The upper side portion of the first press-fit portion 89 and the coupling plate portion 81*a* are coupled together obliquely by a coupling portion 88.

The external terminal 370 is a member for connecting to the external conductor 93 of the shield cable 90B, and for housing the internal terminal 350, the dielectric member 360, and the impedance adjustment member 380. More specifically, the external terminal 370 is connected (electrically) to the external conductor 93 of the shield cable 90B through the impedance adjustment member 380. The external terminal 370 does not include a pair of first press-fit portions (see the first press-fit portion 72 of FIG. 17) for connecting to the external conductor 93 of the shield cable 90B.

The main body 71 of the external terminal 370 includes the first plate portion 71*a*, the pair of second plate portions 71*b*, and the third plate portion 71*c*. The front end of the third plate portion 71*c* is formed further rearward than the front ends of the pair of first plate portions 71*a* and the pair of second plate portions 71*b*.

The rear end of the third plate portion 71*c* is formed further forward than the rear ends of the second plate portions 71*b*. Thus in relation to a process of inserting the dielectric member 360 into the main body 71 from the rear, this facilitates performing this task.

The external terminal 370 also includes the second press-fit portion 73.

The second press-fit portion 73 is press-fitted onto the outside of the outside covering 94 of the shield cable 90B.

Figure 35:
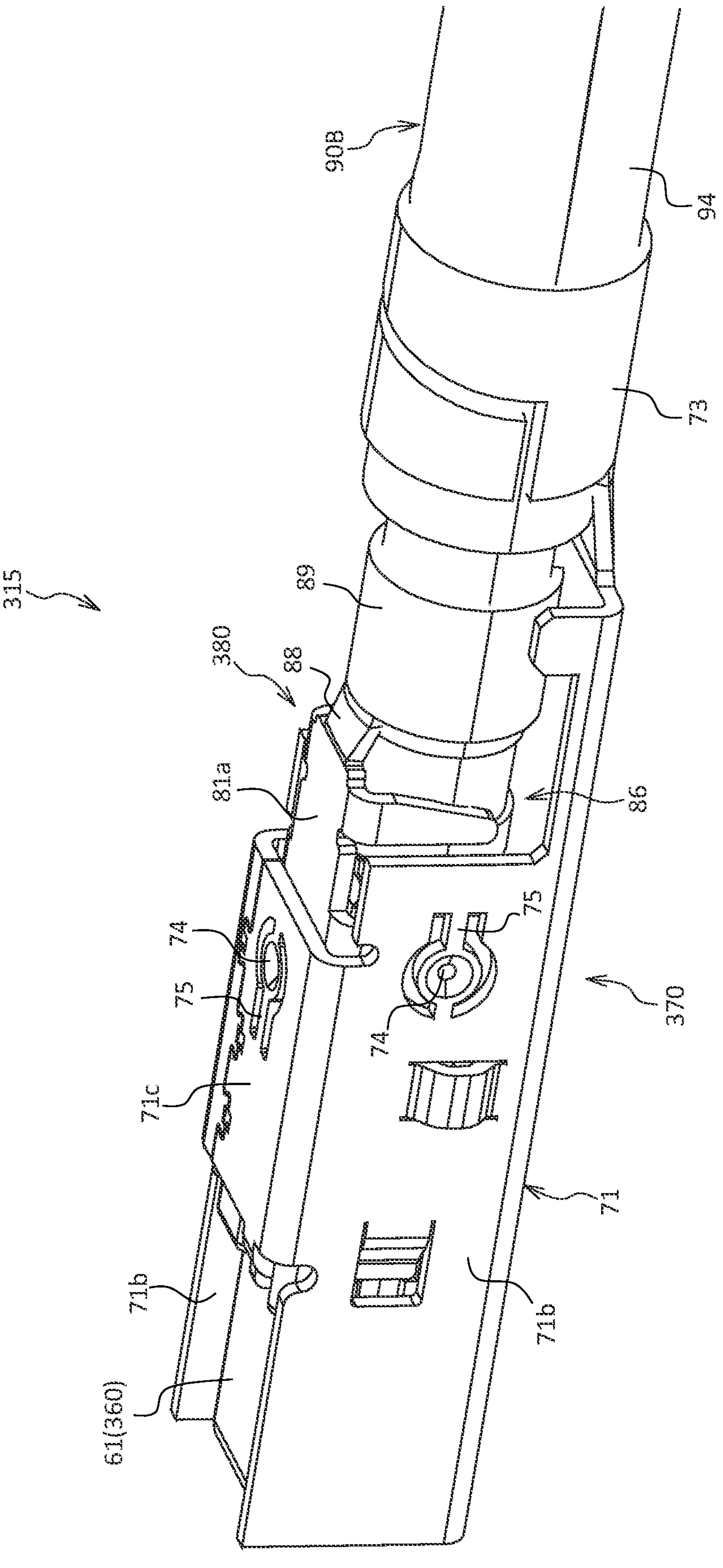
FIG. 35 is a diagram illustrating a terminal unit according to the Modified Example 3.

As illustrated in FIG. 35, the main body 71 of the external terminal 370 includes plural projection portions 74 that make contact with the impedance adjustment member 380.

The projection portions 74 are shaped so as to project toward the inside of the main body 71, and more specifically have a dome shaped profile. The projection portions 74 are respectively formed to the pair of second plate portions 71*b* and the third plate portion 71*c*. More specifically, there is a single projection portion 74 formed to each of the pair of second plate portions 71*b* and the third plate portion 71*c*.

Moreover, the main body 71 includes the resilient support portions 75 to resiliently support the projection portions 74. The resilient support portions 75 are provided so as to correspond to the respective plural projection portions 74. The resilient support portions 75 are springs supported from both ends. More specifically, through holes are formed in plate portions configuring the main body 71, and the resilient support portions 75 and the projection portions 74 are formed so as to divide these through holes. The resilient support portions 75 are formed at the front and rear of the respective projection portions 74.

In relation to the resilient support portions 75 formed to the second plate portions 71*b*, portions of the resilient support portions 75 positioned at the front side of the projection portions 74 are shorter than portions thereof positioned at the rear side of the projection portions 74.

In relation to the resilient support portion 75 formed to the third plate portion 71*c*, the portion of the resilient support portion 75 positioned at the front side of the projection portion 74 is longer than a portion thereof positioned at the rear side of the projection portion 74. This thereby enables the projection portion 74 formed to the third plate portion 71*c* to be placed toward the rear. In particular, in Modified Example 3, the projection portion 74 formed to the third plate portion 71*c* might tend to be disposed forward due to a rear end of the third plate portion 71*c* being formed further forward than the rear end of the second plate portions 71*b*. Adopting the configuration described above is accordingly advantageous.

Sleeve 319

As illustrated in FIG. 33, the sleeve 319 is a machined component, a die-cast component, or an injection molded body.

The sleeve 319 includes an enlarged diameter portion 19*a* formed to a front end portion of the sleeve 319. The external diameter is enlarged at the enlarged diameter portion 19*a* compared to other portions. The enlarged diameter portion 19*a* is sandwiched in the front-rear direction between the lid portion 82 and the biasing portion 86 of the impedance adjustment member 380. The sleeve 319 is accordingly in press contact with the impedance adjustment member 380.

The sleeve 319 includes a reduced diameter portion 19*b* formed to a rear end portion of the sleeve 319. The external diameter of the reduced diameter portion 19*b* decreases on progression toward the rear side. A task to insert the sleeve 319 between the insulating cover 92 and the external conductor 93 of the shield cable 90B is accordingly facilitated.

Operation and Advantageous Effects

Description follows regarding the operation and advantageous effects of Modified Example 3.

As illustrated in FIG. 31, in the Modified Example 3 the terminal unit 315 includes the internal terminal 350 for connecting to the inner conductor 91, the dielectric member 360 for retaining the internal terminal 350, and the external terminal 370 for connecting to the external conductor 93. The external terminal 370 houses the internal terminal 350. The internal terminal 350 includes the press-fit portion 54 press-fitted onto the inner conductor 91.

The terminal unit 315 further includes the conductive impedance adjustment member 380 formed as a separate body from the internal terminal 350 and the external terminal 370. The impedance adjustment member 380 includes an adjustment section 380*a* disposed at a position that is between the external terminal 370 and the internal terminal 350 and that is a position able to adjust the impedance of the press-fit portion 54. Note that the adjustment section 380*a* is part of the impedance adjustment member 380.

This thereby enables the impedance of the press-fit portion 54 to be suppressed from rising excessively, enabling the terminal unit 315 with enhanced impedance matching to be obtained.

Note that Modified Example 3 also exhibits other advantageous effects due to configuration similar to that of the above exemplary embodiment, Modified Example 1, and Modified Example 2, however duplicate explanation thereof will be omitted. Explanation follows regarding advantageous effects due to configuration different to that of the above exemplary embodiment, Modified Example 1, and Modified Example 2.

In cases in which the external terminal 270 includes the first press-fit portion 72 as in Modified Example 2 (see FIG. 27 to FIG. 30), there is normally a need to form a step portion 79 between the main body 71 and the first press-fit portion 72 in advance (see FIG. 30). However, such a step portion 79 makes it difficult to perform a task of inserting the dielectric member 260 into the main body 71 from the rear.

In order to address this issue, in Modified Example 3, the impedance adjustment member 380 includes the first press-fit portion 89 for press-fitting onto the external conductor 93 (a portion not folded back to the outside of the outside covering 94), and the external terminal 370 does not include a first press-fit portion for press-fitting onto the external conductor 93 (a portion not folded back to the outside of the outside covering 94). This facilitates insertion of the dielectric member 360 from the rear of the main body 71.

Supplementary Explanation to Above Exemplary Embodiment

Note that in the above exemplary embodiment an example is described in which the dielectric member is configured from a first member and a second member formed as separate bodies to each other. However, the dielectric member of the present disclosure is not limited thereto, and may be formed overall as a single body.

Moreover, in the above exemplary embodiment described an example is described in which the terminal unit configures part of the connector 100 housed in the housing 12. However, the terminal unit of the present disclosure is not limited thereto.

Moreover, in the above exemplary embodiments examples were described in which the sleeve 19, 319 is inserted between the insulating cover 92 and the external conductor 93 of the shield cable 90B. However, the sleeve of the present disclosure is not limited thereto. For example, an external conductor of the shield cable may have a double-layer structure including a foil and a braid, and the sleeve may be inserted between the foil and the braid. In such cases too, the sleeve is disposed at the outside of the insulating cover 92.

EXPLANATION OF REFERENCE NUMERALS

12 housing
15, 115, 215, 315 terminal unit
19, 319 sleeve
50, 150, 250, 350 internal terminal
51 contact portion
54 press-fit portion
60, 160, 260, 360 dielectric member
63 placement indentation
63, 65*b* escape indentation
63*a* projection tab placement portion
64 tubular projection section
64*a* entry portion
65 enlarged indentation
65*a* wide-width portion
65*b* narrow-width portion
69 groove
70, 170, 270, 370 external terminal
71 main body
71*e* opening
72 external conductor connection portion (first press-fit portion)
73 second press-fit portion
74 projection portion
75 resilient support portions
80, 180, 280 impedance adjustment member (adjustment section)
81 front-rear direction extension portion
81*a* coupling plate portion
81*b* opposing plate portions
82 lid portion
82*a* upper plate portion
82*b* side plate portions
85 pass through portion
86 biasing portion
87 resilient contact portion
89 first press-fit portion
90B shield cable
91 inner conductor
92 insulating cover
93 external conductor
94 outside covering
100 connector
380 impedance adjustment member
380*a* adjustment section

What is claimed is:

1. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the external terminal includes a main body that houses the internal terminal;

an opening is formed in the main body such that an internal space of the main body is open toward a rear side;

the adjustment section includes a lid portion having a plate thickness direction facing in a direction intersecting with a plane perpendicular to a front-rear direction, with the lid portion being disposed so as to narrow the opening;

the lid portion includes a pair of side plate portions disposed so as to sandwich the inner conductor; and a pass through portion is formed between the pair of side plate portions to allow the inner conductor to pass through in the front-rear direction, with the pass through portion open in one direction perpendicular to the front-rear direction.

2. The terminal unit of claim 1, wherein:

the lid portion includes:

an upper plate portion coupling the pair of side plate portions together.

3. The terminal unit of claim 1, wherein the adjustment section includes a front-rear direction extension portion having a plate thickness direction facing in a direction along a plane perpendicular to a front-rear direction and extending in the front-rear direction.

4. The terminal unit of claim 3, wherein the front-rear direction extension portion includes:

a pair of opposing plate portions opposing each other so as to sandwich the internal terminal; and a coupling plate portion that couples the pair of opposing plate portions together.

5. The terminal unit of claim 1, wherein the impedance adjustment member and the external terminal make contact with each other and are electrically connected together.

6. The terminal unit of claim 5, wherein contact between the impedance adjustment member and the external terminal is realized through projection portions formed at at least one of the impedance adjustment member or the external terminal.

7. The terminal unit of claim 1, wherein:

the impedance adjustment member is disposed at an outer face of the dielectric member; and a placement indentation for placement of the impedance adjustment member is formed at the outer face of the dielectric member.

8. The terminal unit of claim 1, wherein:

the terminal unit further comprises a conductive sleeve disposed at an outer side of an insulating cover that covers the inner conductor; and the sleeve and the impedance adjustment member make contact with each other.

9. The terminal unit of claim 8, wherein the sleeve is formed by a machined component, a die-cast component, or an injection molded body.

10. The terminal unit of claim 8, wherein contact between the sleeve and the impedance adjustment member is press contact.

11. The terminal unit of claim 1, wherein:

the terminal unit includes a conductive sleeve disposed at an outer side of an insulating cover that covers the inner conductor; and the dielectric member includes an entry portion disposed inside the sleeve.

12. The terminal unit of claim 11, wherein the entry portion is formed in a tubular shape so as to surround the inner conductor.

13. The terminal unit of claim 6, wherein:

the projection portion is formed at the external terminal; and the external terminal includes a resilient support portion that resiliently supports the projection portion.

14. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the adjustment section includes a front-rear direction extension portion having a plate thickness direction facing in a direction along a plane perpendicular to a front-rear direction and extending in the front-rear direction;

the front-rear direction extension portion includes:

a pair of opposing plate portions opposing each other so as to sandwich the internal terminal;

a coupling plate portion that couples the pair of opposing plate portions together; and the three plate portions of the pair of opposing plate portions and the coupling plate portion each contact the external terminal.

15. The terminal unit of claim 14, wherein contact between each of the three plate portions and the external terminal is realized through projection portions formed at at least one of the front-rear direction extension portion or the external terminal.

16. The terminal unit of claim 14, wherein contact between each of the three plate portions and the external terminal is realized through projection portions formed at the external terminal.

17. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the terminal unit further comprises a conductive sleeve disposed at an outer side of an insulating cover that covers the inner conductor;

the sleeve and the impedance adjustment member make contact with each other;

contact between the sleeve and the impedance adjustment member is press contact; and the impedance adjustment member includes a biasing portion to bias the sleeve toward the impedance adjustment member.

18. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the terminal unit further comprises a conductive sleeve disposed at an outer side of an insulating cover that covers the inner conductor;

the sleeve and the impedance adjustment member make contact with each other;

the adjustment section includes a lid portion having a plate thickness direction facing in a direction intersecting with a plane perpendicular to a front-rear direction;

the lid portion includes a side plate portion formed in a cantilever beam shape; and the sleeve contacts the side plate portion.

19. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the impedance adjustment member and the external terminal make contact with each other and are electrically connected together;

contact between the impedance adjustment member and the external terminal is realized through projection portions formed at at least one of the impedance adjustment member or the external terminal;

the projection portion is formed at the external terminal; and the impedance adjustment member includes a resilient contact portion that resiliently contacts the projection portion.

20. The terminal unit of claim 19, wherein:

the impedance adjustment member includes a hole portion; and the resilient contact portion is a spring that is supported at both sides and formed so as to divide the hole portion.

21. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the terminal unit includes a conductive sleeve disposed at an outer side of an insulating cover that covers the inner conductor;

the sleeve and the impedance adjustment member are anchored together in a front-rear direction; and the impedance adjustment member and the dielectric member are anchored together in the front-rear direction.

22. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the impedance adjustment member includes a first press-fit portion press-fitted onto the external conductor; and the external terminal includes:

a main body enabling insertion of the dielectric member from rearward, and a second press-fit portion for press-fitting together with the shield cable formed further rearward than the main body.

23. A connector comprising:

a plurality of terminal units; and a housing that retains the plurality of terminal units, wherein:

the terminal unit is a terminal unit of claim 1.

24. A terminal unit for mounting to a shield cable including at least one inner conductor and an external conductor that shields the at least one inner conductor, the terminal unit comprising:

at least one internal terminal for connecting to the at least one inner conductor;

a dielectric member that retains the internal terminal;

an external terminal for connecting to the external conductor and that houses the internal terminal; and a conductive impedance adjustment member formed as a separate body from the internal terminal and the external terminal, wherein:

the internal terminal includes a press-fit portion for press-fitting onto the inner conductor;

the impedance adjustment member includes an adjustment section disposed at a position that is between the external terminal and the internal terminal that is a position able to adjust impedance of the press-fit portion;

the external terminal includes a main body that houses the internal terminal;

an opening is formed in the main body such that an internal space of the main body is open toward a rear side;

the adjustment section includes a lid portion having a plate thickness direction facing in a direction intersecting with a plane perpendicular to a front-rear direction, with the lid portion being disposed so as to narrow the opening;

the adjustment section includes a front-rear direction extension portion having a plate thickness direction facing in a direction along a plane perpendicular to a front-rear direction and extending in the front-rear direction;

the front-rear direction extension portion includes:

a pair of opposing plate portions opposing each other so as to sandwich the internal terminal; and a coupling plate portion that couples the pair of opposing plate portions together;

the lid portion includes a pair of side plate portions disposed so as to sandwich the inner conductor; and the pair of side plate portions are connected to rear ends of the pair of opposing plate portions.

* * * * *